(12) United States Patent
Kita

(10) Patent No.: US 7,536,093 B2
(45) Date of Patent: May 19, 2009

(54) CAMERA WHICH INCORPORATES A LENS UNIT THAT CAN PROGRAM AN OPTICAL PROPERTY AND A CORRESPONDING METHOD

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 497 days.

(21) Appl. No.: 11/239,612

(22) Filed: Sep. 29, 2005

(65) Prior Publication Data

US 2006/0067663 A1 Mar. 30, 2006

(30) Foreign Application Priority Data

Sep. 30, 2004 (JP) ............................... 2004-287832

(51) Int. Cl.
*G03B 17/00* (2006.01)
*G03B 3/00* (2006.01)
(52) U.S. Cl. .............................. 396/72; 396/79; 396/89
(58) Field of Classification Search .................. 324/72, 324/79–83, 88, 89, 147; 348/240.3, 345, 348/335, 346, 333.02, 333.04
See application file for complete search history.

(56) References Cited

U.S. PATENT DOCUMENTS

| | | | |
|---|---|---|---|
| 3,598,479 A | | 8/1971 | Wright |
| 4,825,237 A | * | 4/1989 | Hatase et al. ................. 396/79 |
| 4,899,190 A | * | 2/1990 | Hata .......................... 396/76 |
| 4,951,075 A | * | 8/1990 | Tokumaru et al. ............. 396/78 |
| 5,138,494 A | | 8/1992 | Kurtin |
| 5,305,049 A | * | 4/1994 | Miyazaki et al. .............. 396/63 |
| 5,668,620 A | | 9/1997 | Kurtin et al. |
| 5,757,549 A | * | 5/1998 | Sumi .......................... 359/618 |
| 6,437,920 B1 | * | 8/2002 | Wohlstadter ................. 359/626 |

(Continued)

FOREIGN PATENT DOCUMENTS

JP 40-28614 10/1940

(Continued)

OTHER PUBLICATIONS

Koishi Asano (online "Development of positive electrode reaction field evaluation technique in a fused carbonate type fuel cell-study of wetting mechanism of fused carbonate by impressed voltage" (2 pages).

(Continued)

*Primary Examiner*—Jay M Patidar
(74) *Attorney, Agent, or Firm*—Frishauf, Holtz, Goodman & Chick, P.C.

(57) ABSTRACT

A group of optical elements of a zoom lens unit has variable-focal-length lenses whose optical properties can be adjusted. A camera having this zoom lens unit incorporated therein includes a control unit into which control information, with respect to any of a plurality of variable design parameters for the zoom lens unit, is inputted by the user. The camera also has a processing unit for obtaining an optical parameter of the zoom lens unit through a simulation operation when the variable design parameters are controlled based on the control information, a display unit which displays the results of the simulation operation that is carried out by the processing unit, and a photographing control unit for controlling the variable design parameters based on the control information, so that a desired optical property can easily be obtained.

19 Claims, 37 Drawing Sheets

U.S. PATENT DOCUMENTS

| | | | | |
|---|---|---|---|---|
| 6,683,725 | B2 * | 1/2004 | Wohlstadter | 359/626 |
| 6,824,059 | B2 * | 11/2004 | Jam et al. | 235/462.25 |
| 6,925,253 | B2 * | 8/2005 | Miyatake | 396/79 |
| 7,016,122 | B2 * | 3/2006 | Okawara | 359/696 |
| 2006/0198621 | A1 * | 9/2006 | Triteyaprasert | 396/79 |

FOREIGN PATENT DOCUMENTS

| | | |
|---|---|---|
| JP | 51-49956 | 12/1976 |
| JP | 55-36857 A | 3/1980 |
| JP | 6-308303 A | 11/1994 |
| JP | 11-513129 A | 11/1999 |
| JP | 2000-81504 A | 3/2000 |
| JP | 2001-13306 A | 1/2001 |
| JP | 3158016 B2 | 2/2001 |
| JP | 2001-519539 A | 10/2001 |
| JP | 2002-243918 A | 8/2002 |
| JP | 2002-311213 A | 10/2002 |
| JP | 2003-14909 A | 1/2003 |
| JP | 3400270 B2 | 2/2003 |

OTHER PUBLICATIONS

U.S. Appl. No. 11/239,413, filed Sep. 29, 2005; K. Kita; Optical Unit Which can Program Optical Properties and Camera Incorporating Lens Unit Which can Program Optical Properties.

Article entitled "Electrocapillarity and Wetting of Insulator Films by Water", C. R. Acad. Sci. Paris t.317 Serie II, p. 157-163, Jul. 22, 1993.

Article entitled "Optical Properties and Molecular Orientation in a Hybrid-Aligned Liquid Crystal Electrooptical Microlens", by Shin Masuda, et al, Optics, vol. 20, No. 4, Apr. 1991.

* cited by examiner a: GLYCIN
b: β-ALANINE
c: α-ALANINE
d: β-AMINOBUTYRIC ACID
e: BETAINE
f: ε-AMINOCAPRONIC ACID
g: α-AMINOBUTYRIC ACID
h: α-AMINOCAPRONIC ACID

FIG. 10A

| SURFACE #j | RADIUS OF CURVATURE rj | CURVATURE Cj=1/rj | DISTANCE dj | APERTURE SIZE Dj | REFRACTIVE INDEX n'j | ABBE NUMBER νj |
|---|---|---|---|---|---|---|
| OBJECT POINT SURFACE | FLAT | 0 | INFINITY | | 1 | |
| 1 | 4.306 | 0.2322 | 1.11 | 5 | 1.658296 | 57.33 |
| 2 | 105.2 | 0.0095 | 0.82 | 5 | 1 | |
| 3 | -8.57 | -0.1167 | 0.31 | 3.8 | 1.592701 | 35.30 |
| 4 | 3.52 | 0.2841 | 0.50 | 3.8 | 1 | |
| 5 | FLAT | 0 | 0.26 | 3.8 | 1 | |
| 6 | FLAT | 0 | 0.24 | 4.5 | 1.511179 | 51.02 |
| 7 | 3.977 | 0.2514 | 1.55 | 4.5 | 1.691002 | 54.84 |
| 8 | -6.272 | -0.1594 | 8.92 | 4.5 | 1 | |
| FOCAL PLANE | FLAT | 0 | | 8 | | |

FIG. 10B

| SURFACE #j | hj | h'j | αj | α'j | |
|---|---|---|---|---|---|
| 1 | 2.2500 | 2.0198 | 0.0000 | 0.3440 | |
| 2 | 2.0198 | 1.7481 | 0.3440 | 0.3313 | |
| 3 | 1.7481 | 1.7071 | 0.3313 | 0.2104 | |
| 4 | 1.7071 | 1.7456 | 0.2104 | -0.0770 | |
| 5 | 1.7456 | 1.7656 | -0.0770 | -0.0770 | |
| 6 | 1.7656 | 1.7778 | -0.0770 | -0.0770 | |
| 7 | 1.7778 | 1.7747 | -0.0770 | 0.0034 | |
| 8 | 1.7747 | 0.0000 | 0.0034 | 0.1989 | =u'8 |
| | BF=s'k= | 8.9221 | FOCAL LENGTH f= | 11.3114 | |
| | APERTURE RATIO F= | 2.5209 | EFFECTIVE APERTURE SIZE D= | 4.4870 | |

RETRO FOCUS-WIDE

WIDE

TELE

FIG. 24A

| AUXILIARY AMOUNT | CALCULATING EQUATIONS |
|---|---|
| $Q_j$ | $Q_j = n_j(1/r_j - 1/s_j)$ |
| $Q_j^*$ | $Q_j^* = n_j(1/r_j - 1/s_j^*)$ |
| $\Delta(1/n_j s_j)$ | $\Delta(1/n_j s_j) = 1/(n'_j \cdot s'_j) - 1/(n_j \cdot s_j)$ |
| $\Delta(1/n_j)$ | $\Delta(1/n_j) = 1/n'_j - 1/n_j$ |
| $J_j$ | $J_j = (h_j^* \cdot Q_j^*)/(h_j \cdot Q_j)$ |

FIG. 24B

| | SEIDEL ABERRATION | CALCULATING EQUATIONS |
|---|---|---|
| I | SPHERICAL ABERRATION (SA) | $I = \Sigma I_j = \Sigma h_j^4 Q_j^2 \cdot \Delta(1/n_j s_j)$ |
| II | COMA ABERRATION | $II = \Sigma II_j = \Sigma J_j \cdot I_j$ |
| III | ASTIGMATISM (As) | $III = \Sigma III_j = \Sigma J_j \cdot II_j$ |
| IV | SAGITTAL IMAGE PLANE CURVE | $IV = \Sigma IV_j = \Sigma(III_j + P_j)$ |
| V | DISTORTION (Dist) | $V = \Sigma V_j = \Sigma(J_j \cdot IV_j) = \Sigma J_j(III_j + P_j)$ |
| P | Petzval IMAGE PLANE CURVE | $P = \Sigma P_j = -\Sigma(1/r_j) \cdot \Delta(1/n_j)$ |

FIG. 25

| SURFACE j | SPHERICAL ABERRATION (I) | COMA ABERRATION (II) | ASTIGMATISM (III) | SAGITTAL IMAGE PLANE CURVE (IV) | DISTORTION (V) | PETZVAL SUM (P) | CHROMATIC ABERRATION | CHROMATIC DIFFERENCE OF MAGNIFICATION |
|---|---|---|---|---|---|---|---|---|
| 1 | 4.340 | 0.462 | 0.049 | 1.090 | 0.116 | 1.040 | -0.00552 | -0.00059 |
| 2 | 2.290 | -2.100 | 1.930 | 1.890 | -1.730 | -0.043 | -0.00296 | 0.00272 |
| 3 | -7.030 | 4.090 | -2.380 | -2.880 | 1.680 | -0.491 | 0.00644 | -0.00375 |
| 4 | -4.870 | -1.910 | -0.746 | -1.940 | -0.760 | -1.200 | 0.00660 | 0.00258 |
| 5 | 0.000 | 0.000 | 0.000 | 0.000 | 0.000 | 0.000 | 0.00000 | 0.00000 |
| 6 | 0.026 | 0.085 | 0.284 | 0.284 | 0.945 | 0.000 | -0.00060 | -0.00201 |
| 7 | 1.980 | 0.784 | 0.309 | 0.510 | 0.201 | 0.201 | -0.00085 | -0.00034 |
| 8 | 4.600 | -1.530 | 0.510 | 1.250 | -0.415 | 0.200 | -0.00433 | 0.00144 |
| TOTAL Σ | 1.336 | -0.119 | -0.044 | 0.204 | 0.037 | 0.737 | -0.00122 | 0.00006 |

FIG. 33A
FIG. 33B
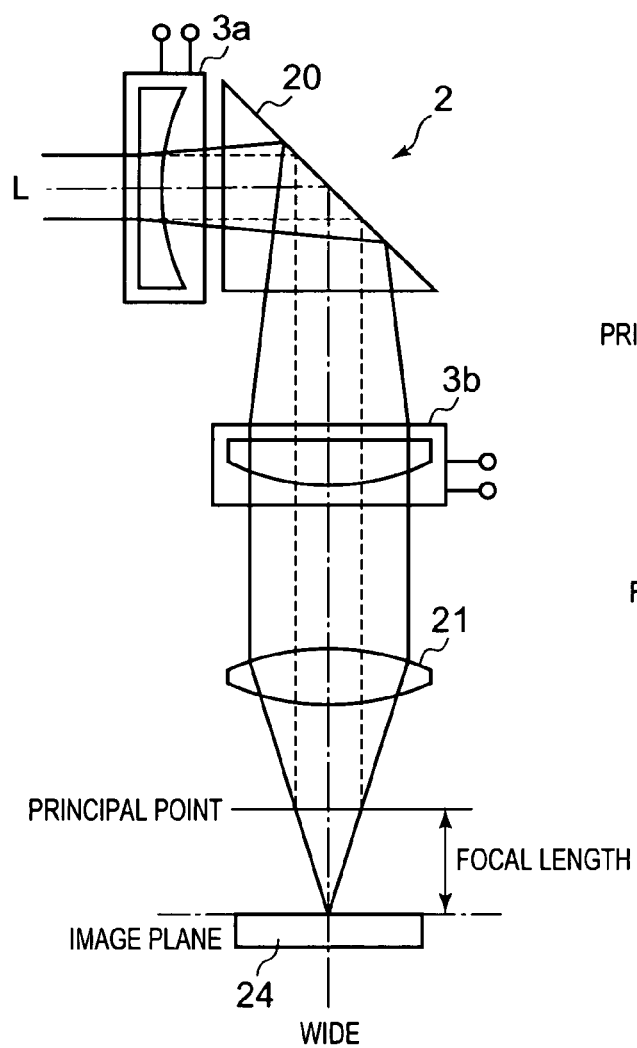
WIDE
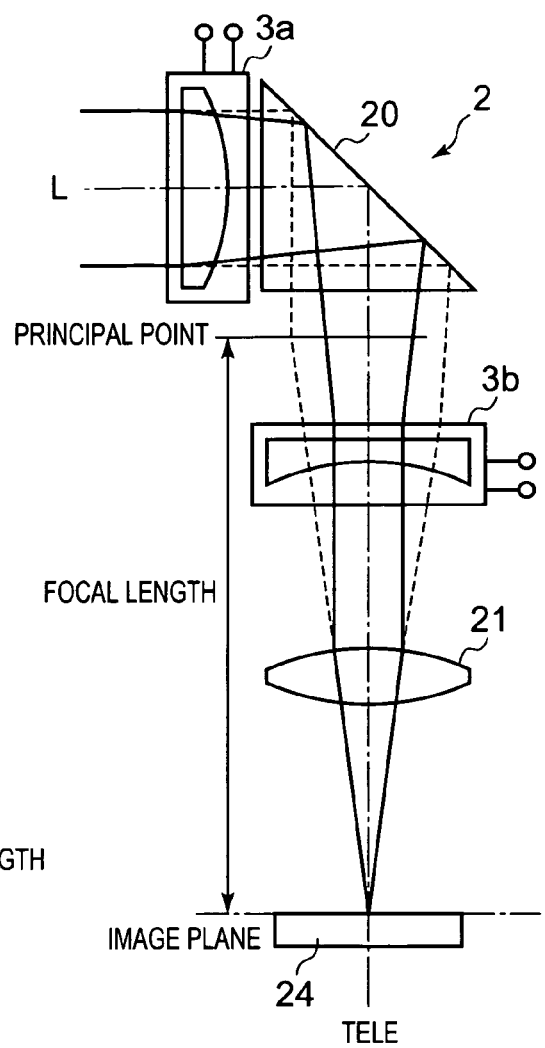
TELE

FIG. 35A

| NO | RADIUS OF CURVATURE R | INTER-SURFACE DISTANCE d | REFRACTIVE INDEX nd | ABBE NUMBER νd | GLASS/LIQUID NAMES |
|---|---|---|---|---|---|
| OBJECT POINT SURFACE | FLAT | INFINITY | 1 | | AIR |
| R1 | FLAT(∞) | 0.5 | 1.4918 | 57.45 | PMMA |
| R2 | FLAT | VARIABLE(d2) | 1.515 | 45.98 | IMMERSION OIL |
| R3 | VARIABLE (LIQUID INTERFACE) | VARIABLE(d3) | 1.334 | 48.41 | WATER |
| R4 | FLAT | 0.5 | 1.4918 | 57.45 | PMMA |
| R5 | FLAT | 20 | 1 | | AIR |
| R6 | FLAT (DIAPHRAGM) | 21.21 | 1 | | AIR |
| R7 | FLAT | 0.5 | 1.4918 | 57.45 | PMMA |
| R8 | FLAT | VARIABLE(d8) | 1.515 | 45.98 | IMMERSION OIL |
| R9 | VARIABLE (LIQUID INTERFACE) | VARIABLE(d9) | 1.334 | 48.41 | WATER |
| R10 | FLAT | 0.5 | 1.4918 | 57.45 | PMMA |
| R11 | FLAT | 4 | 1 | | AIR |
| R12 | 26.638 | 3.37 | 1.6689 | 44.98 | BaF13 |
| R13 | 118.455 | 0.13 | 1 | | AIR |
| R14 | 13.039 | 3.83 | 1.6228 | 56.93 | SK10 |
| R15 | 32.821 | 3.76 | 1.4645 | 65.7 | FK3 |
| R16 | -63.637 | 3 | 1.7552 | 27.58 | SF4 |
| R17 | 7.574 | 2.34 | 1 | | AIR |
| R18 | FLAT (DIAPHRAGM) | 3.18 | 1 | | AIR |
| R19 | 12.32 | 3 | 1.7018 | 41.02 | BaSF52 |
| R20 | -63.828 | | 1 | | AIR |
| FOCAL PLANE | FLAT | | | | |

FIG. 35B

| MAGNIFICATION m | CURVATURE OF LIQUID INTERFACE | | LIQUID SURFACE POSITION | | | | FOCAL LENGTH f | Bf | APERTURE RATIO F |
|---|---|---|---|---|---|---|---|---|---|
| | R3 | R9 | d2 | d3 | d8 | d9 | | | |
| 0.4 | 6.033 | -15.08 | 2.6 | 6.4 | 6 | 3 | 9.95 | 10.26 | 1.43 |
| 0.6 | 13.575 | -22.62 | 2.9 | 6.1 | 5.2 | 3.8 | 15.06 | 10.32 | 1.38 |
| 0.8 | 36.2 | -45.25 | 4.1 | 4.9 | 5.1 | 3.9 | 20.16 | 10.33 | 1.35 |
| 1 | FLAT | FLAT | 4.5 | 4.5 | 4.5 | 4.5 | 25.08 | 10.32 | 1.35 |
| 1.5 | -27.15 | 18.1 | 5.5 | 3.5 | 3.2 | 5.8 | 36.45 | 10.52 | 1.46 |
| 2 | -18.1 | 9.05 | 5.8 | 3.2 | 2 | 7 | 46.4 | 11.34 | 1.86 |
| ... | | | | | | | | | |

| SURFACE j | SPHERICAL ABERRATION (I) | COMA ABERRATION (II) | ASTIGMATISM (III) | SAGITTAL IMAGE PLANE CURVE (IV) | DISTORTION (V) | PETZVAL SUM (P) | CHROMATIC ABERRATION | CHROMATIC DIFFERENCE OF MAGNIFICATION |
|---|---|---|---|---|---|---|---|---|
| 1 | 0 | 0 | 0 | 0 | 0.551 | 0 | 0 | -0.00172 |
| 2 | 0 | 0 | 0 | 0 | 0.0137 | 0 | 0 | -0.000396 |
| 3 | -0.319 | -0.237 | -0.177 | -0.276 | -0.205 | -0.0994 | -0.000104 | -0.0000772 |
| 4 | 0.000968 | 0.00496 | 0.0254 | 0.0254 | 0.131 | 0 | 0.0000976 | 0.0005 |
| 5 | -0.00475 | -0.0244 | -0.125 | -0.125 | -0.641 | 0 | 0.000367 | 0.00188 |
| 6 | 0 | 0 | 0 | 0 | 0 | 0 | 0 | 0 |
| 7 | 0.00721 | 0.0369 | 0.189 | 0.189 | 0.189 | 0 | -0.000557 | -0.00285 |
| 8 | 0.00018 | 0.000921 | 0.00472 | 0.00472 | 0.0242 | 0 | -0.000129 | -0.000661 |
| 9 | 0.318 | 0.551 | 0.955 | 1.01 | 1.76 | 0.0596 | 0.000152 | 0.000263 |
| 10 | 1.17e-12 | 3.82e-9 | 0.0000125 | 0.0000125 | 0.0407 | 0 | 0.00000014 | 0.000458 |
| 11 | -5.72e-12 | -1.87e-8 | -0.000061 | -0.000061 | -0.199 | 0 | 5.26e-7 | 0.00172 |
| 12 | 0.422 | 1.25 | 3.67 | 3.92 | 11.5 | 0.245 | -0.00449 | -0.0132 |
| 13 | 0.0573 | 0.0331 | 0.0191 | -0.0319 | -0.0184 | -0.051 | -0.00145 | -0.000835 |
| 14 | 0.225 | 0.656 | 1.91 | 2.36 | 6.87 | 0.443 | -0.00405 | -0.0118 |
| 15 | 0.065 | 0.0911 | 0.128 | 0.0969 | 0.136 | -0.0306 | -0.000506 | -0.000709 |
| 16 | -0.965 | -2.04 | -4.33 | -4.36 | -9.23 | -0.0268 | 0.00606 | 0.0128 |
| 17 | -0.557 | -1.95 | -6.84 | -7.69 | -27 | -0.856 | 0.0059 | 0.0207 |
| 18 | 0 | 0 | 0 | 0 | 0 | 0 | 0 | 0 |
| 19 | 0.0436 | 0.216 | 1.07 | 1.58 | 7.8 | 0.504 | -0.00178 | -0.00882 |
| 20 | 0.642 | 1.44 | 3.22 | 3.31 | 7.41 | 0.0973 | -0.00238 | -0.00532 |
| TOTAL | -0.0645 | 0.0286 | -0.2808 | 0.0131 | -0.0848 | 0.2851 | -0.00287 | -0.00807 |

FIG. 38

| SWITCH OPERATION/ REGISTER CONTENTS | CONTROL DETAILS OF VARIABLE-FOCAL-LENGTH LENSES | | | | | | |
|---|---|---|---|---|---|---|---|
| | RADIUS OF CURVATURE OF OPTICAL SURFACE S | | POSITION OF OPTICAL SURFACE S | | | | |
| MAGNIFICATION m | FOCAL LENGTH f | R3 | R9 | d2 | d3 | d8 | d9 |
| 0.4 | 9.95 | 6.033 | -15.083 | 2.6 | 6.4 | 6 | 3 |
| 0.6 | 15.06 | 13.575 | -22.625 | 2.9 | 6.1 | 5.2 | 3.8 |
| 0.8 | 20.16 | 36.2 | -45.25 | 4.1 | 4.9 | 5.1 | 3.9 |
| 1 | 25.08 | FLAT | FLAT | 4.5 | 4.5 | 4.5 | 4.5 |
| 1.5 | 36.45 | -27.15 | 18.1 | 5.5 | 3.5 | 3.2 | 5.8 |
| 2 | 46.4 | -18.1 | 9.05 | 5.8 | 3.2 | 2 | 7 |
| ... | ... | ... | ... | ... | ... | ... | ... |

CAMERA WHICH INCORPORATES A LENS UNIT THAT CAN PROGRAM AN OPTICAL PROPERTY AND A CORRESPONDING METHOD

BACKGROUND OF THE INVENTION

The present invention relates to an optical unit including a plurality of lenses and a camera and optical equipment which incorporate the optical unit.

Conventionally, an optical unit of optical equipment such as a camera includes a plurality of lenses, and the focal length and magnification can be adjusted by exchanging and moving part of the lenses. When lenses are exchanged, however, manhours are required for exchanging lenses, and there exists a risk that dust enters the interior of a camera when lenses are exchanged. In addition, when the lenses are moved, since the shapes of the lenses themselves do not change, there is imposed a limitation on the range of adjustment.

Incidentally, in recent years, optical units have been developed which incorporate lenses in which an optical property such as focal length can be adjusted or so-called variable property lenses. According to these optical units, it is considered that the optical properties of the whole optical unit can be adjusted over a wide range by adjusting the optical properties of the variable property lenses.

However, even in the event that the optical properties of the lenses can be changed, expert knowledge and a plenty of experience is required in order to design an optical unit by combining the optical properties of the respective lenses. Due to this, it is difficult for ordinary users to adjust the optical properties of the optical unit to their own preferences.

A problem that the invention is to solve is to provide an optical unit, a camera and optical equipment which can facilitate the acquiring of a desired optical property.

SUMMARY OF THE INVENTION

According to an aspect of the invention, there is provided a camera which incorporates a lens unit which can program an optical property, comprising:

a plurality of optical elements which are disposed on an optical axis of the lens unit;

an electronic control unit for changing an optical property with respect to an optical path of the whole lens unit by changing the state of the plurality of optical elements within the lens unit through electronic control;

an instruction unit for instructing the control of the state of the plurality of optical elements so that the optical property with respect to the optical path of the whole lens unit at the time of photographing falls within part of a whole range that can be changed by the electronic control unit; and a photographing control unit for controlling the state of the plurality of optical elements that is changed by the electronic control unit based on an instruction by the instruction unit at the time of photographing so that the optical property with respect to the optical path of the whole lens unit falls within the part of the whole range that can be changed by the electronic control unit.

In addition, according to another aspect of the invention, there is provided a lens unit which can program an optical property, comprising:

a detachable unit adapted to be detached from a camera;

a plurality of optical elements disposed on an optical axis of the lens unit;

an electronic control unit for changing an optical property of the whole lens unit by changing the state of the plurality of lens elements within the lens unit through electronic control;

an instruction unit for instructing the control of the state of the plurality of optical element at the time of photographing so that an optical property designated with respect to an optical path of the whole lens unit falls within a designated range of a whole range that can be changed by the electronic control unit; and a photographing control unit for controlling the state of the plurality of optical elements that is changed by the electronic control unit at the time of photographing so that an optical property designated by the instruction unit falls within the range designated by the instruction means.

Additionally, according to a further aspect of the invention, there is provided a method for controlling a camera incorporating an electronic control unit for changing the state of a plurality of optical elements disposed on an optical axis of a lens unit through electronic control to thereby change an optical property with respect to an optical path of the whole lens unit, comprising the steps of:

setting an operation mode of the camera to a design mode;

instructing the control of the state of the plurality of optical elements when the design mode is set so that the optical property with respect to the optical path of the whole lens unit falls within part of a whole range that can be changed by the electronic control unit;

setting the operation mode of the camera to a photographing mode; and controlling the state of the plurality of optical elements that is changed by the electronic control unit based on a detail designated during the design mode when the photographing step is set so that the optical property with respect to the optical path of the whole lens unit falls within the part of the whole range that can be changed by the electronic control unit.

BRIEF DESCRIPTION OF THE DRAWINGS

Then, FIG. 10A is a table showing variable design parameters of a zoom lens unit and FIG. 10B is a table showing results of an operation of ray tracing simulation in the zoom lens unit shown in FIG. 10A. In addition.

In addition, FIG. 25 is a table showing aberrations when data of FIG. 10A are used.

Then.

Furthermore, FIGS. 33A to 33B and 34 show diagrams showing other embodiments of zoom lens units, FIGS. 35A, 35B are design data of the zoom lens unit shown in FIG. 34, FIG. 36 is a table showing aberrations when the design data shown in FIGS. 35A, 35B are used.

Then, FIG. 38 is a table showing details of control data in a customized control program.

DESCRIPTION OF THE PREFERRED EMBODIMENTS OF THE INVENTION

Hereinafter, embodiments of the invention will be described based on the drawings.

Figure 1A:
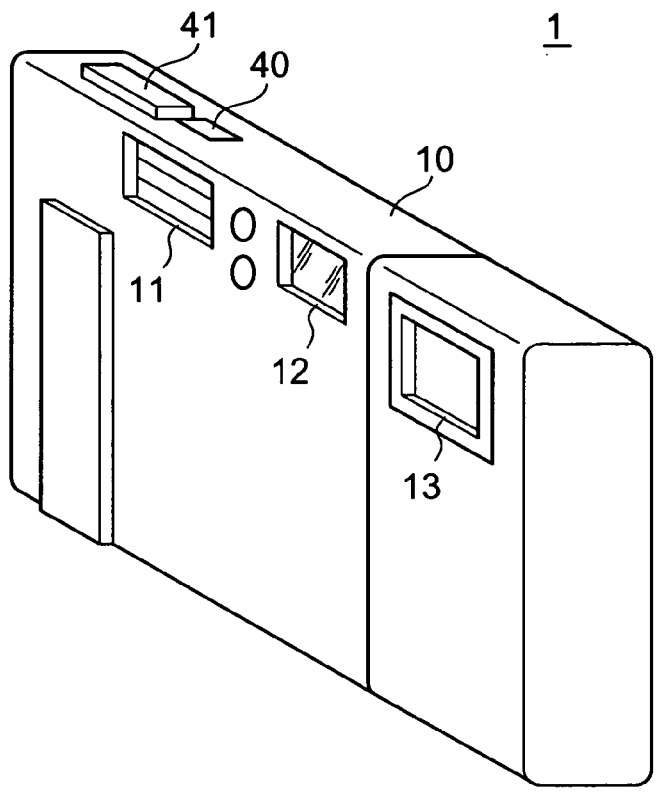
FIGS. 1A and 1B are external views of a camera according to the invention.

FIG. 1A is an external view of a camera 1 according to the invention.

Figure 2:
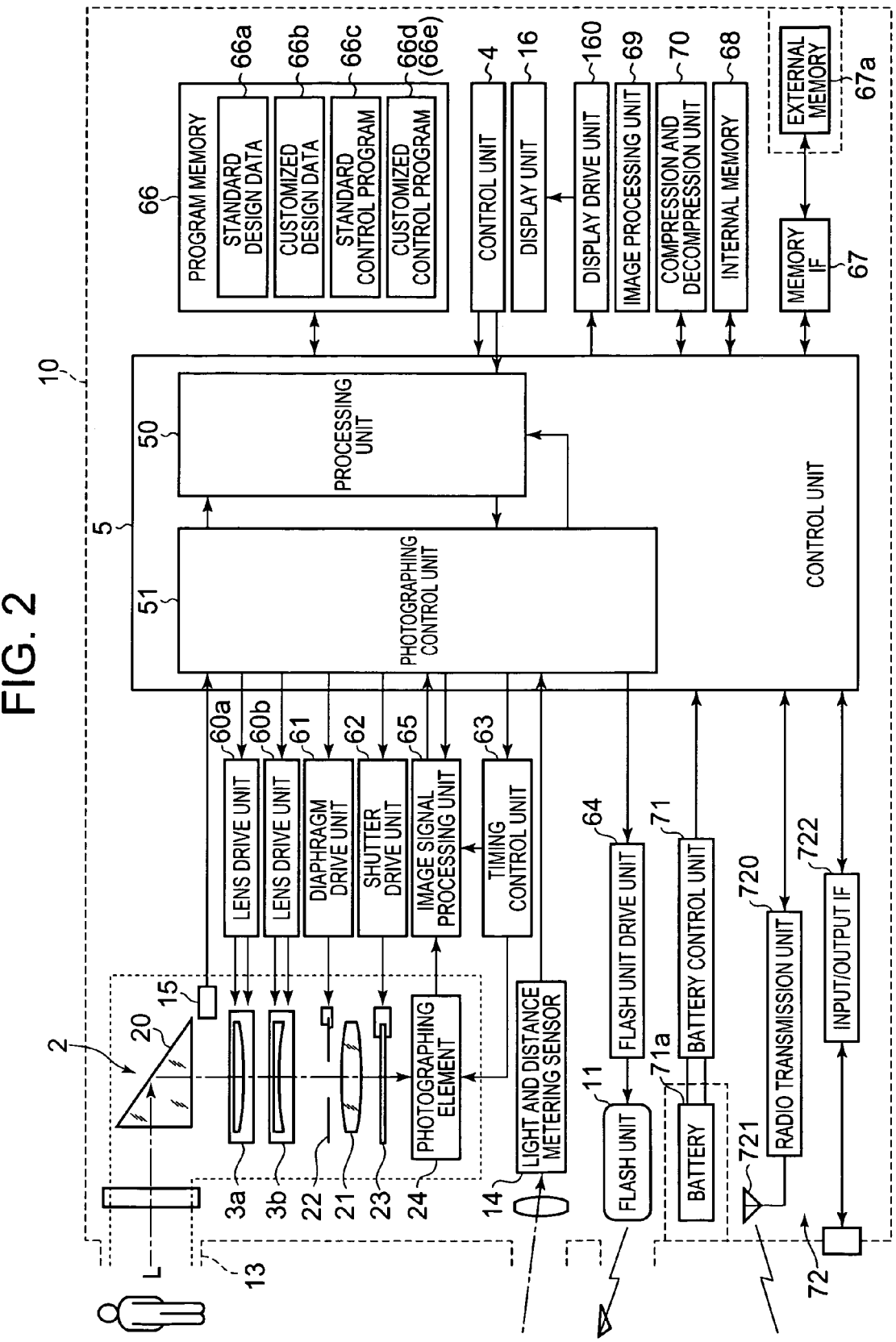
FIG. 2 is a block diagram of the camera according to the invention. Then.

As shown in the figure, the camera 1 is a so-called compact camera and includes a strobe or flash unit 11, a viewfinder eyepiece 12, a photographing light intake window 13 and a light and distance metering sensor 14 which are placed on a front side of a casing 10 (refer to FIG. 2).

The flash unit 11 is such as to emit a flash light to a subject. A conventionally known flash unit is used as this flash unit 11. The viewfinder eye piece 12 is a window used by the user of the camera for confirming a photographing range and is provided in parallel with the photographing light intake window 13. The photographing light intake window 13 is a window for taking in light from the subject into the interior of the casing 10. As shown in FIG. 2, a temperature sensor 15 and a zoom lens unit 2, which is an optical unit according to the invention, are provided further inward of the casing 10 in such a manner as to be situated close to each other.

The temperature sensor 15 is such as to measure the temperature in the interior of the casing 10 and more particularly the temperature in the vicinity of the zoom lens unit 2.

The zoom lens unit 2 includes a prism 20, variable-focal-length lenses 3a, 3b and a rigid lens 21 as a group of optical elements in the invention. These optical elements are arranged vertically in this order along an optical axis L.

The prism 20 is such as refract light that has entered from the photographing light intake window 13 so as to cause the light so refracted to be incident on the variable-focal-length lens 3a therebelow.

Figure 3A:
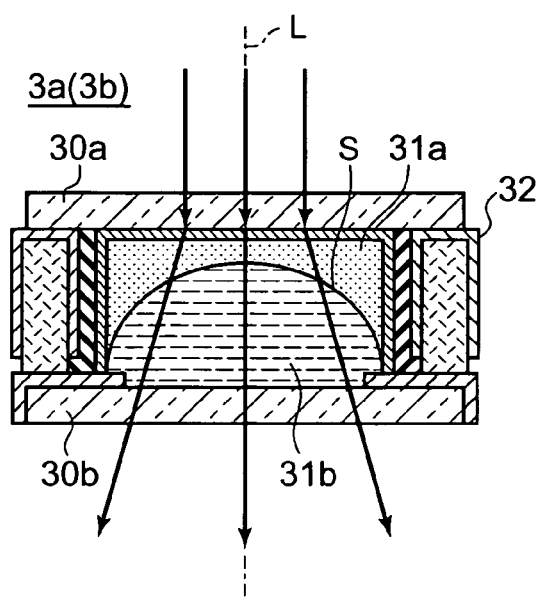
FIGS. 3A to 3C are sectional views of a variable-focal-length lens.
Figure 3B:
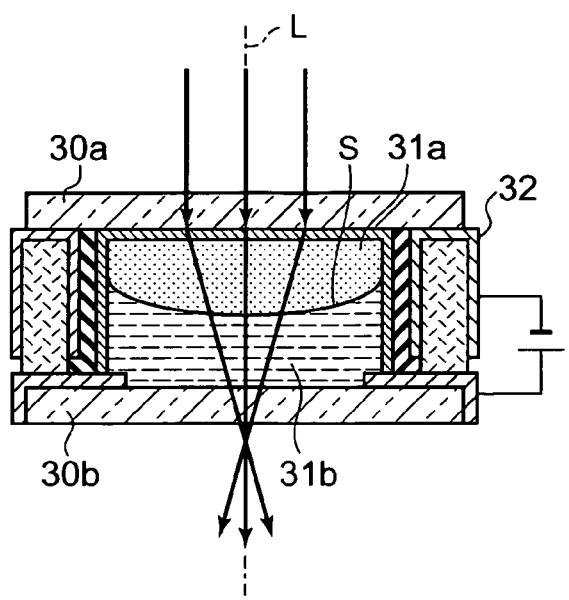
Figure 3C:
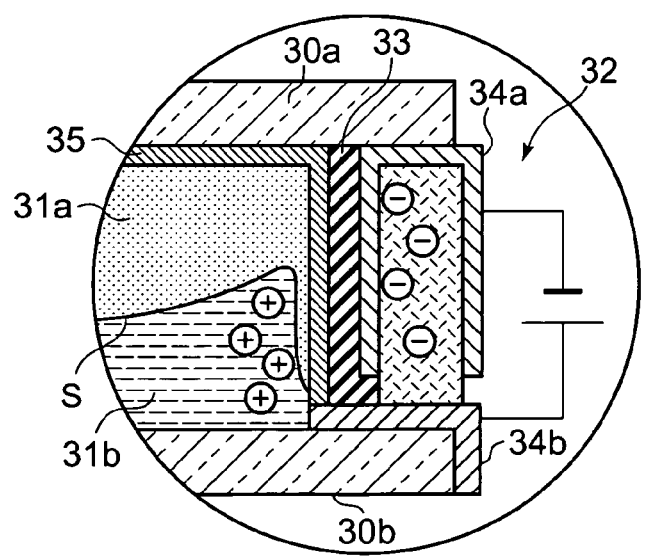
Figure 4A:
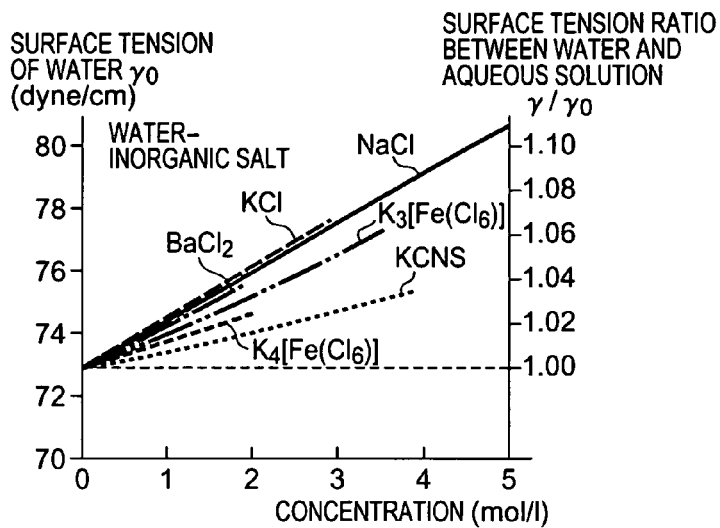
FIGS. 4A to 4D show relationships between the concentrations of aqueous solutions and surface tension.
Figure 4B:
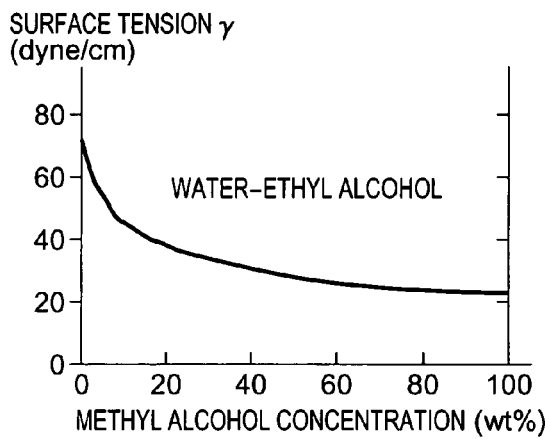
Figure 4C:
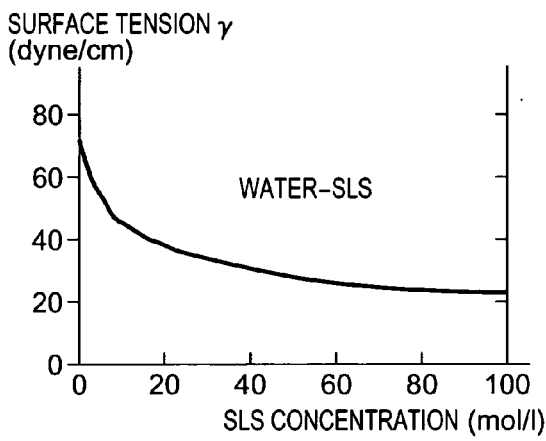
Figure 4D:
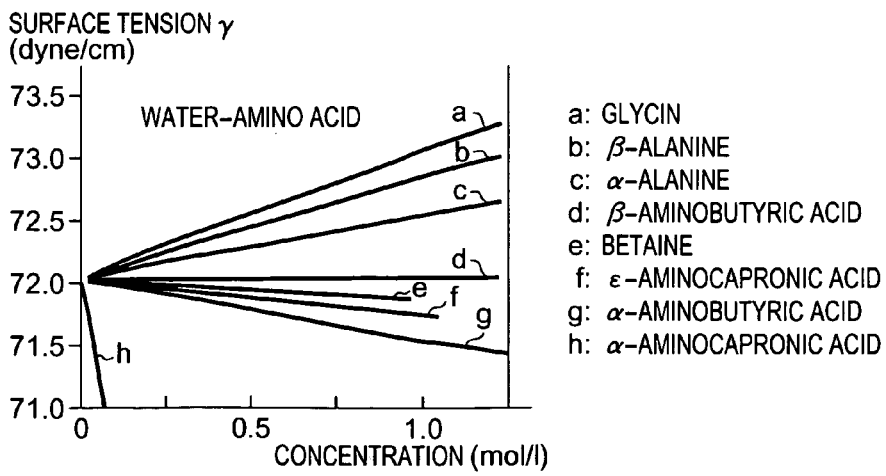

The variable-focal-length lenses 3a, 3b are variable-focal-length optical elements in the invention and are fixedly provided on the optical axis in a horizontal state. As shown in FIGS. 3A to 3C, these variable-focal-length lenses 3a, 3b each include two transparent plates 30a, 3b.

The transparent plates 30a, 30b are discs or circular plates made from acrylic resin and polycarbonate resin, and the transparent plate 30a is provided in such a manner as to be situated direct above the transparent plate 30b. Here, when these transparent lenses 30a, 30b are regarded as lenses, their focal lengths $f_{Ta}$, $f_{Tb}$ are expressed by the following equations (1), (2).

$$1/f_{Ta}=(n_{Ta}-1)(1/R_{Ta1}-1/R_{Ta2})+(n_{Ta}-1)^2 \cdot dL_{Ta}/(n_{Ta} \cdot R_{Ta1} \cdot R_{Ta2}) \quad (1)$$

$$1/f_{Tb}=(n_{Tb}-1)(1/R_{Tb1}-1/R_{Tb2})+(n_{Tb}-1)^2 \cdot dL_{Tb}/(n_{Tb} \cdot R_{Tb1} \cdot R_{Tb2}) \quad (2)$$

where, in Equation (1), "$R_{Ta1}$", "$R_{Ta2}$" are radii of curvatures of upper and lower surfaces of the transparent plate 30a, "$n_{Ta}$" is a refractive index of the transparent plate 30a, and "$dL_{Ta}$" is the thickness of the transparent plate 30a. Similarly, in Equation (2), "$R_{Tb1}$", "$R_{Tb2}$" are radii of curvatures of upper and lower surfaces of the transparent plate 30b, "$n_{Tb}$" is a refractive index of the transparent plate 30b, and "$dL_{Tb}$" is the thickness of the transparent plate 30b.

Two types of liquids 31a, 31b are interposed between the transparent plates 30a, 30b as fluids of the invention.

These liquids 31a, 31b are not mixed with each other but are separated vertically in this order and they have different refractive indices. Due to this, an optical surface S is formed between these liquids 31a, 31b by an interface between these two fluids.

In addition, one of the liquids 31a, 31b is a non-conductive liquid and the other is a conductive liquid.

For example, liquids shown in the following table 1 can be used as these liquids 31a, 31b. As combinations of the liquids 31a, 31b, for example, there are a combination in which silicone oil is used as the liquid 31a and an aqueous solution is used as the liquid 31b, a combination in which an immersion oil is used as the liquid 31a and a glycol system anti-freeze is used as the liquid 31b, a combination in which a fluorine system inactive liquid is used as the liquid 31a and an aqueous solution is used as the liquid 31b and the like. Here, the liquids 31a, 31b are preferably prepared so as to have substantially the same specific gravity from the viewpoint of reducing the deformation of the optical surface S due to gravity and posture. In the embodiments of the invention, an immersion oil or a dimethyl silicone oil is used as the liquid 31a and an aqueous solution is used as the liquid 31b.

TABLE 1

| Designation of Liquids | Surface tension γ dym/cm (20° C.) | viscosity (Coefficient of Viscosity) η cP (25° C.) | Specific gravity | Relative dielectric constant K ε (20° C.) | Refractive index nD (20° C.) |
| --- | --- | --- | --- | --- | --- |
| 1 Water (Aqueous solution) | 72.8 | 0.89 | 1.00 | 80.4 | 1.333 |
| 2 Aniline | 42.0 | 3.82 | 1.02 | 6.9 | 1.586 |
| 3 Aceton | 21.0 | 0.31 | 0.79 | 20.7 | 1.362 |

TABLE 1-continued

| Designation of Liquids | Surface tension γ dym/cm (20° C.) | viscosity (Coefficient of Viscosity) η cP (25° C.) | Specific gravity | Relative dielectric constant K ε (20° C.) | Refractive index nD (20° C.) |
|---|---|---|---|---|---|
| 4 Ethyl alcohol | 22.3 | 1.08 | 0.79 | 24.3 | 1.362 |
| 5 Glycerin | 63.4 | 1069 | 1.26 | 42.5 | 1.473 |
| 6 Diethyl ether | 17.0 | 0.22 | 0.72 | 4.3 | 1.354 |
| 7 Carbon tetrachloride | 27.6 | 0.91 | 1.59 | 2.2 | 1.461 |
| 8 Methylene iodide (diiodomethane) | 50.8 | | 3.32 | | 1.737 |
| 9 Cedar wood oil | | | 0.95 | 2.5 | 1.516 |
| 10 Castor oil | | 700 | 0.96 | 2.2 | 1.478 |
| 11 Paraffin oil | 26.4 | | 0.85 | 2.2 | 1.480 |
| 12 Benzene | 28.9 | 0.60 | 0.88 | 2.3 | 1.501 |
| 13 Methyl alchohol | 22.6 | 0.54 | 0.79 | 32.6 | 1.329 |
| 14 Ethylene glycol (Anti-freeze) | 48.4 | 4.23 | 1.12 | 38.7 | 1.431 |
| 15 Fluorine system inactive liquid (Fluorinert, FC | 13 | 0.55 | 1.73 | 1.8 | 1.261 |
| 16 Dimethyl silicone oil | 21.2 | 10-10000 | 0.97 | 2.2 | 1.403 |
| 17 Methylphenyl silicon oil | 25.2 | 400 | 1.07 | 2.2 | 1.505 |
| 18 Methyl hydrogen silicone oil | 20.0 | 20 | 1.00 | 2.2 | 1.395 |
| 19 Immersion oil (Type A) | | 150 | 0.92 | | 1.515 |
| 20 Immersion oil (Type NVH) | | 21000 | 0.91 | | 1.515 |

Note that in Table 1, the "Fluorinert" is a trade name of a product by the 3M Inc.

TABLE 2

| | Refractive index n (C.) 656.3 nm | Refractive index n (d) 587.6 nm | Refractive index n (e) 546.1 nm | Refractive Index n (F.) 486.1 nm | nF-nC | Abbe numbers ν d |
|---|---|---|---|---|---|---|
| Immersion oil (Type A) | 1.5115 | 1.5150 | 1.5180 | 1.5239 | 0.0124 | 41.53 |
| Immersion oil (Type B) | 1.5115 | 1.5150 | 1.5180 | 1.5236 | 0.0121 | 42.56 |
| Immersion oil (Type NVH) | 1.5118 | 1.5150 | 1.5178 | 1.5230 | 0.0112 | 45.98 |
| Immersion oil (Type OVH) | 1.5118 | 1.5150 | 1.5178 | 1.5230 | 0.0112 | 45.98 |
| Immersion oil (Type DF) | 1.5118 | 1.5150 | 1.5180 | 1.5234 | 0.0116 | 44.40 |
| Immersion oil (Type FF) | 1.4766 | 1.4790 | 1.4810 | 1.4850 | 0.0084 | 57.02 |
| Optic glass (BK7) | 1.5139 | 1.5163 | 1.5183 | 1.5219 | 0.0081 | 64.14 |
| Optic glass (F2) | 1.6150 | 1.6200 | 1.6241 | 1.6321 | 0.0171 | 36.26 |
| Vitreous silica | 1.4560 | 1.4580 | 1.4600 | 1.4630 | 0.0070 | 65.43 |
| PMMA (Acryl) | 1.4892 | 1.4918 | 1.4978 | 1.4978 | 0.0086 | 57.45 |
| PC (Polycarbonate) | 1.579 | 1.584 | 1.5886 | 1.5965 | 0.0175 | 33.37 |
| Water | 1.3311 | 1.3340 | 1.3345 | 1.3380 | 0.0069 | 48.41 |

In addition, in Table 1, a solute for the aqueous solution may be inorganic or organic. As inorganic matters to be solved, there are raised inorganic chlorides such as potassium chloride (kcl), sodium chloride (NaCl), barium chloride ($BaCl_2$), potassium hexacyaoferrate (III) ($K_3[Fe(Cl_6)]$), potassium hexacyanoferrate (II) ($K_4[Fe(Cl_6)]$), potassium thiocyanate (KCNS). In addition, as organic matters to be solved, there are raised, for example, alcohols, amino acids, various types of surface-tension modifiers and the like. Here, as shown in FIGS. 4A to 4D, the surface tension (interfacial tension) of the aqueous solution varies according to concentrations. Due to this, the concentration of the aqueous solution is preferably set so that the radius of curvature of the optical surface S falls within a predetermined range.

Furthermore, in Table 1, as the immersion oils, immersion oils shown in the following table 2 may be used in place of the "Type A" and "Type B", and furthermore, an immersion oil combined with an immersion oil for an oil immersion microscope maybe used. Here, the "Type A" oil is a low viscosity synthetic oil for short focus observation in which terphenyl, terphenyl hydride, polybutane, hydrocarbon and the like are mixed together, the "Type B" oil is an intermediate viscosity synthetic oil for lenses for medical equipment, and the "Type NVH" and "Type OVH" oils are high viscosity synthetic oils for long distance observation.

Note that in Table 2 above, in addition to optical properties of the immersion oils, optical properties of the optical glass "BK7" (trade name) by Schott Glas Inc are also shown.

Here, when these liquids 31a, 31b are regarded as lenses, their focal lengths $f_{Ea}$, $f_{Eb}$ are expressed by the following equations (3), (4).

$$1/f_{Ea} = (n_{Ea}-1)(1/R_{Ea1} - 1/R_{Ea2}) + (n_{Ea}-1)^2 \cdot dL_{Ea}/(n_{Ea} \cdot R_{Ea1} \cdot R_{Ea2}) \quad (3)$$

$$1/f_{Eb} = (n_{Eb}-1)(1/R_{Eb1} - 1/R_{Eb2}) + (n_{Eb}-1)^2 \cdot dL_{Eb}/(n_{Eb} \cdot R_{Eb1} \cdot R_{Eb2}) \quad (4)$$

where, in Equation (3), "$R_{Ea1}$", "$R_{Ea2}$" denote radii of curvatures of upper and lower surfaces of the liquid 31a, "$n_{Ea}$" denotes the refractive index of the liquid 31a, and "$d_{LEa}$" denotes the thickness of the liquid 31a on the optical axis. Similarly, in Equation 4, "$R_{Eb1}$", "$R_{Eb2}$" denote radii of curvatures of upper and lower surfaces of the liquid 31b, "$n_{Eb}$" denotes the refractive index of the liquid 31b, and "$d_{LEb}$" denotes the thickness of the liquid 31b on the optical axis.

Note that assuming that the radii of the liquids 31a, 31b is "r" and the height thereof is "h", the contact angle θ and the radii R of the liquids 31a, 31b can be obtained as shown by the following Equations (5), (6).

$$\theta = 2\tan^{-1}(h/r) \quad (5)$$

$$R = r/\sin\theta \quad (6)$$

An annular electrode portion 32 is provided on an outside of the liquids 31a, 31b.

This electrode portion 32 includes, as shown in FIG. 3C, an insulation layer 33 and electrodes 34a, 34b and seals in the liquids 31a, 31b together with the transparent plates 30a, 30b.

The insulation layer 33 has a nature that conducts no electricity, surrounds the liquids 31a, 31b from the side thereof and is interposed between the electrode 34a and the electrode 34b at an outer circumferential portion. A water repulsive layer 35 is provided on an inner circumferential surface of the insulation layer 33 and a lower surface of the transparent plate 30a and produces such a state that the liquid 31a is surrounded by the liquid 31b and the water repulsive layer 35.

The water repulsive layer 35 is formed from, for example, any of compounds shown in the following table 3. Here, as shown in the table, the contact angle of the liquid 31a varies depending on compounds. Due to this, the type of a compound is preferably set so that the curvature of the optical surface S falls within a predetermined range.

TABLE 3

| Compounds | Surface orientation group | Critical surface tension γ c (mN/m) | Contact angle θ (°) |
|---|---|---|---|
| Perfluorolauric acid monomolecular film | —CF$_3$ | 6 | — |
| Polytetrafluoroethylene | —CF$_2$— | 18 | 108 |
| Poly, perfluorooctyl ethyl acrylate | —CF$_3$, —CF$_2$— | 10 | 120 |
| Octadecyl amine monomolecular film | —CH$_3$ | 22-24 | 102 |
| Polyethylene | —CH$_2$— | 31 | 94 |
| Paraffin | —CH$_3$, —CH$_2$— | 22 | 108 |
| Polydimethyl siloxane | —CH$_3$ | 24 | 101 |

Note that in place of the compounds shown in Table 3, a layer may be used as the water repulsive layer 35 which is coated with polyethylene terephthalate (PET) and ethylene tetrafluoride ethylene copolymer (ETFE), clear acrylic urethane, clear acrylic melamine, polyvinyl chloride and the like. Alternately, a hydrophobic film of polyethylene terephthalate, polyethylene (PE), polypropylene (PP), polystyrene (PS), polycarbonate (PB) and the like may be used. Furthermore, a film may be used which is formed by applying evenly dimethyl silicone oil or methyl hydrogen silicone oil and thereafter heating the silicone oil so applied. When the heating treatment is applied like this, it is preferable to reduce the heating temperature by using organic acid salts such as dibutyltin dilaurate and iron actuate as a curing catalyst.

In addition, the interface tension of the liquids 31a, 31b may be adjusted using, in place of the water repulsive layer 35, a water soluble resin such as polyvinyl alcohol and a hydrophilic film such as the "SC film" (trade name: produced by KANSAI PAINTCo., Ltd.). Here, the SC film is a film produced by coating a clear hydrophilic layer on a film of polyethylene terephthalate.

The electrodes 34a, 34b are transparent conductive films formed of tin oxide (SnO$_2$), indium oxide (In$_2$O$_3$), indium-tin oxide (ITO) and the like. These electrodes 34a, 34b are designed to apply voltages to the liquids 31a, 31b via the insulation layer 33 and the water repulsive layer 35 to thereby change the shape of the optical surface S, whereby, as shown in FIGS. 3A, 3B, the focal lengths of the variable-focal-length lenses 3a, 3b are changed as a result.

To be specific, in a state where no voltage is impressed, as shown in FIG. 3A, the optical surface S is curved upwardly from below so as to project at the center thereof by virtue of the interface tension of the liquids 31a, 31b. Here, since the refractive index (about 1.4 to 1.5) of the liquid 31a is greater than the refractive index (about 1.33) of the liquid 31b and the refractive index (about 1.0) of air, when the optical surface S is convex upwardly as is described above, the variable-focal-length lenses 31a, 31b have a negative refracting force as a whole and function as a concave lens. Note that when the refractive index of the liquid 31a is smaller than the refractive index of the liquid 31b, the direction of refracting force of the variable-focal-length lenses 3a, 3b is then reversed. In addition, the interface tension $\gamma_{EaEb}$ between the liquid 31a and the liquid 31b is expressed by the following equation (7) using the interface tension $\gamma_{EbTb}$ between the liquid 31b and the transparent plate 30b, the interface tension $\gamma_{Eatb}$ between the liquid 31a and the transparent plate 30b and the contact angle θ of the liquid 31b.

$$\gamma_{EaTb} = \gamma_{EbTb} + \gamma_{EaEb} \cdot \cos\theta \quad (7)$$

When a voltage is impressed to the electrodes 34a, 34b from this state, as shown in FIG. 3C, an electrical double layer is formed on an interface on an electrode 34a side of the liquid 31b and in the interior of the liquid 31b, and as a result of changes in interface tension and contact angle of the liquids 31a, 31b, the upward swelling of the optical surface S is reduced. Then, the voltage so impressed is increased, the optical surface becomes flat, and furthermore, as shown in FIG. 3B, the optical surface is curved so as to project downwards. Thus, when the direction of swelling of the optical surface is changed from upward to downward, the total refracting force of the variable-focal-length lenses 3a, 3b changes from negative to positive. Namely, the function of the variable-focal-length lenses 3a, 3b changes from the concave lens to a convex lens.

Figure 5A:
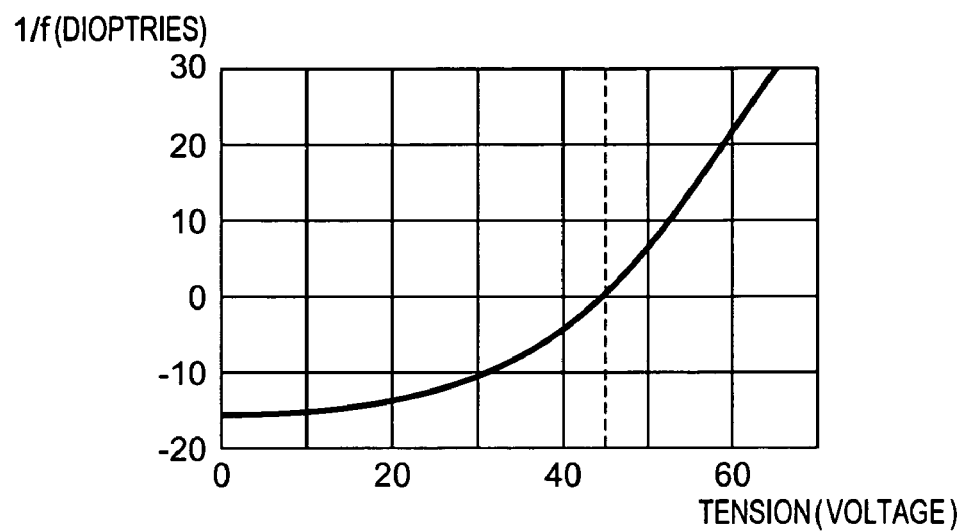
FIG. 5A shows a relationship between impressed voltages impressed to a variable-focal-length lens and curvature diopters.
Figure 5B:
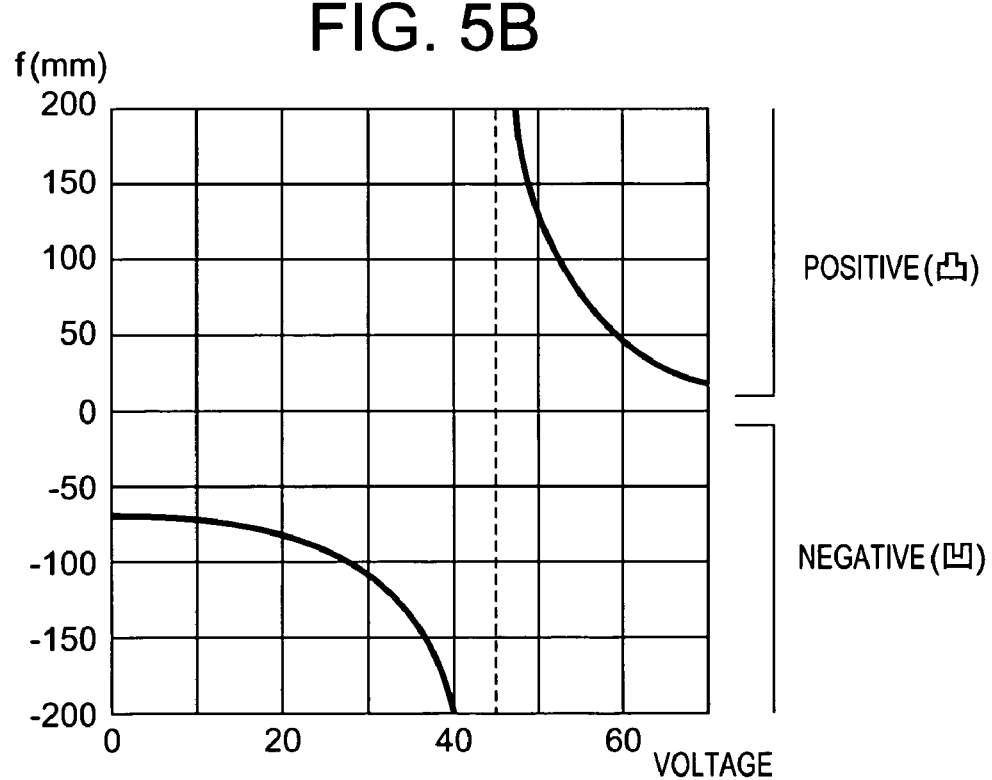
FIG. 5B shows a relationship between impressed voltages and focal lengths. In addition.

Here, a relationship between impressed voltages impressed to the variable-focal-length lenses 3a, 3b and curvature diopters (diopter=refractive index of a medium/focal length f) is shown in FIG. 5A, and a relationship between voltages so impressed and focal lengths f is shown in FIG. 5B. As shown in these figures, when there is impressed no voltage or an impressed voltage is small, the variable-focal-length lenses 3a, 3b function as a concave lens having a negative refractive index. On the other hand, an impressed voltage is greater than a predetermined voltage (about 45V in the figure), the variable-focal-length lenses 3a, 3b function as a convex lens having a positive refractive index.

The focal lengths fa, fb of the variable-focal-length lenses 3a, 3b are calculated in a way expressed by the following equations (8), (9).

$$f_a = f_{a1} \times f_{a2}/(f_{a1} + f_{a2}) \quad (8)$$

$$f_b = f_{b1} \times f_{b2}/(f_{b1} + f_{b2}) \quad (9)$$

where, as shown in the following equations (10), (11), $f_{a1}$, $f_{b1}$ denote focal lengths of portions corresponding to the transparent plate 30a and the liquid 31a, respectively, and $f_{a2}$, $f_{b2}$ denote focal lengths of portions corresponding to the transparent plate 30b and the liquid 31b, respectively.

$$f_{a1}, f_{b1} = f_{Ta} \times f_{Ea}/(f_{Ta} + f_{Ea}) \quad (10)$$

$$f_{a2}, f_{b2} = f_{Tb} \times f_{Eb}/(f_{Tb} + f_{Eb}) \quad (11)$$

Figure 6A:
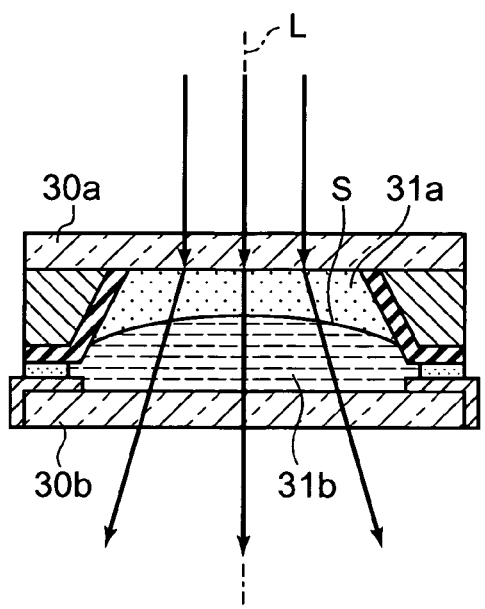
FIGS. 6A to 6C show another form of a variable-focal-length lens.
Figure 6B:
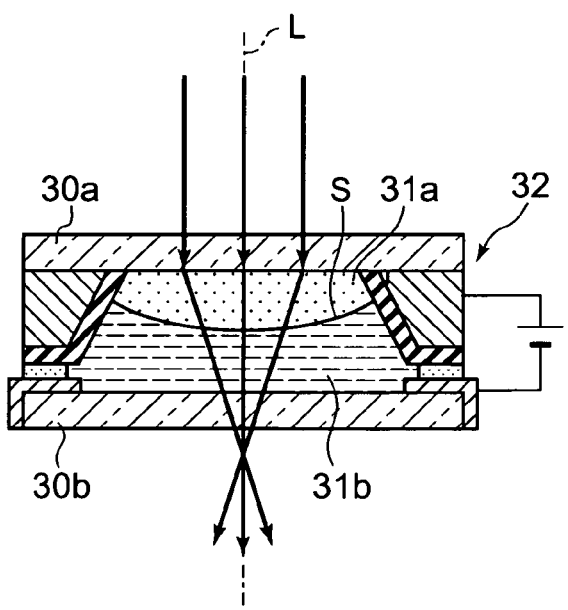
Figure 6C:
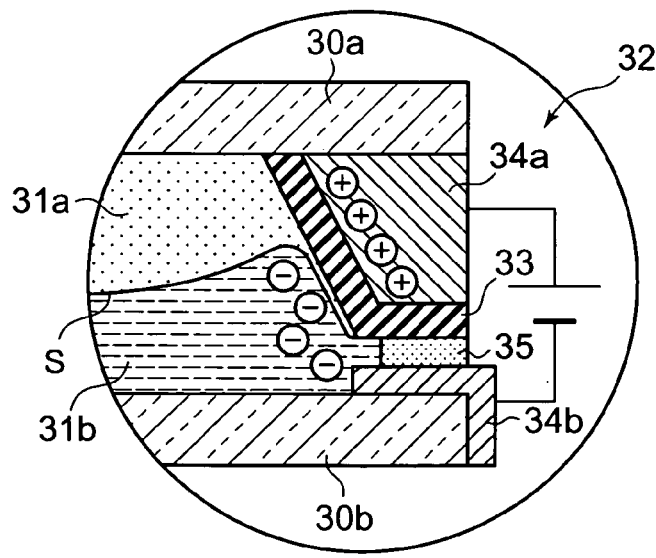

Note that as these variable-focal-length lenses 3a, 3b, while for example, the "Fluid Focus Lens" (trade name of the product by Royal Philips Electronics Inc.) can be used, the "PDN-1000 variable lens unit" (trade name of the product by Varioptics Inc.) shown in FIG. 6 may be used.

In addition, while the variable-focal-length lenses 3a, 3b have been described as changing their focal lengths by interfacial electrostatic phenomenon, the focal lengths may be changed by other principles and phenomena.

To be specific, as disclosed in, for example, "Electrocapillarity and wetting of insulator films by water, C. R. Acad. Sci. Paris, t.317, p. 157 (1993)" and Japanese translation of a PCT application publication No. 2001-519539, the focal lengths may be changed by adjusting the contact angle of a liquid by an electro wetting phenomenon to thereby deform an optical surface. As this occurs, assuming that a contact angle when the application voltage is V is "cos θ (V)" and a contact angle when the application voltage is 0 is "cos θ (0)", a relationship between the application voltage V and the contact angle θ is substantially expressed by the following equation (12) ("Development of positive electrode reaction field evaluation technique in a fused carbonate type fuel cell—Study of wetting mechanism of fused carbonate by impressed voltage—" by Koichi Asano [online], Electric Power Central Research Laboratory (Foundation), [retrieved on Sep. 30, 2004], refer to an internet address <URL: http://ge-rd-info.denken.or.jp/ge_cgi-bin/rep_details.cgi?r ep_num=WOOO22&host=>).

$$\cos \theta(V) = \cos \theta(0) + (1/2) \times (Cd/\gamma_{LG}) \times V^2 \qquad (12)$$

(where, Cd: electrical double layer capacity [μF/cm$^2$], γLG: surface tension [N/m] between gas phase and liquid phase)

In addition, as is closed in, for example, Japanese translation of a PCT application publication No. 11-513129, Japanese translation of a PCT application publication No. 2001-519539 and Japanese Unexamined Patent Publication No. 2001-13306, the focal lengths may be changed by adjusting the contact angle by making liquid in the vicinity of electrical double layers generated on the interface of the liquid and the interior fluid by electrokinetic phenomenon such as electrophoretic phenomenon or electroosmotic phenomenon to thereby deform an optical surface.

In addition, as is disclosed in U.S. Pat. No. 3,598,479 specification, U.S. Pat. No. 5,138,494 specification, U.S. Pat. No. 5,668,620 specification, Japanese Examined Utility Model Publication No. 40-28614, Japanese Examined Utility Model Publication No. 51-49956, Japanese Unexamined Patent Publication No. 55-36857, Japanese Unexamined Patent Publication No. 6-308303 and Japanese Unexamined Patent Publication No. 2002-311213, a structure in which liquid is filled between dilatant films is used as a variable-focal-length lens, and the focal length thereof may be changed by adjusting the volume and pressure of the liquid to thereby deform the surface of the liquid (an optical surface).

In addition, as is disclosed in, for example, Japanese Unexamined Patent Publication No. 2000-81504, Japanese Patent Publication No. 3400270, Japanese Unexamined Patent Publication No. 2002-311213 and Japanese Unexamined Patent Publication No. 2003-14909, the focal length may be changed by applying an external pressure to an elastic film that closely contacts liquid by means of a piezoelectric device or piezoelectric actuator to thereby deform an optical surface.

Additionally, as is disclosed in "Optical properties and molecular orientations in hybrid orientation liquid crystal electrooptical micro-lens" ("Optics" Vol. 20, No. 4 (April, 1991) and Japanese Patent Publication No. 3158016, the focal length may be changed by changing an oriented state of liquid crystal molecules between transparent substrates by electric field.

In addition, as is disclosed in Japanese Unexamined Patent Publication No. 2002-243918, the focal length may be changed by deforming a transparent substrate that closely contacts the surface of liquid (an optical surface) by electrostatic suction force to thereby deform the optical surface.

Figure 7:
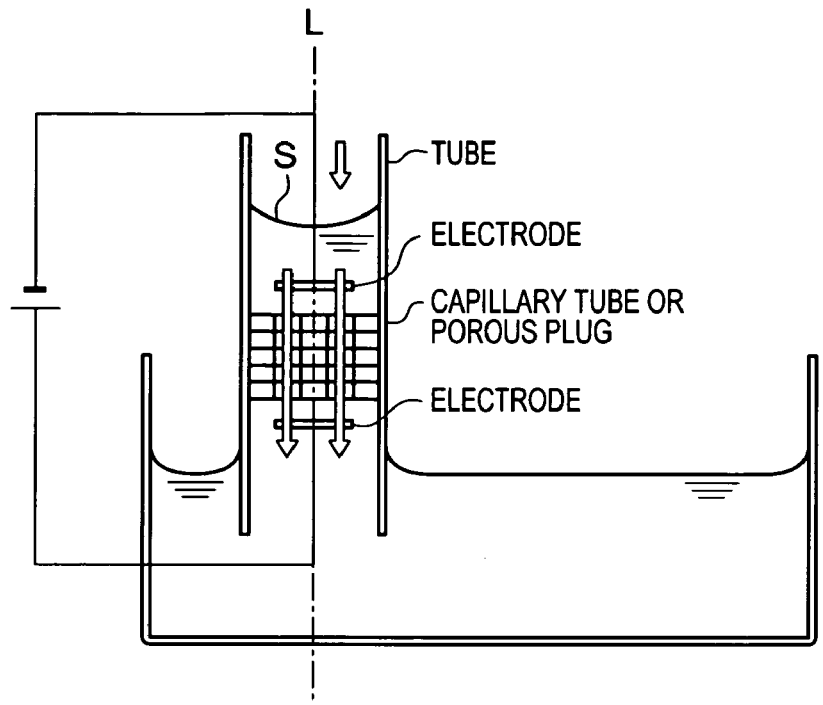
FIGS. 7 to 9 show forms of different variable-focal-length lenses.

Additionally, as shown in FIG. 7, the focal length may be changed by utilizing a liquid in the interior of a tube erected in the liquid as a variable optical device and generating a potential difference (streaming potential) between ends of a capillary tube or porous plug in the tube to thereby change the shape and height of the liquid surface (optical surface) in the tube.

Figure 8:
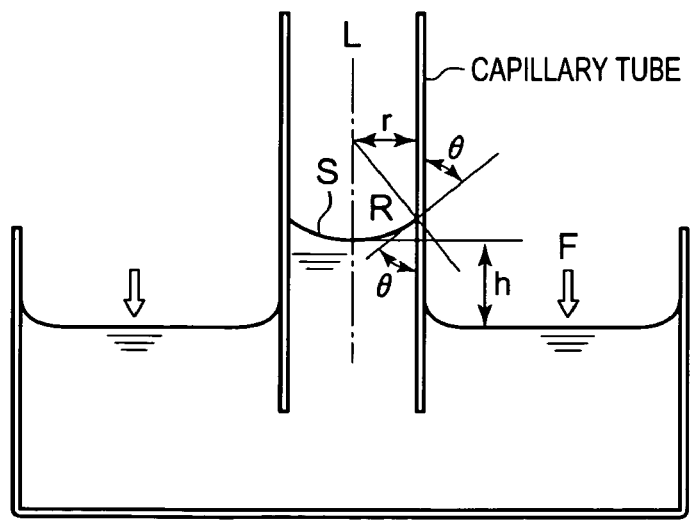

Additionally, as shown in FIG. 8, the focal length may be changed by utilizing a liquid in the interior of a capillary tube erected in a transparent bath as a variable optical device and adjusting a pressure F applied to the liquid surface in the bath to thereby change the shape and height of the liquid surface (optical surface) in the interior of the capillary tube. As this occurs, assuming that the surface tension of the liquid surface is "γ", the pressure variation is "ΔF", the density difference between liquid phase and gas phase is "Δρ", the gravitational acceleration is "g", and the radius of the capillary tube is "r", and the angle θ is set as shown in FIG. 8, the curvature C and height h of the liquid surface in the capillary tube are expressed by the following equations (13), (14).

$$C = 2\gamma/\Delta F (= 2\gamma/\Delta \rho g h) \qquad (13)$$

$$h = 2\gamma \cos \theta / \Delta \rho r g \qquad (14)$$

Figure 9:
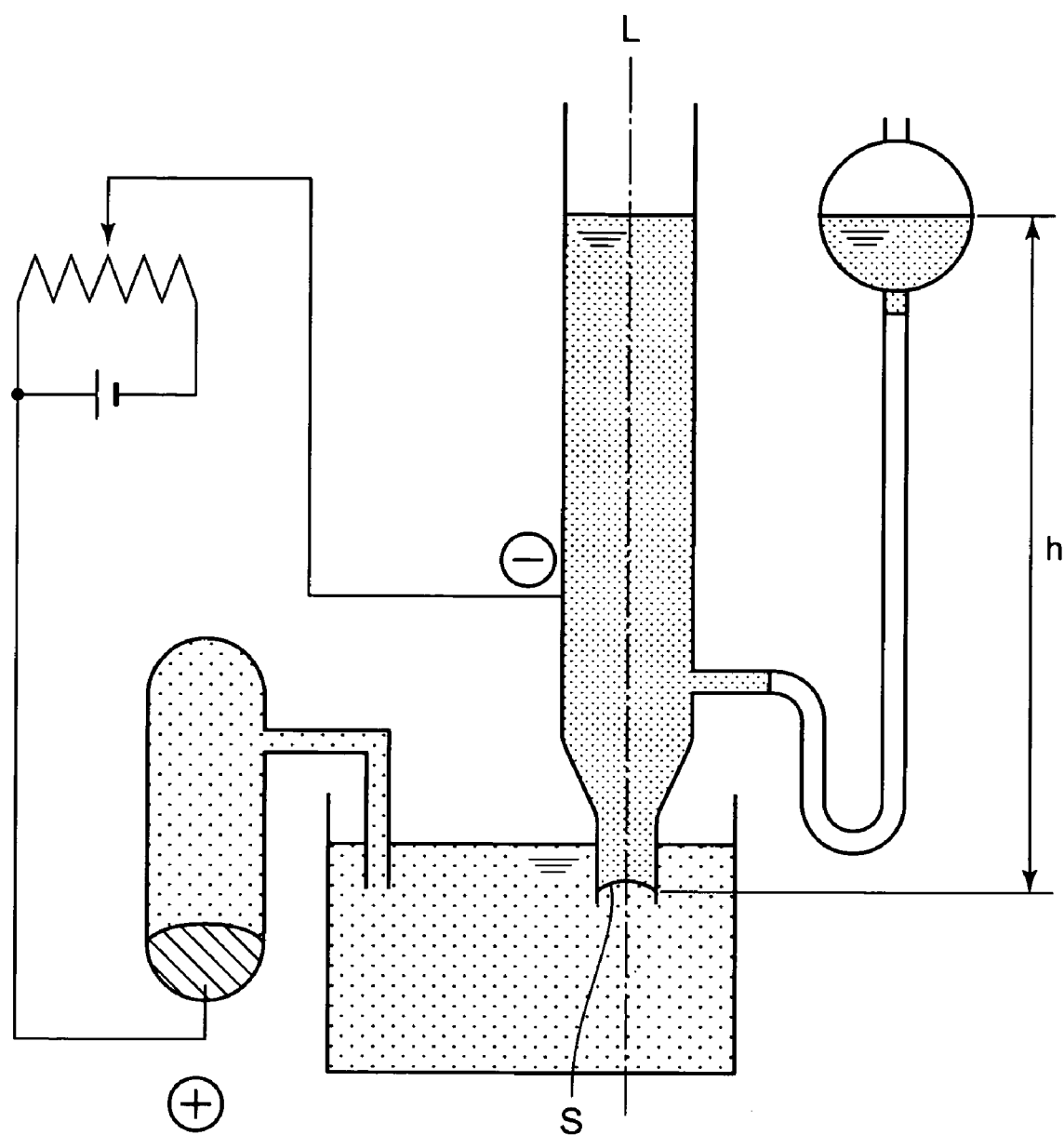

In addition, as shown in FIG. 9, the focal length may be changed by utilizing two types of liquids in a Lippmann electocapillary device and changing the height and interfacial tension of the interface (optical surface) in a capillary tube through electrocapillarity to deform the optical surface.

In this embodiment, the rigid lens 21 is, as shown in FIG. 2, a convex lens to thereby deflect the refracting force to a positive side. In addition, this rigid lens 21 is provided in such a manner as to be moved by a secondary moving device (not shown) in the invention, so that optical properties of the zoom lens unit 2 can be adjusted. Namely, even when there is a limitation on the variable areas of optical properties of the variable-focal-length lenses 3a, 3b, the refracting force of the zoom lens unit 2 is deflected to the positive or negative side by adjusting the position of the rigid lens 21, so that the focal length and focal point of the whole lens unit can be adjusted over a wide range.

A diaphragm 22 is provided between the rigid lens 21 and the variable-focal-length lens 3b.

A shutter 23 and a photographing element 24 are provided below the rigid lens 21. The shutter 23 is designed to be opened when a shutter release button 41 (refer to FIG. 1), which will be described later on, is depressed so as to allow light from the zoom lens unit 2 to hit the photographing element 24 for a predetermined duration. The photographing element 24 is such as a CCD which generates an analog signal according to the amount of light received.

The light and distance metering sensor 14 is such as to measure the amount of light and color temperature in the vicinity of a subject and a distance from the camera 1 to the subject (hereinafter, referred to as a subject distance) and is provided close to the photographing light intake window 13.

Figure 1B:
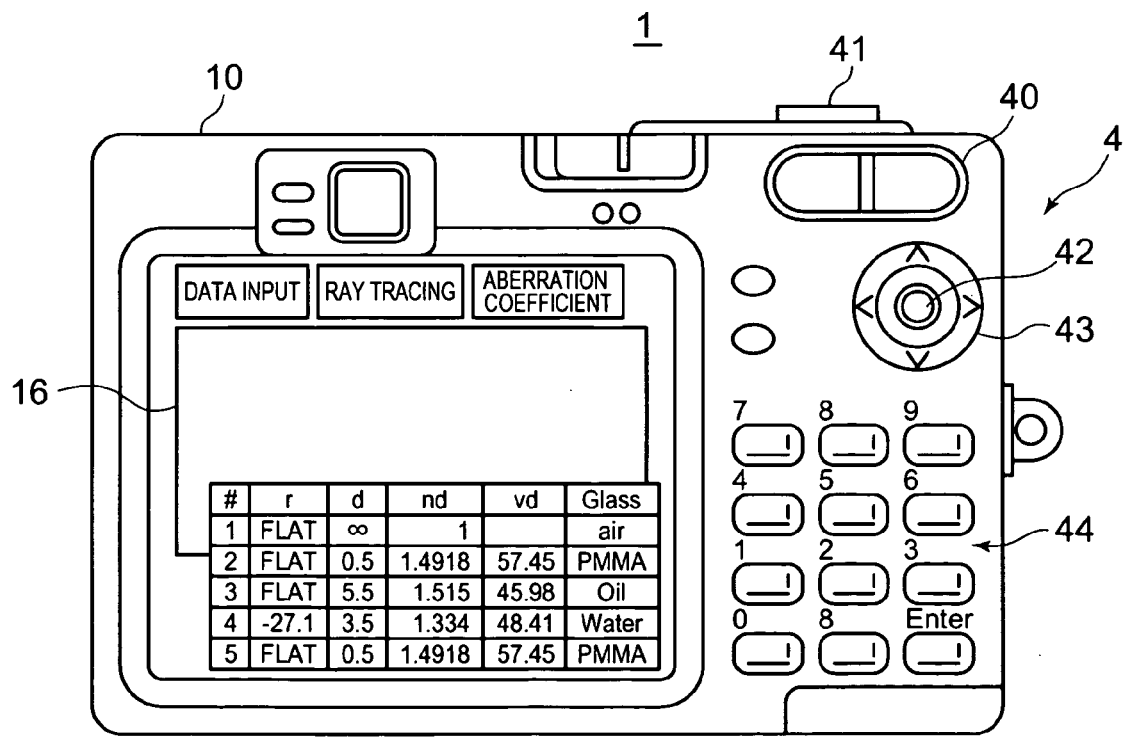

In addition, as shown in FIG. 1B, a display unit 16 is provided on a back side of the casing 10.

The display unit 16 is such as to be driven by a display drive unit 160 (refer to FIG. 2) so as to display a photographed image and an operation guide to the user or operator. Values of design parameters of the zoom lens unit 2 and results of a simulating operation on the optical properties of the zoom lens unit 2 are displayed on the display unit 16.

A control unit 4 is provided in the vicinity of the display unit 16.

There are provided a plurality of keys in the control unit 4, and in this embodiment, as shown in FIGS. 1A, 1B, there are provided a power supply switch 40 which switches on and off the power supply, the shutter release button 41 which instructs the shutter 23 to be opened and closed, a decision key 42 which indicates a decision made in each mode, a cursor key 43 which is operated to move vertically and laterally for selection, a ten-key pad 44 with which numerical values are inputted and a zoom key (not shown) which directs a zooming operation.

Control information on the variable design parameters of the zoom lens unit 2 and an instruction on the selection of design data in a program memory 66, which will be described later on, are inputted in the control unit 4 via those keys. Here, in this embodiment, the radii of curvatures and positions of the optical surfaces S of the variable-focal-length lenses 3a, 3b and the position of the rigid lens 21 are used as the variable design parameters.

In addition, as shown in FIG. 2, a control unit 5 is provided in the interior of the casing 10.

The control unit 5 includes a processing unit 50 and a photographing control unit 51.

The processing unit 50 is made up of a CPU and a ROM, a RAM and the like. This processing unit 50 is designed to change over modes of the camera 1 based on an operation indicating signal sent from the control unit 4 to, for example, a photographing mode, a lens unit design mode, a program design mode, a reproduction mode and the like.

In addition, in the photographing mode, the processing unit 50 is designed to calculate photographing conditions such as the focal length and focusing position of the zoom lens unit 2 and the white balance (WB) of an image to be photographed based on the operation instructing signal from the control unit 4 and results of measurement by the light and distance metering sensor 14. In addition, the processing unit 50 is designed to calculate a voltage to be impressed to the electrodes 34a, 34b of the variable-focal-length lenses 3a, 3b based on a table stored in the program memory 66. Furthermore, the processing unit 50 calculates a compensation amount of the impressed voltage to the variable-focal-length lenses 3a, 3b based on a temperature measured by the temperature sensor 15, an amount of light and a subject distance which are measured by the light and distance metering sensor 14 and a contrast that is calculated from an electric signal from the photographing element.

Additionally, the processing unit 50 is designed to obtain optical properties of the zoom lens unit 2 through a simulation operation based on the instruction information sent from the control unit 4, and in this embodiment, the optical properties include optical path and aberration, spot diagram, MTF (Modulation Transfer Function) and the like. In addition, the processing unit 50 is designed to evaluate the aberration, spot diagram and MTF properties through comparison with predetermined reference properties. Note that when used in this embodiment, the aberration means the so-called Seidel's five aberrations and color aberration.

The photographing control unit 51 corresponds to a control unit of the invention and is designed to control the variable design parameters of the zoom lens unit 2, that is, the radii of curvatures and positions of the optical surfaces S of the variable-focal-length lenses 3a, 3b and the position of the rigid lens 21 based on standard design data 66a and customized design data 66b, which will be described later on. In addition, this photographing control unit 51 is designed to control the flash unit 11, the diaphragm 22 and the variable-focal-length lenses 3a, 3b based on the photographing conditions and compensation amounts that are calculated by the processing unit 50.

Connected to this photographing control unit 51 are lens drive units 60a, 60b, a diaphragm drive unit 61, a shutter drive unit 62, a timing control unit 63, an image signal processing unit 65 and a flush unit drive unit 64.

The lens drive units 60a, 60b are such as to impress voltage to the electrodes 34a, 34b of the variable-focal-length lenses 3a, 3b and are designed to adjust the impressed voltage.

The diaphragm drive unit 61 is such as to adjust the stop amount of the diaphragm 22.

The shutter drive unit 62 is such as to control the opening and closure of the shutter 23 based on a signal sent from the shutter release button 41 on the control unit 4.

The timing control unit 63 is such as to make the image signal processing unit 65 perform a signal processing in synchronism with a photographing timing by the photographing element 24.

The image signal processing unit 65 is such as to apply a CDS (Correlated Double Sampling) processing, an AGC (Automatic Gain Control) processing and an A/D conversion processing to an analog signal sent from the photographing element 24.

The flash unit drive unit 64 is such as to drive the flash unit 11 to illuminate a flash light.

Connected to the control unit 5 that has been described above are, in addition to the control unit 4 and the display unit 16, the program memory 66 and a memory interface 67, an internal memory 68, an image processing unit 69, a compression and decompression unit 70, an information transmission unit 72 and a power supply control unit 71.

The program memory 66 corresponds to a storage unit of the invention and stores the standard design data 66a and customized data 66b of the zoom lens unit 2, and a standard control program 66c and a customized control program 66d of the camera 1. In addition, as shown in FIG. 5B, this program memory 66 stores focal lengths of the variable-focal-length lenses 3a, 3b and impressed voltages to the electrodes 34a, 34b which are related to each other in the form of a table.

Here, the standard design data 66a mean design data of a default prepared by a manufacturer or the like, and the customized design data 66b mean design data prepared by the user or operator. The standard design data 66a and customized design data 66b have information on combinations of the variable design parameters, and in this embodiment, as shown in FIG. 10A, combinations of focal lengths of the variable-focal-length lenses 3a, 3b, curvatures and positions of the optical surfaces S of the same lenses and positions of the rigid lens 21. Note that values shown under "distance d" and "radius of curvature r" in FIG. 10 are values at a position shown in FIG. 11.

In addition, the standard control program 66c and customized control program 66d have information on operations of the respective units of the camera 1 and relational expressions between the variable design parameters.

The standard control program 66c means a control program of a default prepared by the manufacturer of the like and has information on operations of the respective units of the camera 1 when a standard photographing mode is selected.

Figure 12A:
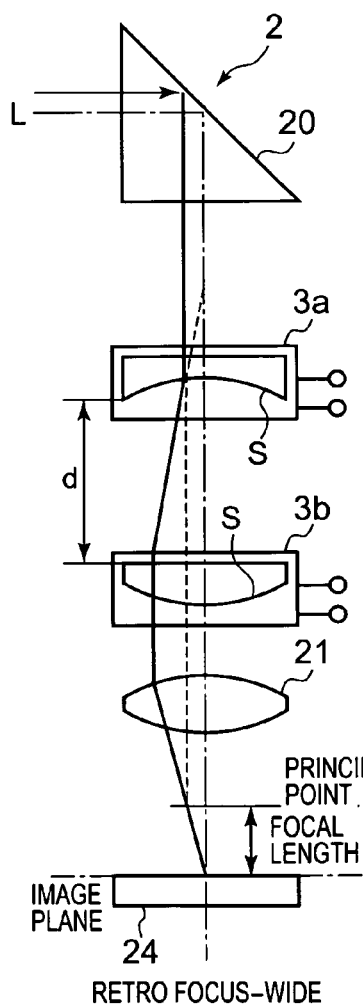
FIGS. 12A to 12C show zoom lens units. Furthermore.
Figure 12B:
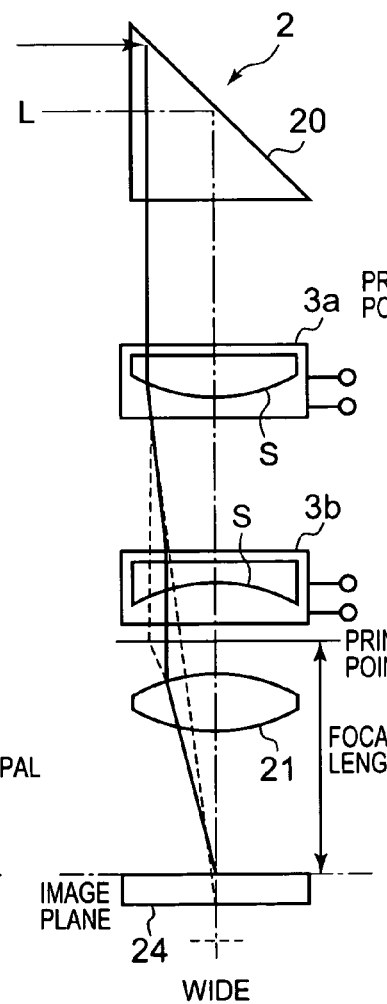
Figure 12C:
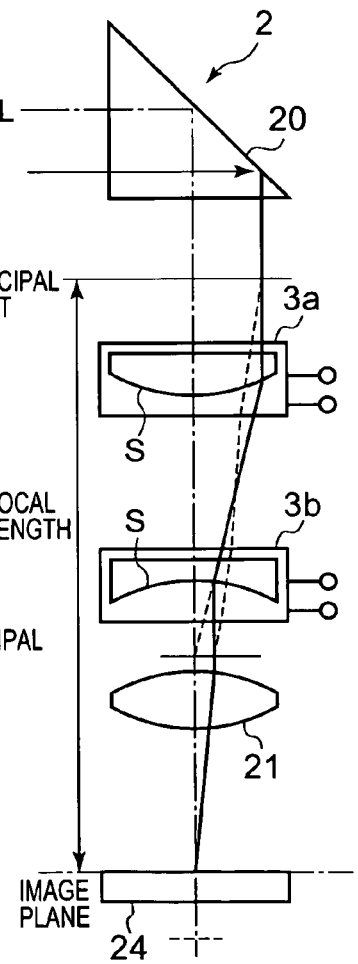
Figure 13:
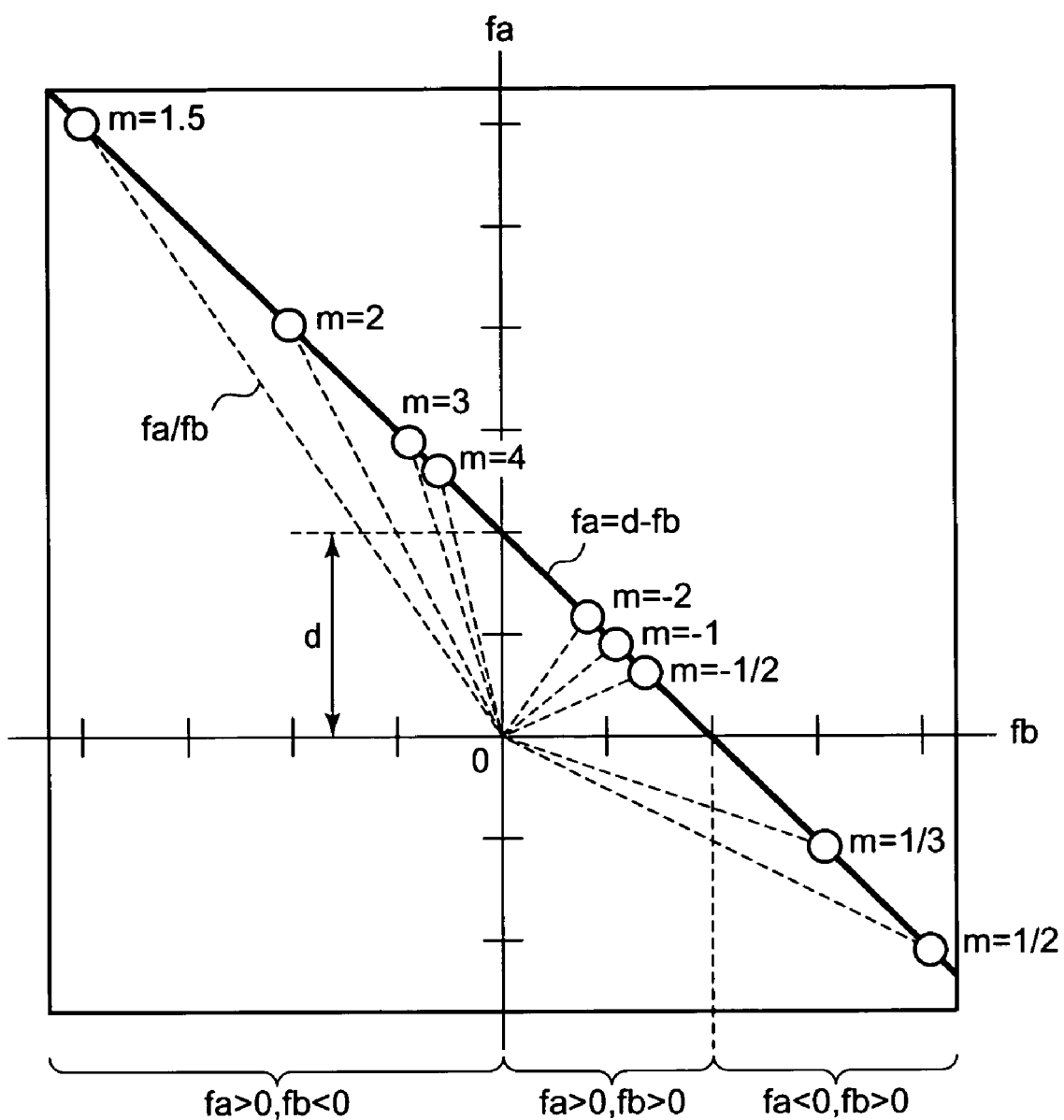
FIG. 13 shows a relationship of focal lengths fa, fb of a variable-focal-length lens.

The customized control program 66d means a control program prepared by the user and has information on operations of the respective units of the camera 1 when a customized photographing mode is selected. In this embodiment, the customized control program 66d has information related to the focal lengths of the variable-focal-length lenses 3a, 3b, and to be specific, as shown in FIGS. 12, 13, with the variable-focal-length lenses 3a, 3b made to form an afocal system, the customized control program 66d is designed to control the radii of curvatures and positions of the respective optical surfaces S based on afocal magnifications m as control information in the invention. In addition, as shown in a top right graph in FIG. 14, the customized control program 66d stores the afocal magnifications m of the afocal system and the combinations of focal lengths of the variable-focal-length lenses 3a, 3b which are related to each other in the form of a table.

Here, when the variable-focal-length lenses 3a, 3b form the afocal system, as shown in FIG. 13 mentioned above, the focal lengths $f_a$, $f_b$ of the variable-focal-length lenses 3a, 3b satisfy the following equations (15), (16), and the focal length f of the zoom lens unit 2 satisfies the following equation (17). In the equation (15), "d" denotes a distance between an image side principal point H1' of the variable-focal-lens 3a and an object side principal point H2 of the variable-focal-length lens 3b (refer to FIG. 15). In addition, in the equation (16), "m" denotes the afocal magnification and is a value resulting by multiplying the inclination of a straight line connecting a point ($f_b$, $f_a$) on the straight line with the original point by (−1). In addition, in the equation (17), "$f_o$" denotes the focal length of the rigid lens 21.

$$f_a + f_b = d \quad (15)$$

$$m = -f_a/f_b \quad (16)$$

$$f = m \times f_o \quad (17)$$

Consequently, from the above equations (15), (16), the focal lengths $f_a$, $f_b$ of the variable-focal-length lenses 3a, 3b are expressed by the following equations (18), (19).

$$f_a = d \times m/(m-1) \quad (18)$$

$$f_b = -d/(m-1) \quad (19)$$

Figure 15A:
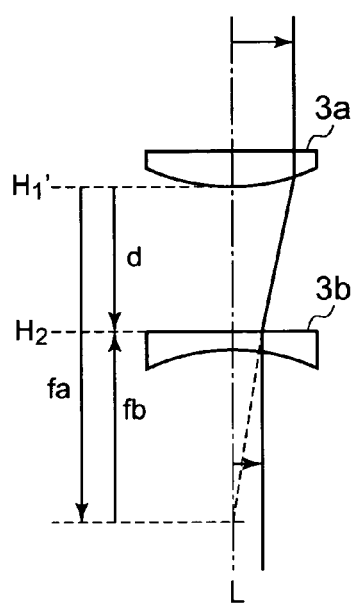

In addition, as is shown in FIG. 13, if $f_a \geq d > 0$ and $f_b < 0$, that is, in the event that the variable-focal-length lens 3a is a convex lens and the variable-focal-length lens 3b is a concave lens, the afocal magnification m becomes m≧1, and the zoom lens unit 2 becomes a telephoto zoom lens unit, as shown in FIG. 15A. Note that in FIG. 15, the variable-focal-length lenses 3a, 3b are illustrated in a simplified fashion, and the illustration of the rigid lens 21 is omitted.

Figure 15B:
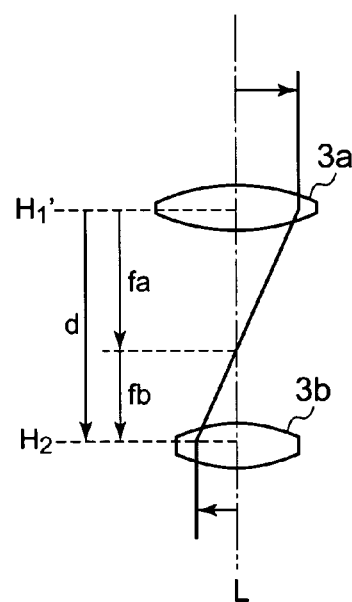

In addition, if $0 < f_a - \leq d$ and $0 < f_b \leq 0$, that is, in the event that both the variable-focal-length lenses 3a, 3b are a convex lens, the afocal magnification m becomes m<0, and the zoom lens unit 2 constitutes a so-called Keplerian telescope type zoom lens unit as shown in FIG. 15B.

Figure 15C:
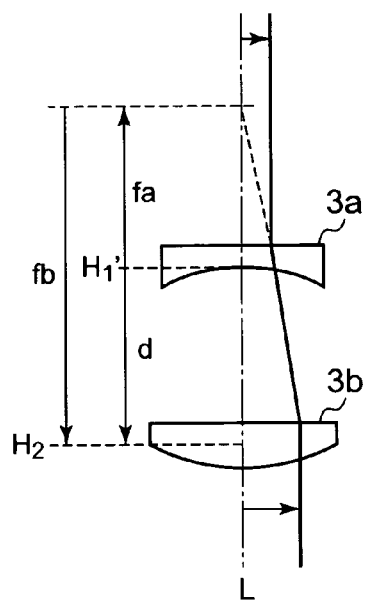

Additionally, if $f_a < 0$ and $f_b \geq -d > 0$, that is, in the event that the variable-focal-length lens 3a is a concave lens and the variable-focal-length lens 3b is a convex lens, the afocal magnification m becomes 0≦m≦1, the zoom lens unit 2 becomes a wide angle zoom lens unit as shown in FIG. 15C.

The memory interface (IF) 67 is such as to enable the transmission of image data and the photographing conditions between the external memory 67a and the internal memory 68.

The internal memory 68 is such as to store image data of a photographed image by the photographing element 24 and image data inputted from the external memory 67a via the memory interface 67. In addition, the inner memory 68 is designed to store the photographing conditions such as the foal lengths of the variable-focal-length lenses 3a, 3b while relating them to the image data.

The image processing unit 69 is such as to implement various types of image processing on the image data stored in the internal memory 68.

The compression and decompression unit 70 is such as to compress to encode the image data of a photographed image by the photographing element 24, as well as decompressing to decode the image data stored in the external memory 67a and the internal memory 68.

The information transmission unit 72 is such as to transmit and receive information on the standard design data 66a and the customized design data 66b, and the standard control program 66c and the customized control program 66d and enables the storage of design data and control programs that are designed by external equipment in the program memory 66 and the transmission of the design data and control programs that are stored in the program memory 66 to the external equipment for use by other cameras. This information transmission unit 72 includes a radio transmission unit 720 and an input/output IF 722.

The radio transmission unit 720 is such as to implement radio transmission and reception of information with external equipment (not shown) via an antenna 721, and the input/output IF 722 is such as to implement wired transmission and reception of information with the external equipment (not shown).

The power supply control unit 71 is such as to supply electric power from a battery 71a to the control unit 5.

Next, the operation of the zoom lens unit 2 will be described by reference to the drawings.

Figure 16:
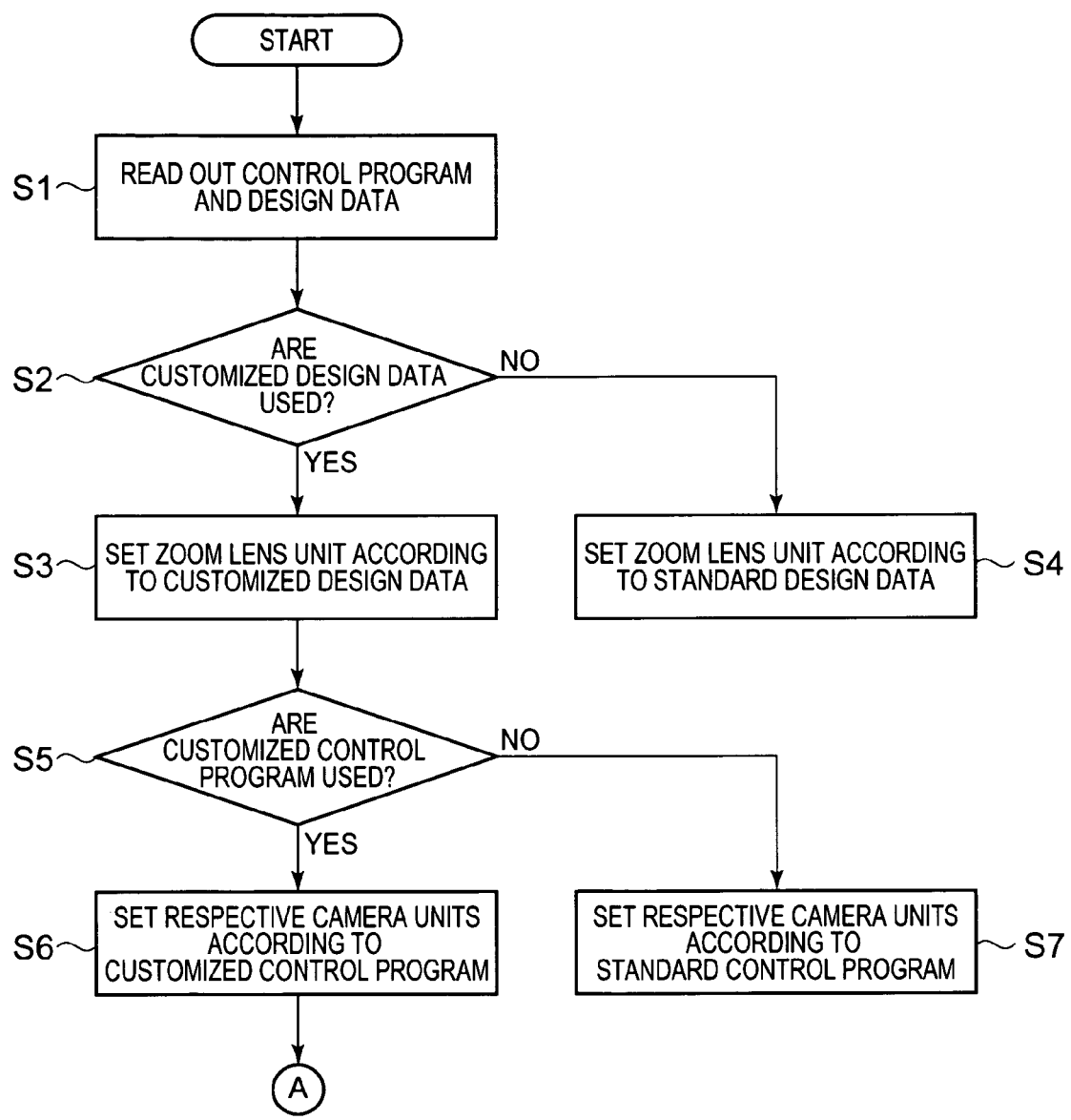
FIGS. 16 to 18 are flowcharts showing the operation of the camera according to the invention.

Firstly, as shown in FIG. 16, when the power supply of the camera 1 is turned on, after initializing, the control unit 5 reads out the standard design data 66a, the customized design data 66b, the standard control program 66c and the customized control program 66d from the program memory 66 and the external equipment and displays the contents or file names of the data and programs so read out at the display unit 16 (step S1).

Next, the control unit 5 displays at the display unit 16 an instruction to select either of the standard design data 66a and the customized design data 66b for use and determines whether or not the customized design data 66b have been selected (step S2).

In this step S2, if the customized design data 66b are selected (step S2; Yes), the photographing control unit 51 controls the variable design parameters of the zoom lens unit 2 based on the customized design data 66b (step S3), whereas if the customized design data 66b are not selected (step S2; No), the photographing control unit 51 controls the variable design parameters of the zoom lens unit 2 based on the standard design data 66a (step S4). Thus, since the customized design data 66b and the standard design data 66a, which are combinations of variable design parameters, are read out of the program memory 66 for use, the value of each variable design parameter can be returned to a predetermined state such as a default state.

Next, the control unit 5 displays at the display unit 16 an instruction to select either of the standard control program 66c and the customized control program for use and determines whether or not the customized control program 66d has been selected (step S5).

In this step S5, if the customized control program 66d is selected (step S5; Yes), the photographing control unit 51 controls the respective units of the camera 1 based on the customized control program 66*d* so selected (step S6), whereas if the customized control program 66*d* is not selected (step S5; No), the photographing control unit 51 controls the respective units of the camera 1 based on the standard control program 66*c* (step S7).

Figure 17:
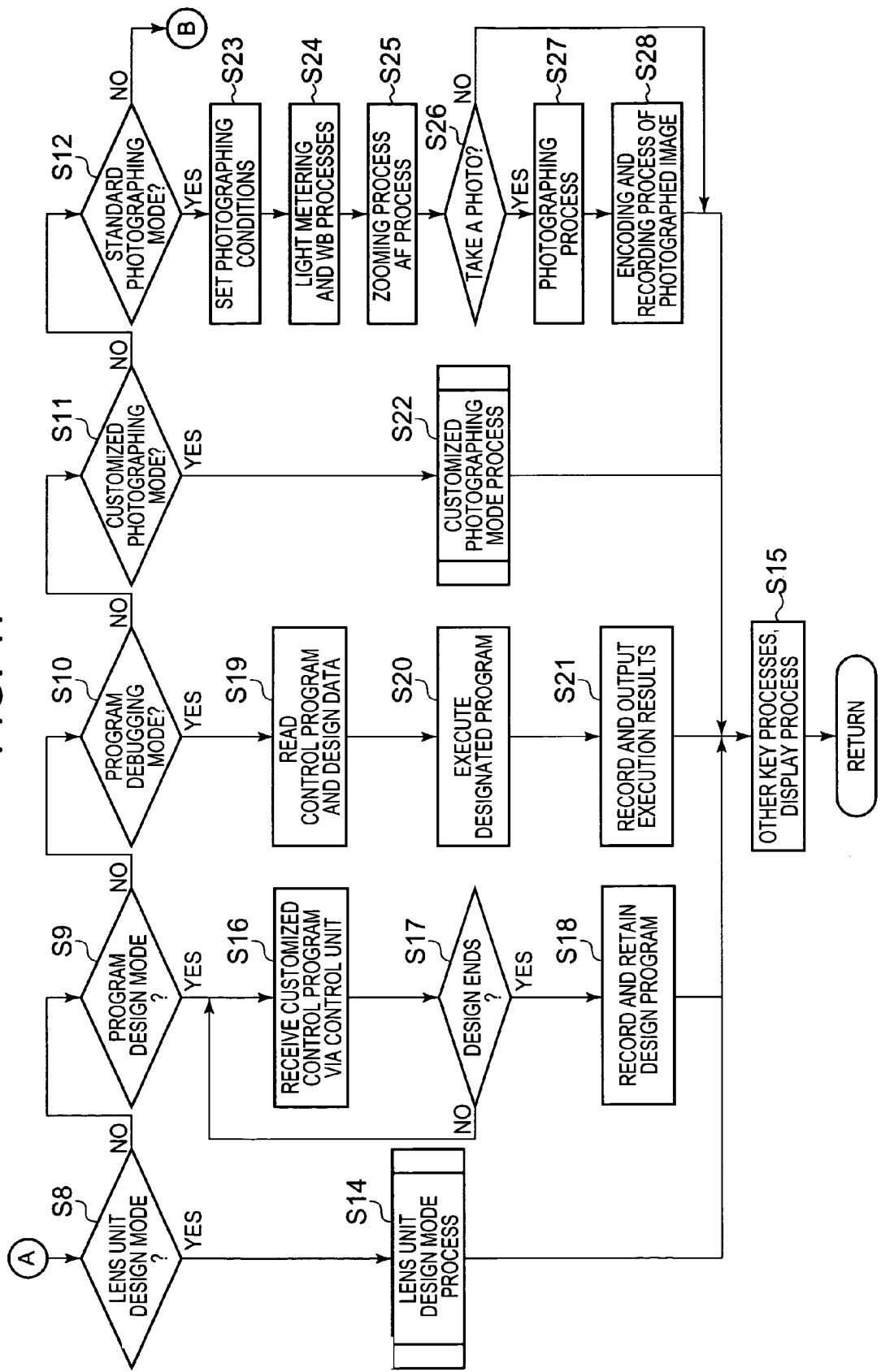
Figure 18:
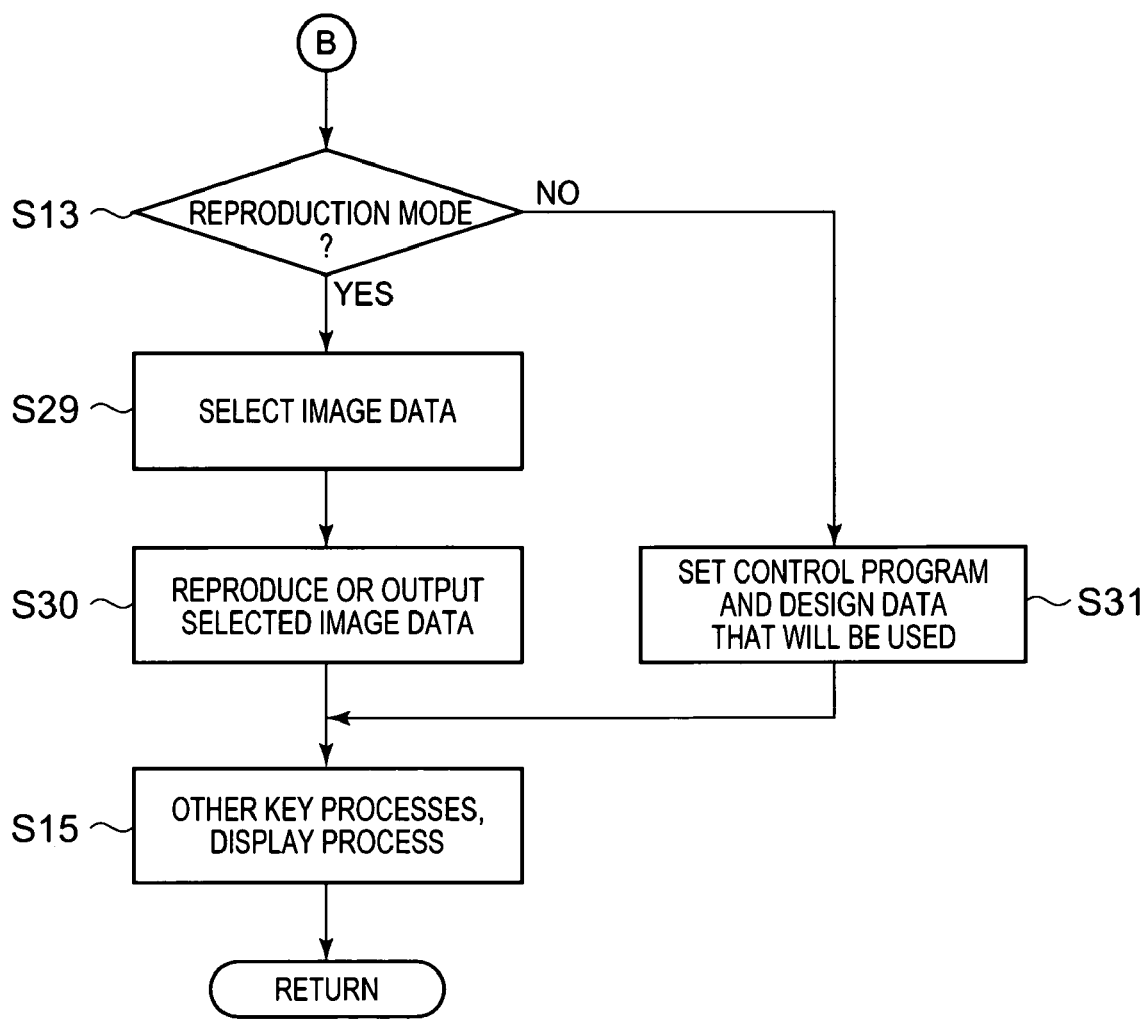

Next, as shown in FIGS. 17, 18, the control unit 5 displays at the display unit 16 an instruction to select a mode of the cameral 1 and determines on the willingness of the user to select the following modes sequentially: lens unit design mode; program design mode; program debugging mode; photographing mode by the customized control program 66*d* (hereinafter, referred to as a customized photographing mode); photographing mode by the standard control program 66*c* (hereinafter, referred to as a standard photographing mode); and reproduction mode (steps S8 to 13).

In this step S8, if the lens unit design mode is selected (step S8; Yes), the control unit 5 performs a lens unit design mode processing (step S14).

Figure 19:
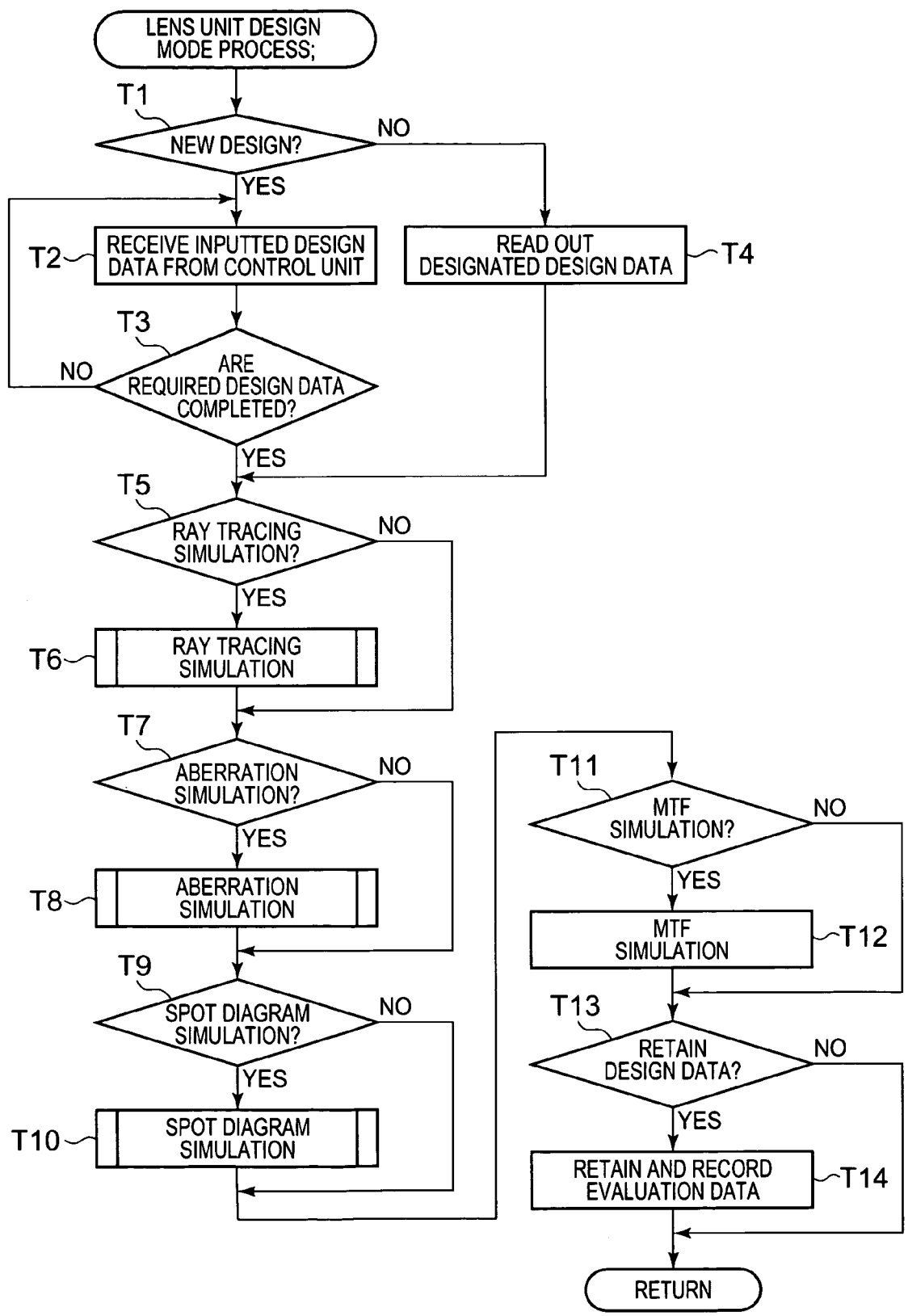
FIG. 19 is a flowchart showing a lens unit design mode process.

To be specific, as shown in FIG. 19, the processing unit 50 displays at the display unit 16 an instruction to select whether or not new customized design data are to be designed and determines whether or not the design of new design data has been selected (step T1).

In this step T1, if the design of new design data is selected (step T1; Yes), the processing unit 50 displays at the display unit 16 an instruction to input design data on the variable design parameters such as the curvatures, positions and refractive indices of the variable-focal-length lenses 3*a*, 3*b* and the position of the rigid lens 21 and thereafter receives a indicating signal of design data from the control unit 4 (step T2). Next, the processing unit 50 determines whether or not required design data have been received completely (step T3), and if the design data are not complete (step T3; No), then, return to the step T2, whereas if complete (step T3; Yes), then a process in step T5, which will be described later on, is executed. Here, being different from the conventional case, by adjusting the optical properties of the plurality of variable-focal-length lenses 3*a*, 3*b* provided in the zoom lens unit 2, the optical properties of the lens unit 2 can be adjusted over a wide range without exchanging lenses. In addition, since the design data have information on the design data at fixed values, specific simulation operations can be implemented in steps T6, T8, T10 and T12, which will be described later on.

On the other hand, if the design of new design is not selected in step T1 (step T1; No), the processing unit 50 reads out the standard design data 66*a* or the customized design data 66*b* which is designated by the user from the program memory 66 (step T4).

Next, the control unit 5 displays at the display unit 16 an instruction to select whether to obtain an optical path in the zoom lens unit 2 when the control is carried out based on the obtained design data through a simulation operation and determines whether or not the implementation of the simulation operation has been selected (step T5).

If the implementation of the simulation operation is not selected in this step T5 (step T5; No), the processing unit 50 executes a process in step T7, which will be described later on, whereas if the implementation of the simulation operation is selected (step T5; Yes), the processing unit 50 executes an operation for ray tracing simulation (step T6).

Figure 20:
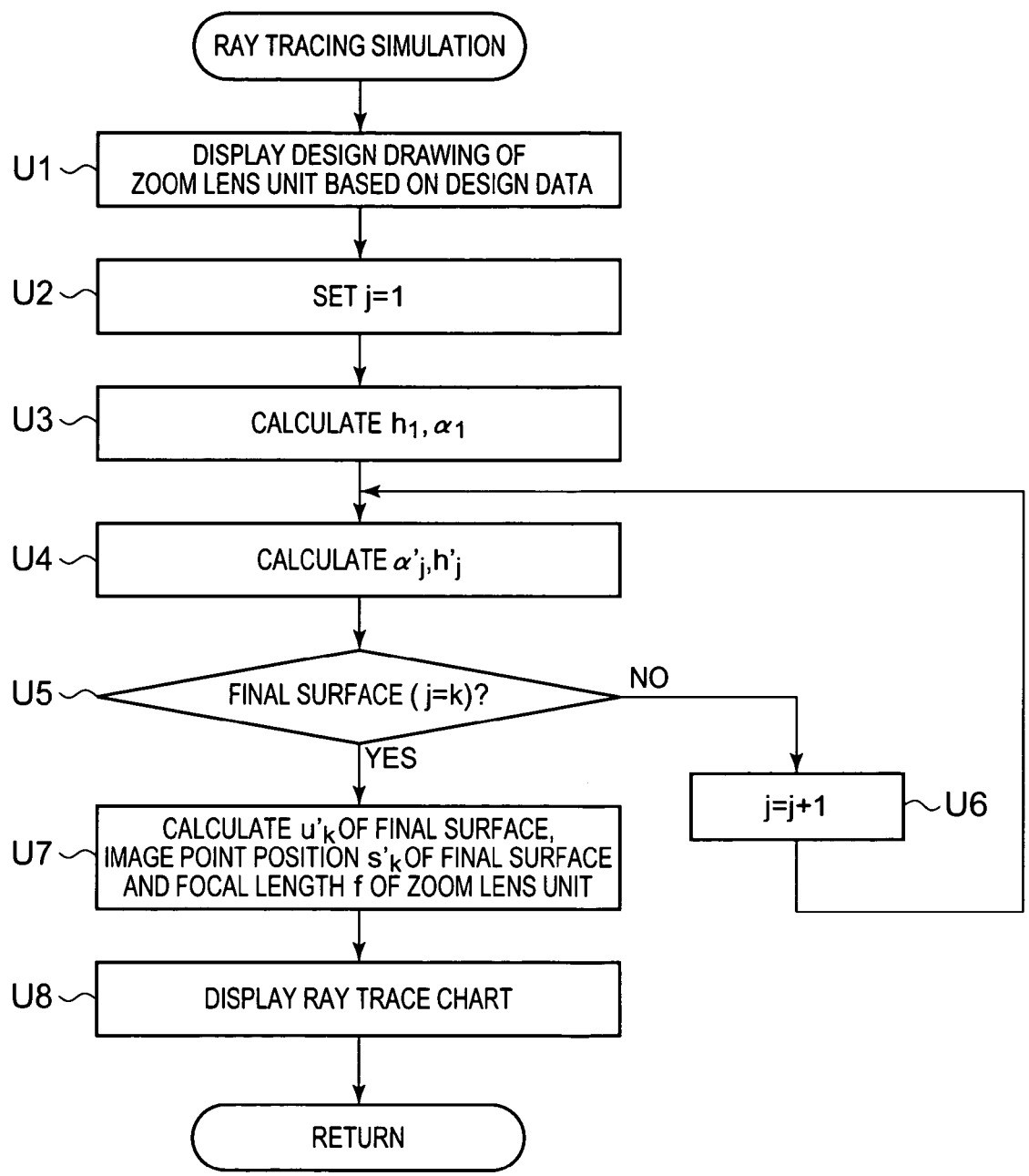
FIG. 20 is a flowchart showing an operation process of a ray tracing simulation.

To be specific, as shown in FIG. 20, firstly, the processing unit 50 displays at the display unit 16 a design drawing of the zoom lens unit 2 based on the design data (step U1).

Next, the processing unit 50 sets a surface number j of an optical surface in the zoom lens unit 2 to 1 (step U2). Note that in the following description, the number of optical surfaces in the zoom lens unit 2 is k as a matter of convenience.

Figure 21:
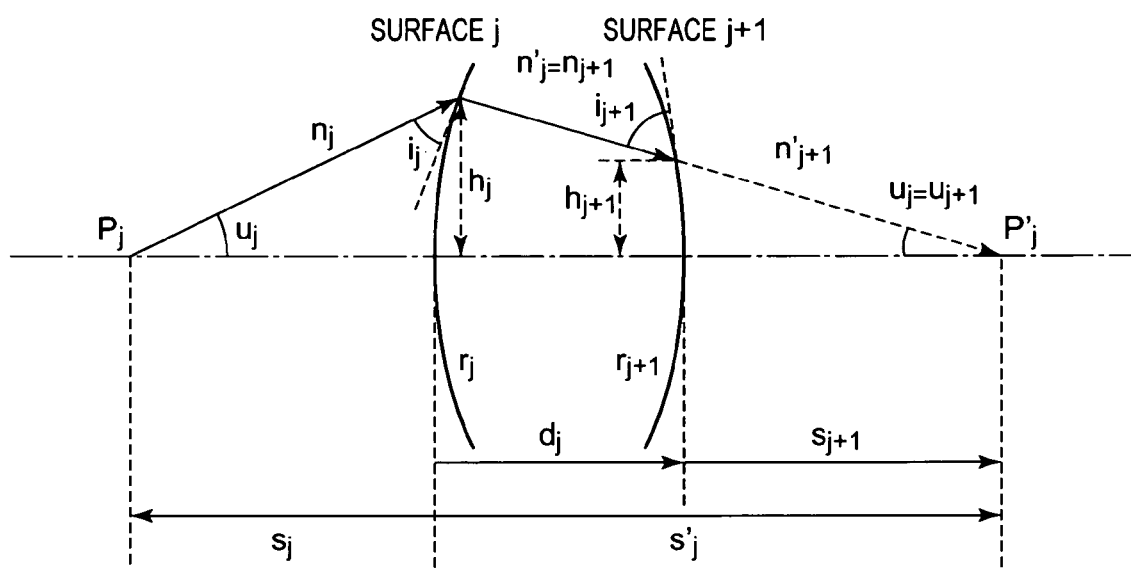
FIG. 21 is a diagram which explains a ray tracing method. Then.

Next, the processing unit 50 calculates a parameter α1 (=n1·u1) and a height h1 at which a ray of light cuts through an optical surface of a surface number 1 (hereinafter, referred to as a first surface) (step U3). Here, as shown in FIG. 21, "n" denotes a refractive index of a medium and "u" denotes an angle that an incident light forms with an optical axis L. In addition, letters added to respective symbols such as "j" and "j+1" are values which indicate surface numbers of the optical surfaces.

Next, utilizing the following equations (20), (21), the processing unit 50 obtains $\alpha_j$, $h_j$ for each optical surface and stores them in the program memory 66 (step U4). Note that in the equations, "r" denotes the radius of curvature of an optical surface and "d" denotes a distance to the next optical axis on the optical axis. In addition, when "'" is given to a symbol, it indicates that a parameter denoted by the symbol constitutes an image side (a back side) parameter relative to the optical surface, whereas when no such mark is given to a symbol, it indicates that a parameter denoted by the symbol constitutes an object side (a front side) parameter.

$$\alpha'_j = \alpha_{j+1} = \alpha_j + h_j(n'_j - n_j)/r_j \quad (20)$$

$$h'_j = h_{j+1} = h_j - \alpha'_j \cdot d_j/n'_j \quad (21)$$

Next, the processing unit 50 determines whether or not a value of the surface number j is k (step U5), if not k (step U5; No), 1 is added to the value of the surface number (step U6), and return to the process in step U4.

On the other hand, if the surface number j is k in step U5, in other words, if $\alpha_j$, $h_j$ are obtained with respect to a final surface (step U5; Yes), an angle u'$_k$ and an image point position s'$_k$ with respect to a final surface and an image side focal length f' of the zoom lens unit 2 are obtained from the following equations (22) to (24) and are then displayed at the display unit 16 (step U7). In addition, as this occurs, the processing unit 50 obtains effective aperture, aperture ratio, entrance pupil and exit pupil of the zoom lens unit 2 by known techniques and then displays them at the display unit 16. Here, for example, the results of a calculation of ray tracing when the data shown in FIG. 10A above are used as design data are shown as shown in FIG. 10B.

$$u'_k = \alpha'_k/n'_k \quad (22)$$

$$s'_k = BF = H_k/u'_k \quad (23)$$

$$f' = h_1/u'_k \quad (24)$$

where, in Equation (23), "BF" denotes the back-focal distance of the zoom lens unit 2.

Next, the processing unit 50 simulation operates ray tracing in the zoom lens unit 2 by connecting points at the height h$_j$ in the respective surfaces of the zoom lens unit 2 and displays at the display unit 16 a ray trace chart as a result of the simulation operation (step U8), ending the ray tracing simulation operation.

Figure 11:
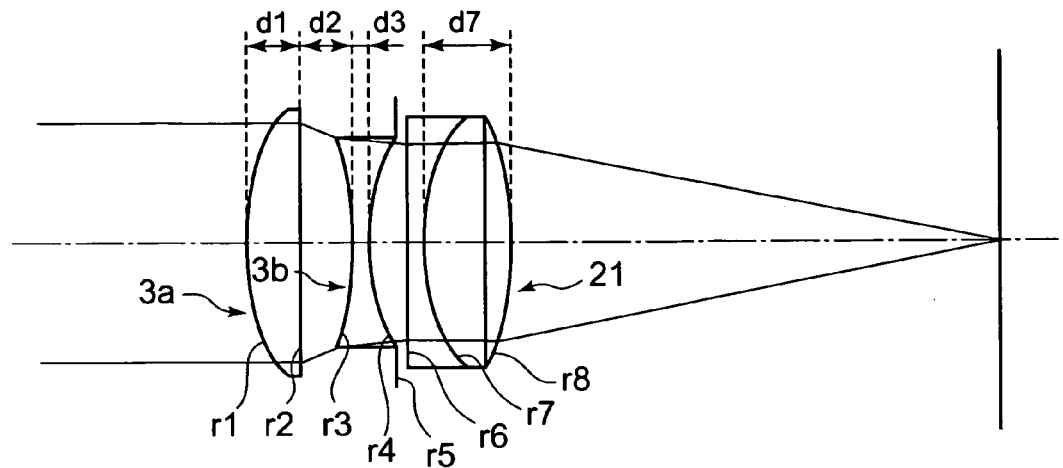
FIG. 11 is a diagram showing an optical path of a zoom lens unit.

From this, the design drawing and the ray trace chart of the lens unit 2 when the data shown in FIG. 10A are used as design data are illustrated as shown, for example, in FIG. 11 above. Thus, since the results of the simulation operation of ray tracing in the zoom lens unit 2 are displayed at the display unit 16, the contents of the design of the zoom lens unit 2 can be evaluated accurately regardless of availability of high-degree expert knowledge and abundant experience.

Next, as shown in FIG. 19, the processing unit 50 displays at the display unit 16 an instruction to select whether to obtain aberrations in the designed zoom lens unit 2 through a simulation operation and determines whether or not the implementation of the simulation operation has been selected (step T7).

If the implementation of the simulation operation is not selected in this step T7 (step T7; No), the processing unit 50 executes a process in step T9, which will be described later on, whereas if the implementation of the simulation operation is selected (step T7; Yes), the simulation operation is executed to measure aberrations (step T8).

Figure 22:
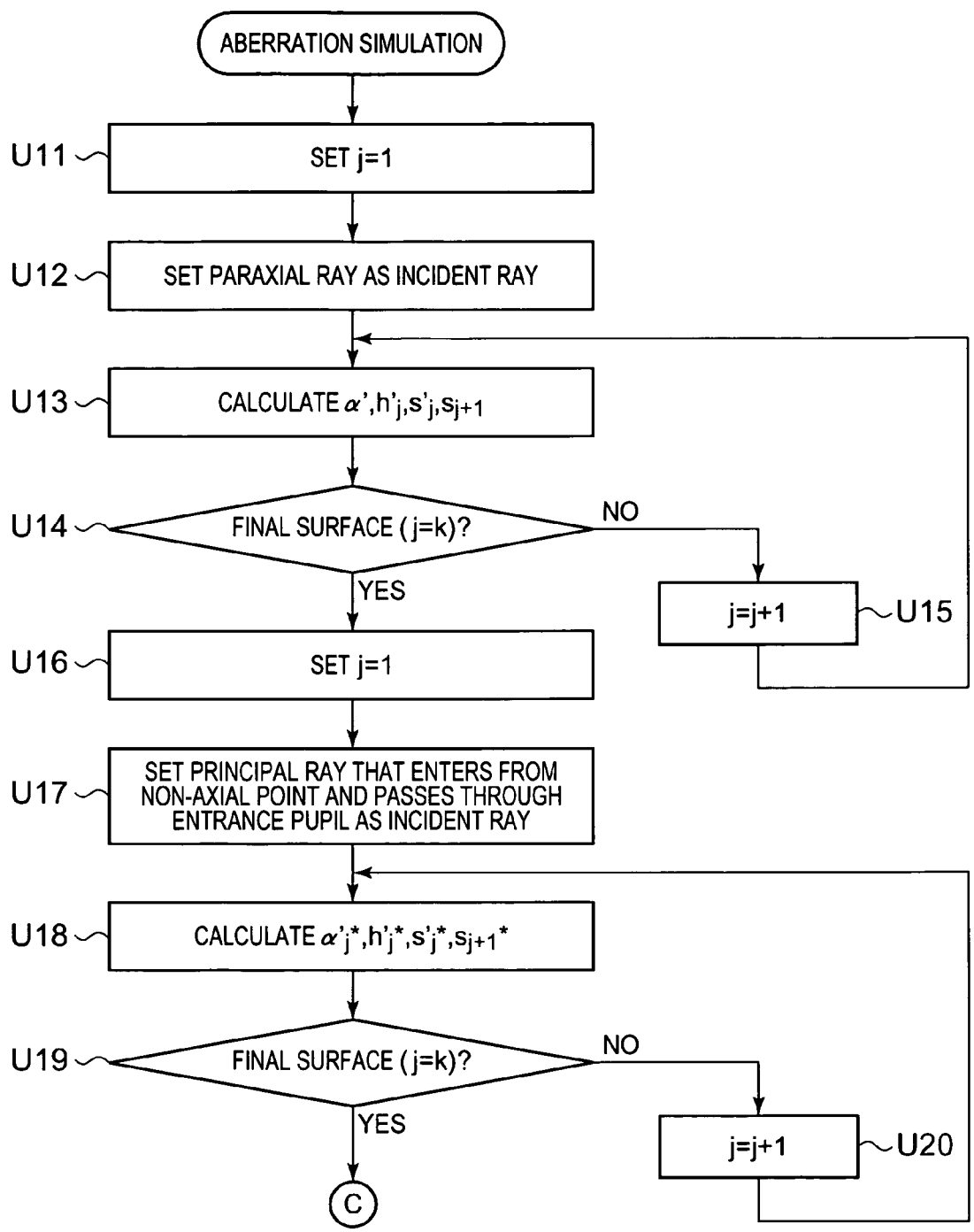
FIGS. 22 and 23 are flowcharts showing an operation process of aberration measurement simulation, and FIGS. 24A and 24B equations that are used for calculation of aberrations show an afocal system.

To be specific, as shown in FIG. 22, firstly, the processing unit 50 sets the surface number j of the optical surface in the zoom lens unit 2 to 1 (step U11).

Next, the processing unit 50 sets an paraxial ray as an incident ray on the zoom lens unit 2 (step U12). As this occurs, the processing unit 50 sets, for example, $u_1 = 1/a$, $h_1 = s_1 \cdot u_1$, $\alpha_1 = n_1 \cdot u_1$ and enables the comparison of aberration performances even on optical systems whose focal lengths and aperture sizes are different by normalizing such that the height h of a transmitted ray through an object side principal surface becomes 1. Note that "a" denotes a distance from the object point to the object side principal point. In addition, this normalization may be implemented by making the focal length f become 1 or making the diagonal length of the angle of view of a photographed image become 1.

Next, the processing unit 50 obtains $\alpha'_j$, $h'_j$ and $s'_j$ with respect to the respective optical surfaces from the above equations (20) to (22) and the following equations (25), (26) and stores them in the program memory 66 (step U13).

$$s'_j = h_j/u'_j = h_j \cdot n'_j/\alpha'_j \qquad (25)$$

$$s_{j+1} = s'_j - d_j \qquad (26)$$

Next, the processing unit 50 determines whether or not the value of the surface number j is k (step U14), and if not k (step 14; No), then add 1 to the surface number (step U15) and return to the process in step U13, whereby ray tracing of paraxial rays are performed sequentially from the object side toward the image side.

On the other hand, if the surface number j is k in step U14, in other words, $\alpha'_j$, $h'_j$ and $s'_j$ are obtained with respect to the final surface (step U14; Yes), the processing unit 50 sets the surface number j of the optical surface of the zoom lens unit 2 to 1 again (step U16).

Next, the processing unit 50 sets a principal ray from a non-axial point to the entrance pupil as an incident ray on the zoom lens unit (step U17). As this occurs, the processing unit 50 sets, for example, $u1^* = -a/a^*$, $h1^* = z^* \cdot u1^*$, $\alpha1^* = n1 \cdot u1^*$, and enables the comparison of aberration performance even on an optical system whose focal length and aperture size are different by normalizing such that an angle ω from the object side principal point to the object height becomes (−1).

Next, the processing unit 50 obtains $\alpha'_j{}^*$, $h'_j{}^*$ and $s'_j{}^*$ with respect to each optical surface from the following equations (27) to (30) and stores them in the program memory 66 (step U18).

$$\alpha'_j{}^* = \alpha_{j+1}{}^* = \alpha_j{}^* + h_j \cdot (n'_j - n_j)/r_j \qquad (27)$$

$$h'_j{}^* = h_{j+1}{}^* = h_j{}^* - \alpha'_j \cdot d_j/n'_j \qquad (28)$$

$$s'_j{}^* = h_j{}^*/u'_j{}^* = h_j{}^* \cdot n'_j/\alpha'_j{}^* \qquad (29)$$

$$s_{j+1}{}^* = s'_j{}^* - d_j \qquad (30)$$

Next, the processing unit 50 determines whether or not the value of the surface number j is k (step U19), if not k (step U19; No), add 1 to the surface number (step U20) and return to the process in step U18, whereby the ray tracing of the principal ray is performed sequentially from the object side to the image side.

Figure 23:
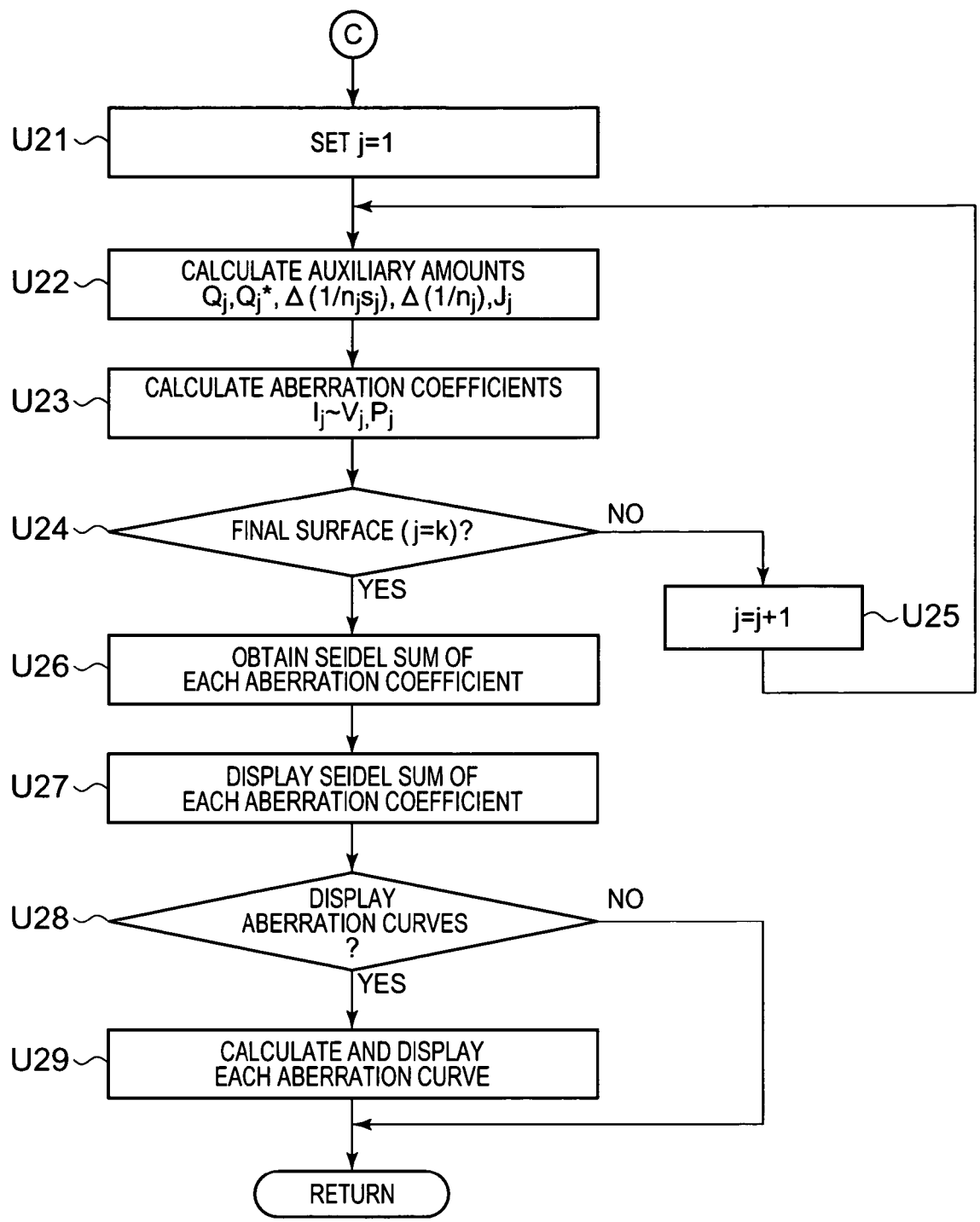

On the other hand, if the surface number is k in step U19, in other words, if $\alpha'_j{}^*$, $h'_j{}^*$ and $s'_j{}^*$ are obtained with respect to the final surface (step U19; Yes), as shown in FIG. 23, the processing unit 50 sets the surface number j of the optical surface in the zoom lens unit 2 to 1 again (step U21).

Next, the processing unit 50 calculates auxiliary amounts $Q_j$, $Q_j{}^*$, $\Delta(1/n_j s_j)$, $\Delta(1/n_j)$ and $J_j$ by utilizing equations shown in FIG. 24A (step U22) and calculates aberration coefficients $I_j$ to $V_j$, $P_j$ from the following equations (31) to (36) (step U23).

$$I_j = h^4 Q^2 \cdot \Delta(1/n_j s_j) \qquad (31)$$

$$II_j = J_j \cdot I_j \qquad (32)$$

$$III_j = J_j \cdot II_j \qquad (33)$$

$$IV_j = III_j + P_j \qquad (34)$$

$$V_j = J_j \cdot IV_j \qquad (35)$$

$$P_j = -(1/r_j) \cdot \Delta(1/n_j) \qquad (36)$$

Next, the processing unit 50 determines whether or not the value of the surface number j is k (step U24), and if not k (step U24; No), add 1 to the surface number (step U25) and return to the process in step U22, whereby the calculation of aberration coefficients is performed sequentially from the object side to the image side.

On the other hand, if the surface number j is k in step U24, in other words, $I_j$ to $V_j$ and $P_j$ are obtained with respect to the final surface (step U24; Yes), the processing unit 50 obtains, as shown in FIG. 24B, Seidel sums I to V and P for each aberration coefficient by totaling aberration coefficients of each surface (step U26). In addition, the processing unit 50 obtains an axial chromatic aberration $\Delta S'$ and a chromatic difference of magnification $\Delta Y'$ from the following equations (37), (38). However, in the equations, "$v_j$" denotes an Abbe number ($= (n_d - 1)/(n_F - n_C)$), and "$n_c$", "$n_d$" and "$n_F$" denote refractive indices in wavelengths of line C, line d and line F.

$$\Delta S' = -(1/\alpha'_k{}^2) \cdot \Sigma h_j{}^2/(v_j \cdot f_j) \qquad (37)$$

$$\Delta Y' = -(1/\alpha'_k) \cdot \Sigma h_j{}^2 \cdot q_j/(v_j \cdot f_j) \qquad (38)$$

Next, the processing unit 50 displays the respective aberration coefficients, Seidel sums, axial chromatic aberration and chromatic difference of magnification at the display unit 16 (step U27). In addition, the processing unit 50 evaluates an image forming performance of the zoom lens unit 2 based on the results of calculations and displays the evaluation results at the display unit 16, whereby when compared with a case where the user evaluates the image forming performance, the design contents of the zoom lens unit 2 can be evaluated easily and accurately. Here, for example, the calculation results when the data shown in FIG. 10A are used as design data are shown as shown in FIG. 25.

Next, the processing unit 50 displays at the display unit 16 an instruction to select whether to display an aberration curve and determines whether or not the display of aberration curve has been selected (step U28). Then, if the display of aberration curves is not selected (step U28; No), the processing unit 50 ends the simulation operation of aberration measurement directly.

Figure 26:
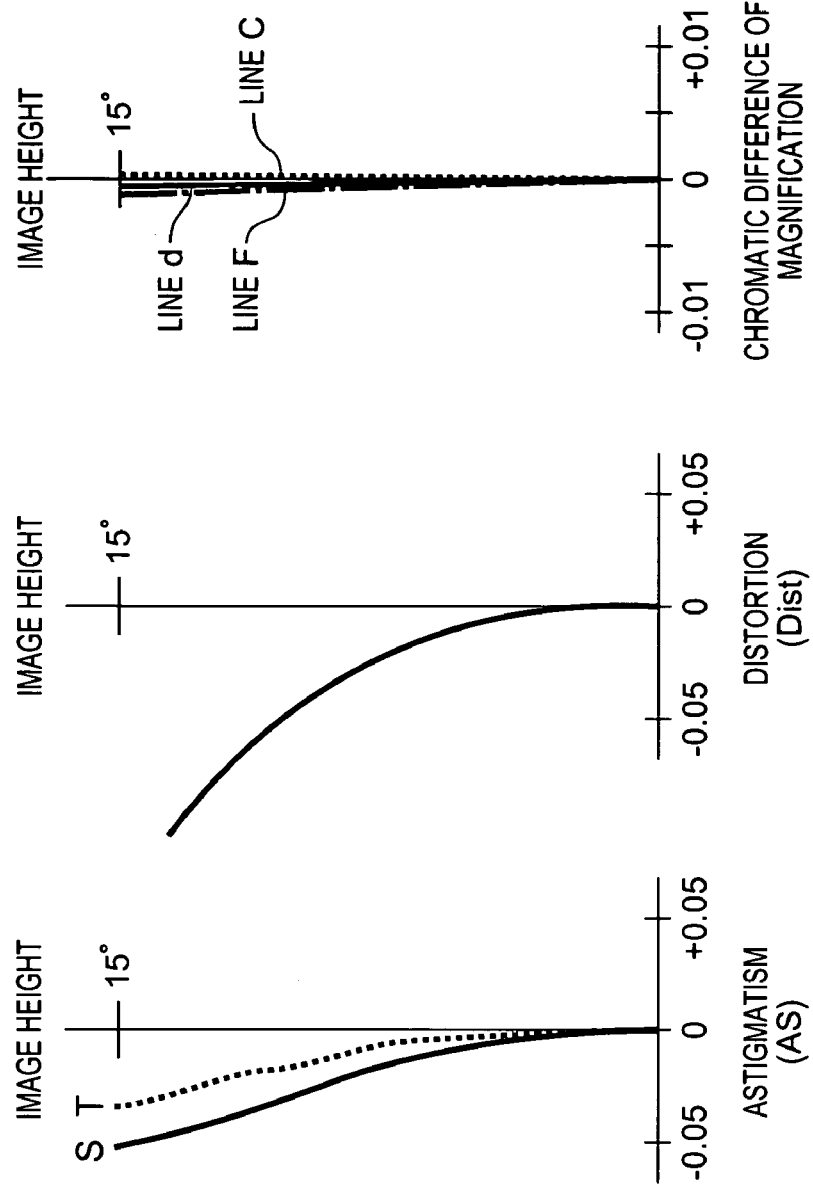
FIGS. 26A to 26D show aberration curves when the data shown in FIG. 10A are used.

On the other hand, if the display of aberration curve is selected in step U28 (step U28; Yes), the processing unit 50 calculates each aberration curve for lens surface or height (angle) of the image height and displays an aberration curve so calculated at the display unit 16 (step U29), ending the simulation operation of aberration measurement. Here, for example, aberration curves when the data in FIG. 10A are used as design data are shown as shown in FIG. 26. Thus, since the results of the simulation operation of aberration measurement of the zoom lens unit 2 are displayed at the display unit 16, the contents of the design of the zoom lens unit 2 can be evaluated accurately regardless of availability of high-degree expert knowledge and abundant experience.

$$\Delta y = -(1/2a'k)[I \cdot h^3 \cos\Phi - II \cdot (n1 \cdot \tan\omega)h^2(2+\cos2\Phi) + \quad (39)$$
$$(3III+P) \cdot (n1 \cdot \tan\omega)^2 \cdot h \cdot \cos\Phi - V \cdot (n1 \cdot \tan\omega)^3]$$

$$\Delta x = -(1/2a'k)[I \cdot h^3 \sin\Phi - II \cdot (n1 \cdot \tan\omega)h^2 \cdot \sin2\Phi + \quad (40)$$
$$(III+P) \cdot (n1 \cdot \tan\omega)^2 \cdot h \cdot \sin2\Phi]$$

Next, as shown in FIG. 19, the control unit 5 displays at the display unit 16 an instruction to select whether to obtain spot diagrams of the designed zoom lens unit 2 through a simulation operation and determines whether or not the implementation of a simulation operation has been selected (step T9).

If not the implementation of a simulation operation is not selected (step T9; No), the control unit 5 executes a process in step T11, which will be described later on, whereas when the implementation of a simulation operation is selected (step T9; Yes), the processing unit 50 executes calculations of spot diagrams (step T10).

Figure 27:
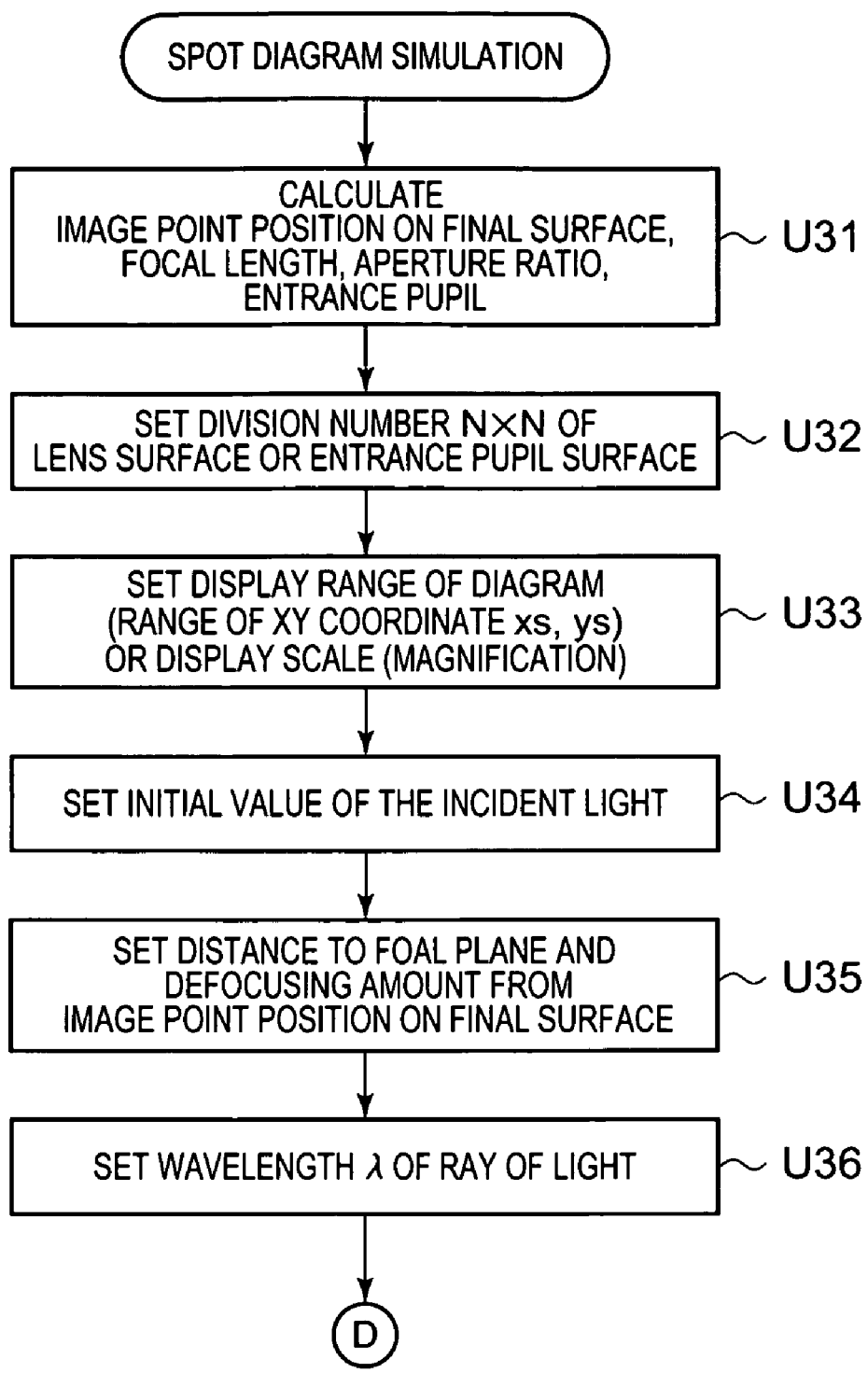
FIGS. 27 and 28 are flowcharts showing an operation process of a spot diagram measuring simulation.

To be specific, as shown in FIG. 27, firstly, the processing unit 50 obtains an angle $u'_k$ and an image point position $s'_k$ of the final surface and effective aperture, aperture ratio, entrance pupil and exit pupil of the zoom lens unit 2 in a similar manner to in the steps U1 to U7 (step U31).

Next, based on an instruction from the user, the processing unit 50 sets a division number N×N of the lens surface or the surface of the entrance pupil and a display range of spot diagrams (range Xs, Ys on XY coordinates) or display scale (magnification) (step U32, step U33).

Next, the processing unit 50 sets an initial value of the incident light and a distance dk from the final surface to a focal plane or a defocusing amount (+/−dz) from the image point position on the final surface (step U34, step U35) and then sets a wavelength of the incident ray λ (step U36). Here, the initial value of the incident ray means, for example, an object point position do, an angle of incidence, an initial unit vector of the incident ray and the like. In addition, the defocusing amount means a value expressed by dk=BF+/−dz.

Figure 28:
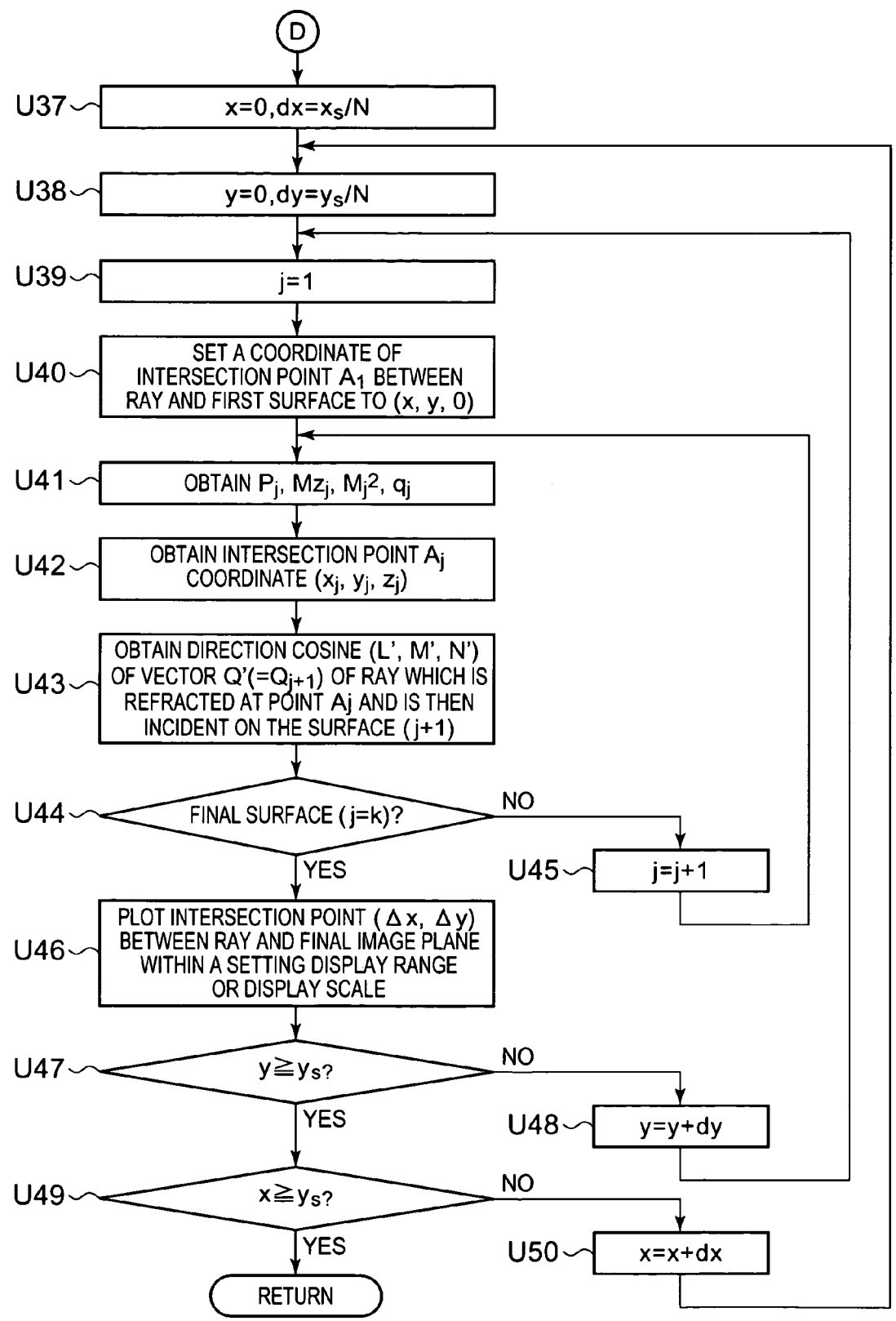

Next, as shown in FIG. 28, the processing unit 50 calculates dx=xs/N from values of xs and N which are set in step U33 and sets a variable x to 0 (step U37).

Next, the processing unit 50 calculates dy=ys/N from values of ys and N which are set in steps U32 and U33 and sets a variable y to 0 (step U38).

Next, the processing unit 50 sets the surface number j of the optical surface in the zoom lens unit 2 to 1 (step U39) and then sets a coordinate (x, y, 0) of an intersection point A1 between the ray and the first surface (step U40).

Figure 29:
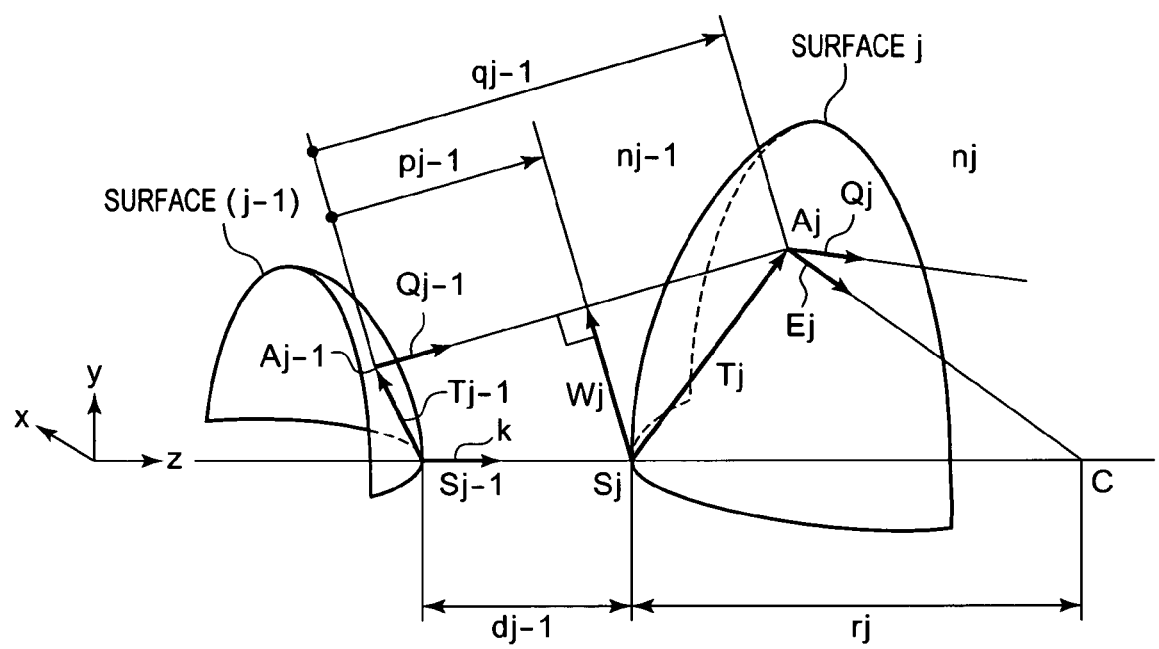
FIG. 29 is a diagram which explains a method of spot diagram measurement.

Next, as shown in FIG. 29, the processing unit 50 puts in the following equations (41) to (44) a direction cosine ($L_{j-1}$, $M_{j-1}$, $N_{j-1}$) of a unit vector $Q_{j-1}$ of a ray that exits from a point $A_{j-1}$ on a surface (j−1) to be incident on a point $A_j$ on a surface (j), a vector $T_{j-1}$ from an intersection point $S_{j-1}$ between the surface (j−1) and the ray, a curvature of the surface (j), a perpendicular vector $W_j$ from a point $S_j$ to the unit vector $Q_{j-1}$, a unit vector k of the ray, a radius of curvature of the surface (j), a distance $q_{j-1}$ from a point $Q_{j-1}$ in the direction of the vector $Q_{j-1}$ to a point $Q_j$, a distance $p_{j-1}$ from the point $Q_{j-1}$ to an intersection point between $Q_{j-1}$ and the perpendicular vector $W_j$, direction components $Wx_j$, $Wy_j$, $Wz_j$ of the vector $W_j$ and the like to obtain $P_{j-1}$, $Wz_j M_j^2$ and $q_j$ (step U41).

$$P_{j-1} = -[x_{j-1}L_{j-1} + y_{j-1}M_{j-1} + (z_{j-1} - d_{j-1})N_{j-1}] \quad (41)$$

$$Wz_j = (z_{j-1} - d_{j-1}) + p_{j-1}N_{j-1} \quad (42)$$

$$M_j^2 = -[x^2_{j-1} + y^2_{j-1} + (z_{j-1} - d_{j-1})^2 - p_{j-1}^2] \quad (43)$$

$$q_{j-1} = p_{j-1} + (cM_{j-1}^2 - 2Wx_j)/N_{j-1}[1+ \\ \{1-(c_j/N_{j-1}^2)(c_jM_{j-1}^2 - 2Wx_j)\}^{1/2}] \quad (44)$$

Note that these equations (41) to (44) are such as to be introduced from the following equations (45) to (48).

$$T_{j-1} + p_{j-1}Q_{j-1} = d_{j-1} \cdot k + W_j \quad (45)$$

$$W_j + (q_{j-1} - p_{j-1}) \cdot Q_{j-1} = T_j \quad (46)$$

$$T_j + r \cdot E_j = r \cdot k \quad (47)$$

$$n_j \cdot (E_j \times Q_j) = n_{j+1} \cdot (E_j \times Q_{j+1}) \quad (48)$$

Next, as shown in FIG. 28, the processing unit 50 obtains the intersection point $A_j$ coordinate ($x_j$, $y_j$, $z_j$) between the ray and the surface (j) by utilizing the following equations (49) to (51) (step U42).

$$x_j = x_{j-1} + q_{j-1}L_{j-1} \quad (49)$$

$$y_j = y_{j-1} + q_{j-1}M_{j-1} \quad (50)$$

$$z_j = (z_{j-1} - d_{j-1}) + q_{j-1}N_{j-1} \quad (51)$$

Next, the processing unit 50 obtains the direction cosine ($L_j$, $M_j$, $N_j$) of the vector Q4 of a light that is incident on the point Aj after refracted on a surface (j+1) from the following equations (52) to (54) and thereafter obtains a coordinate ($X_{j+1}$, $Y_{j+1}$, $Z_{j+1}$) of a point $A_{j+1}$ in a similar procedure to that used above (step U43).

$$L_j = (n/n') \cdot L + g \cdot ex \quad (52)$$

$$M_j = (n/n') \cdot M + g \cdot ey \quad (53)$$

$$N_j = (n/n') \cdot N + g \cdot ez \quad (53)$$

In addition, the processing unit 50 obtains a direction cosine ($e_{xj}$, $e_{yj}$, $e_{zj}$) of a perpendicular vector $E_j$ on the surface (j) at a point A, a refraction ratio (n/n'), a cosine $\zeta_j$ of an angle of incidence on the surface (j) and a cosine $\zeta'_j$ of an angle of exit and a coefficient $g_j$ from the following equations (55) to (58).

$$e_{xj} = -cx_j, \quad e_{yj} = -cy_j, \quad e_z = 1 - cz_j \quad (55)$$

$$(n/n') = (n\lambda/n'\lambda) = (n'_{(j-1)}\lambda/n'_j\lambda) \quad (56)$$

$$\xi'_j = [1 - (n/n')^2 \cdot (1 - \xi_j^2)]^{1/2} \quad (57)$$

$$g_j = \xi'_j - (n/n') \cdot \xi'_j \quad (58)$$

Next, the processing unit 50 determines whether or not the value of the surface number j is k (step U44), and if not k, add 1 to the surface number (step U45) and return to the process in step U41.

Figure 30A:
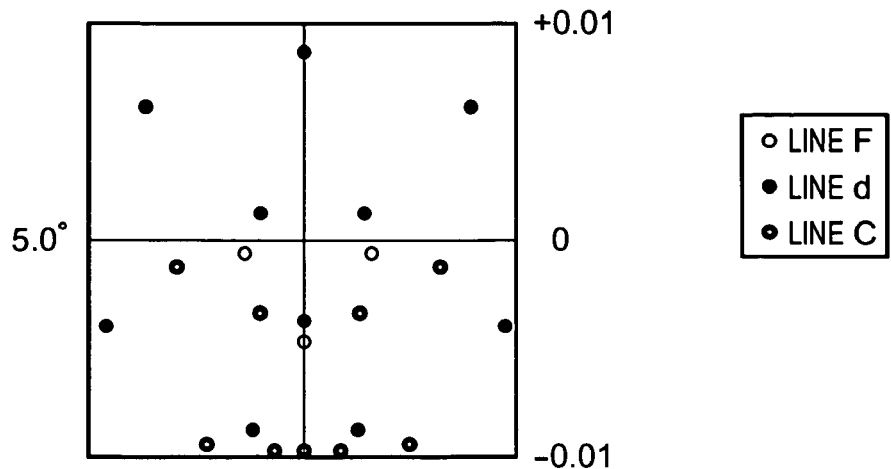
FIGS. 30A to 30C show diagrams which show spot diagrams. In addition.
Figure 30B:
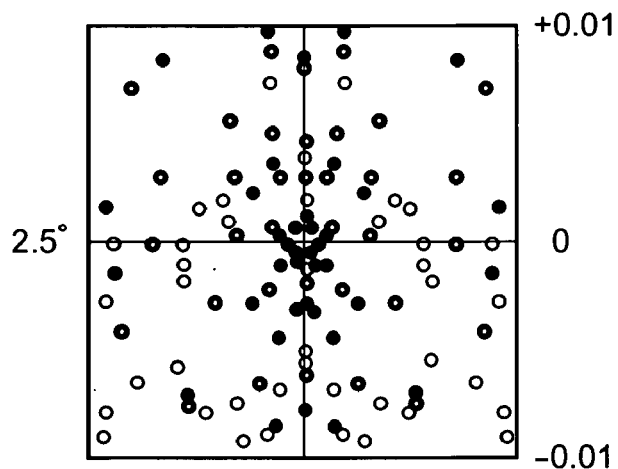
Figure 30C:
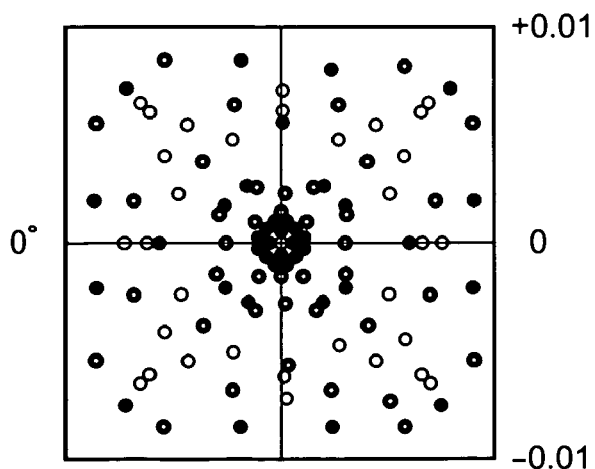

On the other hand, if the surface number j is k in step U44, in other words, the direction cosine ($L_j$, $M_j$, $N_j$) of the vector Qj is obtained with respect to the final surface (step U44; Yes), for example, as shown in FIGS. 30A to 30C, the processing unit 50 plots an intersection point (Δx, Δy) between the ray and the final image plane within the display range of the display unit 16 or on the XY coordinates on the display scale (step U46).

Next, the processing unit 50 determines whether or not the value of the variable y is equal to or greater than ys (step U47), and if less than ys (step 47; No), add 1 to the value of the variable y (step U48) and return to the process in step U39.

On the other hand, if the value of the variable y is equal to or greater than ys, in other words, if image points of the incident light are plotted with respect to each of minute areas which align in an y axis direction on the lens surface of the surface of the entrance pupil (step U47; Yes), the processing unit 50 determines whether or not the value of the variable x is equal to or greater than xs (step U49), and if less than xs (step U49; No), add 1 to the variable x (step U50) and return to the process in step U38.

Then, if the value of the variable x is equal to or greater than xs, in other words, if image points of the incident light are plotted with respect to each of minute areas which align in an x axis direction on the lens surface of the surface of the entrance pupil (step U49; Yes), the processing unit 50 evaluates the image forming performance of the zoom lens unit 2 based on spot diagrams so obtained and displays the results of the evaluation at the display unit 16, ending the simulation operation of spot diagram measurement. Thus, since the results of the simulation operation of spot diagram measurement of the zoom lens unit 2 are displayed at the display unit 16, the contents of the design of the zoom lens unit 2 can be evaluated accurately regardless of high-degree expert knowledge and abundant experience. In addition, since the evaluation results by the processing unit 50 are displayed, when compared with a case where the user evaluates the image forming performance, the design contents of the zoom lens unit 2 can be evaluated easily and accurately.

Next, as shown in FIG. 19, the control unit 5 displays at the display unit 16 an instruction to select whether to obtain an MTF property of the designed zoom lens unit 2 through a simulation operation and determines whether or not the implementation of a simulation operation has been selected (step T11).

In step T11, if the implementation of a simulation operation is not selected (step T11; No), the control unit 5 executes a process in step T13, which will be described later on, whereas if the implementation of a simulation operation is selected (step T11; Yes), the processing unit 50 executes a simulation operation of MTF property measurement (step T12).

To be specific, the processing unit 50 calculates an MTF value as |Rt(u)| or |Rs(s)| from the following equation (59) or (60) by utilizing an intensity distribution of spot density as an intensity distribution on an image plane and displays at the display unit 16 the value so calculated as a change in MTF relative to space frequency (u) and a defocusing amount (+/− dz), image height, zooming ratio and the like. In addition, the processing unit 50 evaluates the image forming performance of the zoom lens unit 2 based on the MTF property so obtained and displays the results of the evaluation at the display unit 16. Thus, since the results of the simulation operation of measuring the MTF value of the zoom lens unit 2 are displayed at the display unit 16, the design contents of the zoom lens unit 2 can be evaluated accurately regardless of availability of high-degree expert knowledge and abundant experience. In addition, since the evaluation results by the processing unit 50 are displayed, when compared with a case where the user evaluates the image forming performance, the design contents of the zoom lens unit 2 can be evaluated easily and accurately.

$$|Rt(u)|=\{A(u)^2+B(u)^2\}^{1/2} \tag{59}$$

$$|Rs(u)|=(1/N)\Sigma_i \cos(2\pi u \cdot \Delta xi) \tag{60}$$

where, in the equations, $\Delta xi$, $\Delta yi$ are spot coordinates, and A(u) and B(u) are values that are expressed by $A(u)=(1/N)\Sigma \cos(2\pi u^* \Delta yi)$, $B(u)=(1/N)\Sigma \sin(2\pi u \cdot \Delta yi)$.

Note that the processing unit 50 may obtain the MTF value as an amplitude Cm by regarding the basic frequency as $uo=1/p$[line pair/mm] (p is a basic period) and transforming an intensity distribution I(x) of a grid with a frequency $u=m/p=muo$(m is a positive integer) using Fourier transform as in the following equations (61), (62) or may obtain the MTF value by performing mockingly so-called slit method and contrast method or transforming point spread function (PSF) and line spread function (LSF) through Fourier transform.

$$I(X)=\Sigma Cm \cdot \exp(-i \cdot 2\pi \cdot mu_0 x) \tag{61}$$

$$Cm=\int I(x)\exp(i \cdot 2\pi \cdot mu_0 x)dx \tag{62}$$

Next, the control unit 5 displays at the display unit 16 an instruction to select whether to store the design data in the program memory 66 and determines whether or not the storage of the design data has been selected (step T13).

If the storage of the design data is not selected in step T13 (step T13; No), the control unit 5 ends the lens unit design mode.

On the other hand, if the storage of the design data is selected in step T13 (step T13; Yes), the control unit 5 affixes a file name to the design data and stores the data in the program memory 66 (step T14) and ends the lens unit design mode. As this occurs, if the simulation operations have been carried out in the aforesaid steps T6, T8, T10 and T12, the control unit 5 also stores the results of the simulation operations in the program memory 66.

Then, as shown in FIG. 17, the control unit 5 executes various processes based on indicating signals from the control unit 4 (step S15) and ends the processes. Note that the control unit 5 may move the function of the camera 1 to a program design mode and a photographing mode based on the indicating signals so given then.

In addition, if the lens unit design mode is not selected in the step S8 (step S8; No) while the program design mode is selected in step S9 (step S9; Yes), the control unit 5 executes the program design mode.

To be specific, firstly, the control unit 5 receives the customized control program 66*d* that is inputted via the control unit 4 (step S16). Next, the control unit 5 determines whether or not the design of the customized control program 66*d* has been completed (step S17), and if not yet completed, (step S17; No), return to the process in step S16, whereas if completed (step S17; Yes), a file name is affixed to the designed customized control program and the designed customized control program to which the file name has so been affixed is then stored in the program memory 66 (step S18), then the program design mode process being ended.

Then, the control unit 5 executes various processes based on indicating signals from the control unit 4 (step S15) and ends the program design mode process.

In addition, if the program design mode is not selected in the step S9 (step S9; No) while a program debugging mode is selected in step S10 (step S10; Yes), the control unit 5 executes a program debugging mode process.

To be specific, firstly, the control unit 5 reads designated control programs and design data (step S19). Then, the control unit 5 executes the control programs so read (step S20), displays the results of the execution at the display unit 16 and stores the results in the program memory 66 (step S21), ending the program debugging mode process.

Then, the control unit 5 performs various processes based on indicating signals from the control unit 4 (step S20) and ends the relevant process.

In addition, if the program debugging mode is not selected in the step S10 (step S10; No) while the customized photographing mode is selected in the step S11 (step S11; Yes), the control unit 5 performs a customized photographing mode process based on the customized control program 66*d* (step S22).

Figure 31:
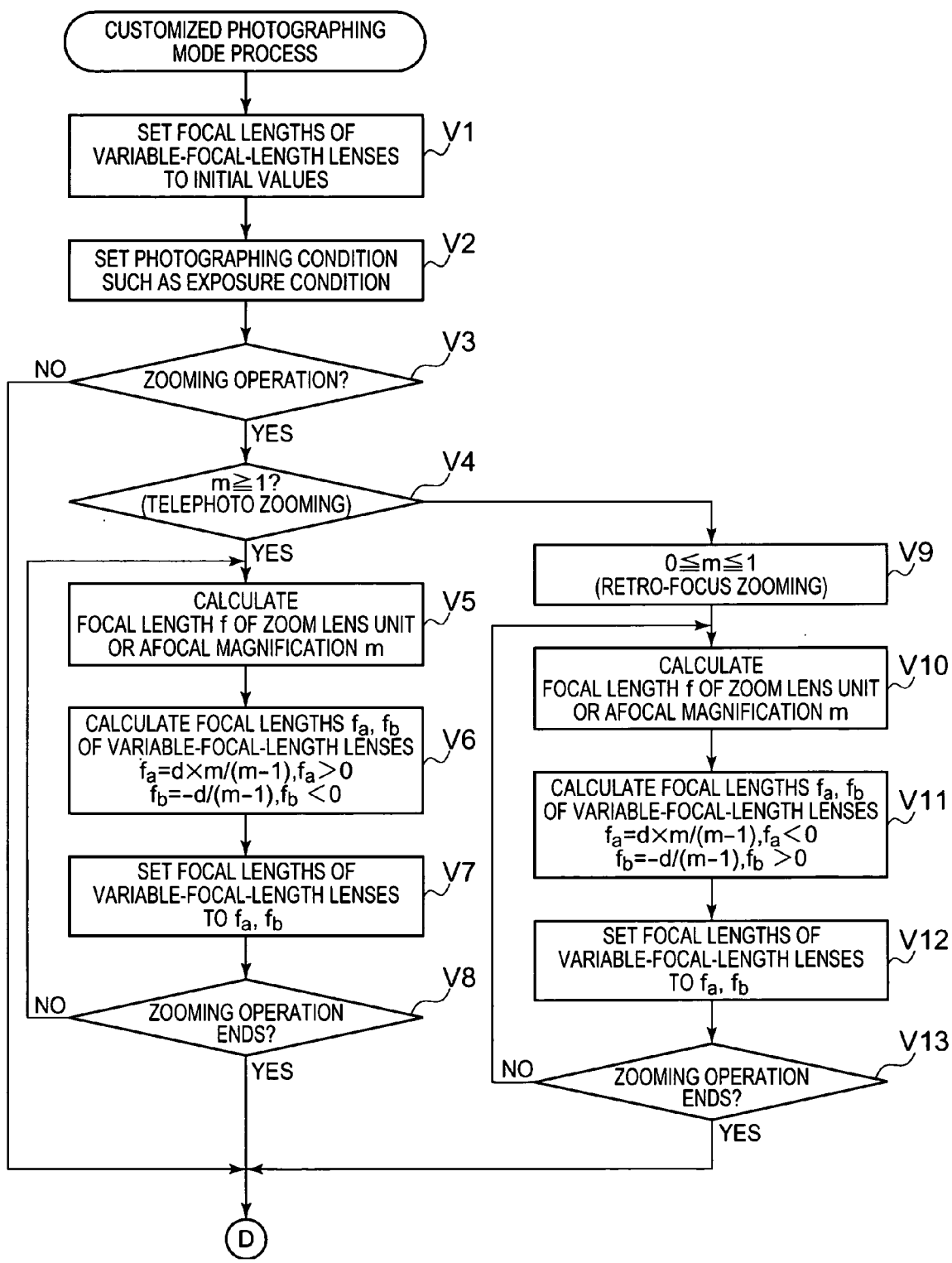
FIGS. 31 and 32 are flowcharts showing a customized photographing mode process.

To be specific, as shown in, for example, FIG. 31, the processing unit 50 firstly sets the focal lengths of the variable-focal-length lenses 3*a*, 3*b* to initial set values (step V1).

Next, when the user directs the camera 1 to a subject, rays of light from the subject are incident on the zoom lens unit 2. As this occurs, since the prism 20 is provided above the variable-focal-length lenses 3*a*, 3*b*, rays of light from a lateral direction are guided to the variable-focal-length lenses 3*a*, 3*b* which are provided horizontally. In addition, since the variable-focal-length lenses 3*a*, 3*b* are provided horizontally, the liquids 31*a*, 31*b* are maintained in a stable state, and as a result, the flow of the liquids 31*a*, 31*b* and the deformation of the optical surfaces S due to vibrations, gravity and acceleration are prevented. In addition, when compared with a case where the variable-focal-lenses 3*a*, 3*b* are disposed vertically, the area of the optical surfaces S is increased. Namely, since the F numbers of the variable-focal-length lenses 3*a*, 3*b* are decreased, the brightness of an image can be increased.

In addition, as this occurs, the processing unit 50 sets photographing conditions such as the shutter speed, the light volume at the flash unit 11 and the white balance (WB) based on the results of metering the light volume, color temperature and subject distance that are metered by the light and distance metering sensor 14 (step V2).

Next, the processing unit 50 determines whether or not a zooming operation is instructed by the user based on a signal from the control unit 4 (step V3), and if no zooming operation is instructed (step V3; No), the processing unit 50 performs a process in step V8, which will be described later on.

On the other hand, if the zooming operation is instructed in step V3 (step V3; Yes), the processing unit 50 determines whether or not a telephoto zooming is instructed or if the afocal magnification m is designated as m≧1 (step V4).

If the telephoto zooming is instructed (step V4; Yes), the processing unit performs a telephoto zooming process.

To be specific, the processing unit 50 calculates afocal length f (=m×fo) or an afocal magnification m that is designated in a signal from the control unit 4 (step V5).

Figure 14:
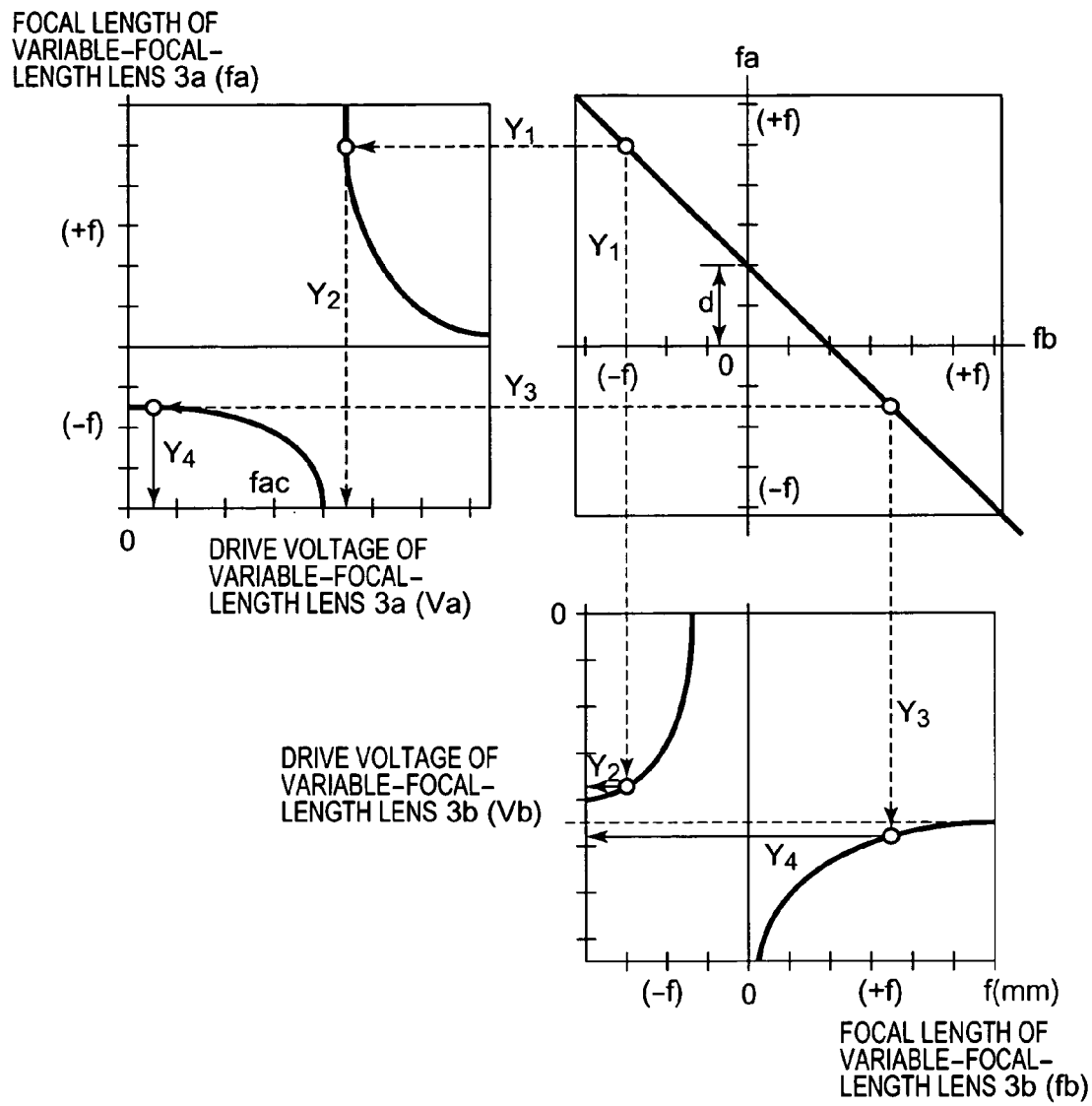
FIG. 14 shows relationships between afocal magnifications and impressed voltages impressed to a variable-focal-length lens, and FIGS. 15A to 15C.

Next, as shown by an arrow $Y_1$ in FIG. 14, the processing unit 50 calculates required focal lengths of the variable-focal-length lenses 3*a*, 3*b* based on the table in the program memory 66 (step V6). Namely, the focal lengths $f_a$, $f_b$ are calculated by utilizing the aforesaid equations (18), (19) and the conditional inequalities of $f_a>0$, $f_b<0$. Thus, in the event that the refracting force of the object side variable-focal-length lens 3*a* becomes positive, while the refracting force of the image side variable-focal-length lens 3*b* becomes negative, the zoom lens unit 2 functions as a telephoto zooming lens unit.

Next, as indicated by an arrow $Y_2$ in FIG. 14, the processing unit 50 drive voltages $V_a$, $V_b$ which correspond to the focal lengths $f_a$, $f_b$, respectively, based on the table in the program memory 66.

When the processing unit 50 calculates the drive voltages $V_a$, $V_b$, the photographing control unit 51 transmits signals indicating these drive voltages $V_a$, $V_b$ to the lens drive units 60*a*, 60*b*, respectively. The lens drive units 60*a*, 60*b*, which receives the indicating signals, the lens drive units 60*a*, 60*b* impress voltages to the electrodes 34*a*, 34*b* at the designated impressed voltages $V_a$, $V_b$ so as to deform the optical surfaces S, whereby the focal lengths $f_a$, $f_b$ of the variable-focal-length lenses 3*a*, 3*b* are set to $f_a$, $f_b$, respectively (step V7). As this occurs, the photographing control unit 51 fixes the focusing position of the zoom lens unit 2 in such a manner as not to be changed, whereby the deviation of the focusing position is prevented when the focal length is adjusted. In addition, the control of the focusing position and the focal length of the zoom lens unit 2 can be implemented separately.

Next, the processing unit 50 determines whether or not the zooming operation has been completed based on signals from the control unit 4 (step V8), and if the zooming operation has not yet been completed (step V8; No), return to the step V5 to perform the telephoto zooming process again.

Then, if the zooming operation has been completed (step V8; Yes), the processing unit 50 ends the telephoto zooming process and performs a process in step V14 (refer to FIG. 32), which will be described later on.

On the other hand, if the telephoto zooming is not directed in step V4 (step V4; No), the processing unit 50 performs a retro-focus zooming process.

To be specific, the processing unit 50 firstly calculates the focal length f or afocal magnification m that is designated in the signal from the control unit 4 (step V10).

Next, as indicated by an arrow $Y_3$ in FIG. 14, the processing unit 50 calculates required foal lengths $f_a$, $f_b$ of the variable-focal-length lenses 3*a*, 3*b* based on the table in the program memory 66 (step V11). Namely, the focal lengths $f_a$, $f_b$ are calculated by utilizing the aforesaid equations (18), (19) and the conditional inequalities of $f_a<0$, $f_b>0$. Thus, in the event that the refracting force of the object side variable-focal-length lens 3*a* becomes negative, while the refracting force of the image side variable-focal-length lens 3*b* becomes positive, the zoom lens unit 2 functions as a wide-angle zooming lens unit.

Next, as indicated by an arrow $Y_4$ in FIG. 14, the processing unit 50 drive voltages $V_a$, $V_b$ which correspond to the focal lengths $f_a$, $f_b$, respectively, based on the table in the program memory 66.

When the processing unit 50 calculates the drive voltages $V_a$, $V_b$, the photographing control unit 51 transmits signals indicating these drive voltages $V_a$, $V_b$ to the lens drive units 60*a*, 60*b*, respectively. The lens drive units 60*a*, 60*b*, which receives the indicating signals, the lens drive units 60*a*, 60*b* impress voltages to the electrodes 34*a*, 34*b* at the designated impressed voltages $V_a$, $V_b$ so as to deform the optical surfaces S, whereby the focal lengths $f_a$, $f_b$ of the variable-focal-length lenses 3*a*, 3*b* are set to $f_a$, $f_b$, respectively (step V12). As this occurs, the photographing control unit 51 fixes the focusing position of the zoom lens unit 2 in such a manner as not to be changed, whereby the deviation of the focusing position is prevented when the focal length is adjusted. In addition, the control of the focusing position and the focal length of the zoom lens unit 2 can be implemented separately.

Next, the processing unit 50 determines whether or not the zooming operation has been completed based on signals from the control unit 4 (step V13), and if the zooming operation has not yet been completed (step V13; No), return to the step V10 to perform the retro-focus zooming process again.

Then, if the zooming operation has been completed (step V13; Yes), the processing unit 50 ends the telephoto zooming process.

Figure 32:
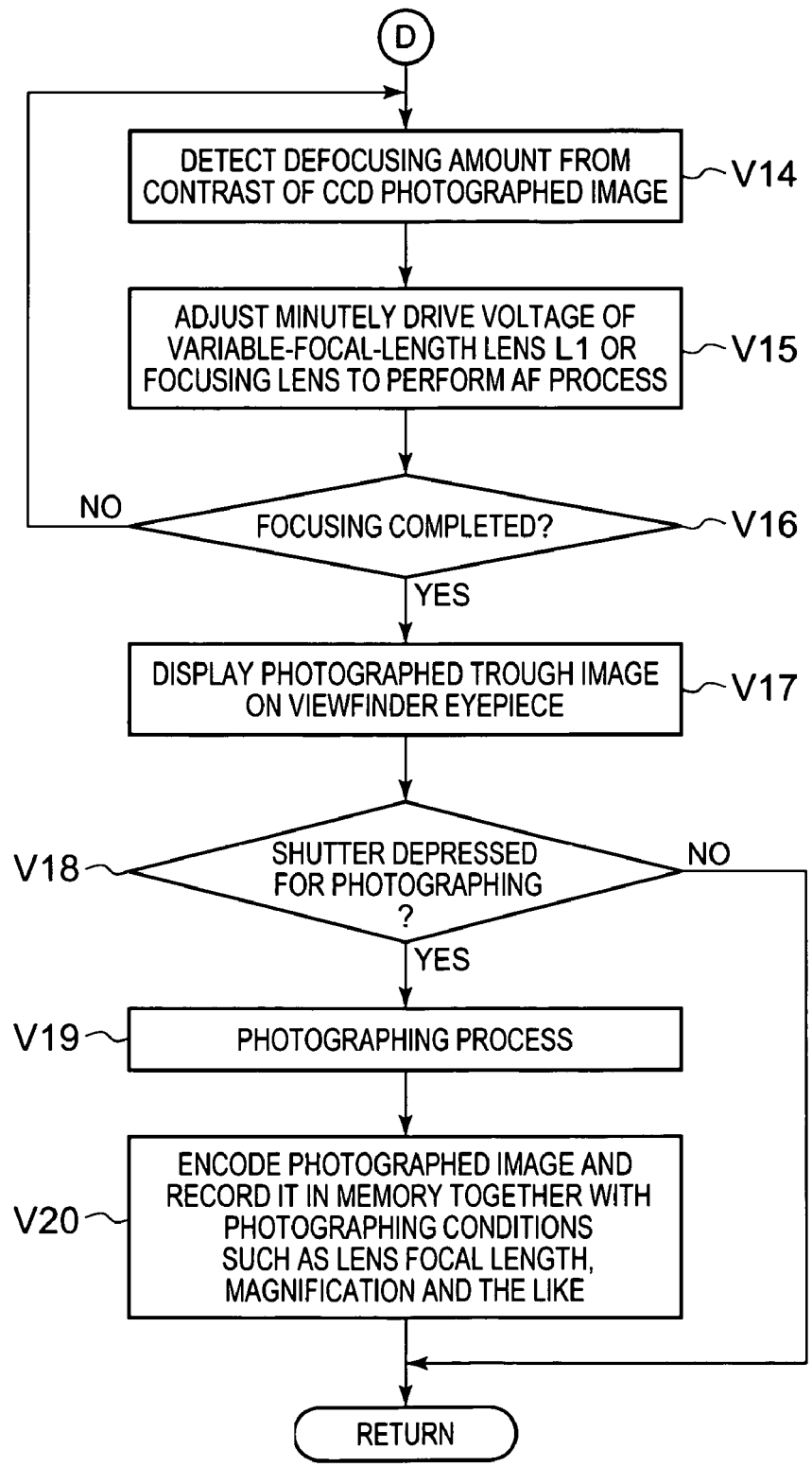

Next, as shown in FIG. 32, the processing unit 50 calculates a contrast or the like of an image based on an electric signal sent from the photographing element 24 and, furthermore, calculates a defocusing amount based on the results of the calculation (step V14).

Next, the processing unit 50 performs an auto focus process based on the defocusing amount so calculated (step V15). While this auto focus process is preferably performed by minutely adjusting the impressed voltage impressed to one of the variable-focal-length lenses 3a, 3b, the process may be performed by moving the rigid lens 21.

In addition, the processing unit 50 compensates for the impressed voltages to the variable-focal-length lenses 3a, 3b based on the temperature measured by the temperature sensor 15. To be specific, the processing unit 50 firstly calculates variations of the interfacial tensions, the contact angles and the refractive indices of the liquids 31a, 31b which are attributed to temperature change and calculates a variation of the focal length based on the results of the calculations. Then, the processing unit 50 compensates for the impressed voltages to the variable-focal-length lenses 3a, 3b in such a manner as to compensate for the variation of the focal length, whereby even in the event that the focal lengths of the variable-focal-length lenses 3a, 3b vary based on the change in temperature, the optical properties of the zooming lens unit 2 are maintained.

Next, the processing unit 50 determines whether or not an in focus state is properly obtained based on an electric signal from the photographing element 24 (step V16), and if the in focus state is not obtained (step V16; No), return to the step V14 and the focusing is carried out again.

On the other hand, if the obtaining of the in focus state is determined to be obtained in step V16 (step V16; Yes), the processing unit 50 through displays a subject image at the display unit 16 based on an electric signal from the photographing element 24 (step V17).

Next, the processing unit 50 determines whether or not the shutter release button 41 has been depressed within a predetermined duration (step V18).

If the shutter release button 41 has been so depressed (step V18; Yes), the processing unit 50 controls the shutter drive unit 62 and the flash unit 11 so as to photograph a subject image (step V19). When the photographing has been completed, the processing unit 50 compresses and encodes image data at the compression and decompression unit 70 and thereafter stores the image data so compressed and encoded in the internal memory 68 together with the focal lengths and magnifications of the variable-focal-length lenses 3a, 3b (step V20). Then, after having completed the process based on signals from the control unit, the processing unit 50 completes the customized photographing mode.

On the other hand, if the shutter release button 41 has not yet been depressed or if the photographing conditions are changed in step V18 (step V18; No), after having completed the process based on signals from the control unit, the processing unit 50 ends directly the customized photographing mode.

Then, as shown in FIG. 17, the control unit 5 performs various processes based on instruction signals from the control unit 4 (step S15) and ends the process.

In addition, if the customized photographing mode is not selected in the step S11 (step S11; No), while the standard photographing mode is selected in step S12 (step S12; Yes), the control unit 5 implements a standard photographing mode process based on the standard control program.

To be specific, the processing unit 50 firstly sets the focal lengths of the variable-focal-length lenses 3a, 3b to initial values. Here, when the user directs the cameral 1 to the subject, rays of light from the subject are incident on the zooming lens unit 2. As this occurs, since the prism 20 is provided above the variable-focal-length lenses 3a, 3b, rays of light from a lateral direction are guided to the variable-focal-length lenses 3a, 3b which are provided horizontally. In addition, since the variable-focal-length lenses 3a, 3b are provided horizontally, the liquids 31a, 31b are maintained in a stable state, and as a result, the flow of the liquids 31a, 31b and the deformation of the optical surfaces S due to vibrations, gravity and acceleration are prevented. In addition, when compared with a case where the variable-focal-lenses 3a, 3b are disposed vertically, the area of the optical surfaces S is increased. Namely, since the F numbers of the variable-focal-length lenses 3a, 3b are decreased, the brightness of an image can be increased.

Next, the control unit 5 sets photographing conditions such as shutter speed and stopping amount based on control indicating signals from the control unit 4 (step S23).

Next, the processing unit 50 calculates compensation amounts of the impressed voltage that are impressed to the variable-focal-length lenses 3a, 3b based on the temperature measured by the temperature sensor 15, the light volume and subject distance metered by the light and distance metering sensor 14 and the contrast calculated from an electric signal from the photographing element, and the photographing control unit 51 impresses voltages to the variable-focal-length lenses 3a, 3b. In addition, the photographing control unit 51 performs a white balance (WB) process on the flash unit 11 based on an indicating signal from the control unit 4 (step S24).

Next, the control unit 5 performs a zooming process and an AF process on the zoom lens unit 2 (step S25) and determines whether or not the shutter release button 41 has been depressed within a predetermined duration (step S26).

If the shutter button 41 has been so depressed in step S26 (step S26; Yes), the control unit 5 controls the shutter drive unit 62 and the flash unit 11 so as to photograph a subject image (step S27). When the photographing has been completed, the control unit 5 compresses and encodes image data at the compression and decompression unit 70 and thereafter stores the image data so compressed and encoded in the internal memory 68 together with the focal lengths and magnifications of the variable-focal-length lenses 3a, 3b (step V28). Then, after having completed the process based on signals from the control unit, the control unit 5 completes the standard photographing mode.

On the other hand, if the shutter release button 41 has not yet been depressed or if the photographing conditions are changed in step V26 (step V26; No), after having completed the process based on signals from the control unit, the control unit 5 ends directly the standard photographing mode.

Then, the control unit 5 performs various processes based on indicating signals from the control unit 4 (step S15) and ends the process.

In addition, if the standard photographing mode is not selected in the step S12 (step S12; No) while the reproduction mode is selected in step S13 (step S13; Yes), the control unit 5 performs, as shown in FIG. 18, a reproduction mode process.

To be specific, the control unit 5 selects image data in the internal memory 68 or the external memory 67a according to an instruction from the user (step S29) and displays the image data so selected at the display unit 16 or outputs it to the external memory 67a (step S30), ending the reproduction mode process.

Then, the control unit 5 performs various processes based on indicating signals from the control unit 4 (step S15) and ends the process.

In addition, if the reproduction mode is not selected in step S13 (step S13; No), the control unit 5 performs a setting mode process.

To be specific, the processing unit 5 firstly sets a control program and design data according to an instruction from the user (step S31). Next, the control unit 5 sets functions for the respective units of the camera and setting conditions as required and thereafter ends the setting mode process.

Then, the control unit 5 performs various processes based on indicating signals from the control unit 4 (step S15) and thereafter ends the process.

According to the camera 1 that has been configured as has been described above, since the design contents of the zoom lens unit 2 can be evaluated accurately by the results of the simulation operations, the number of trials and errors in designing the zoom lens unit 2 can be reduced, and hence, being different from the conventional case, the desired optical properties of the zoom lens unit 2 can easily be obtained.

In addition, since the values of the respective variable parameters can be returned to a predetermined state such as a default state based on the standard design data 66a and the customized design data 66b, the number of trials and errors in designing the zoom lens unit 2 can further be reduced.

Note that while, in this embodiment, the zoom lens unit 2 is described as including the prism 20, the variable-focal-length lenses 3a, 3b and the rigid lens 21 in this order along the optical axis L, the zoom lens unit 2 may include them in another order as shown in, for example, FIG. 33.

In addition, while the variable-focal-length lenses 3a, 3b are described as being disposed closer to the object side than the rigid lens 21 is, they may be disposed on the image side.

Figure 34:
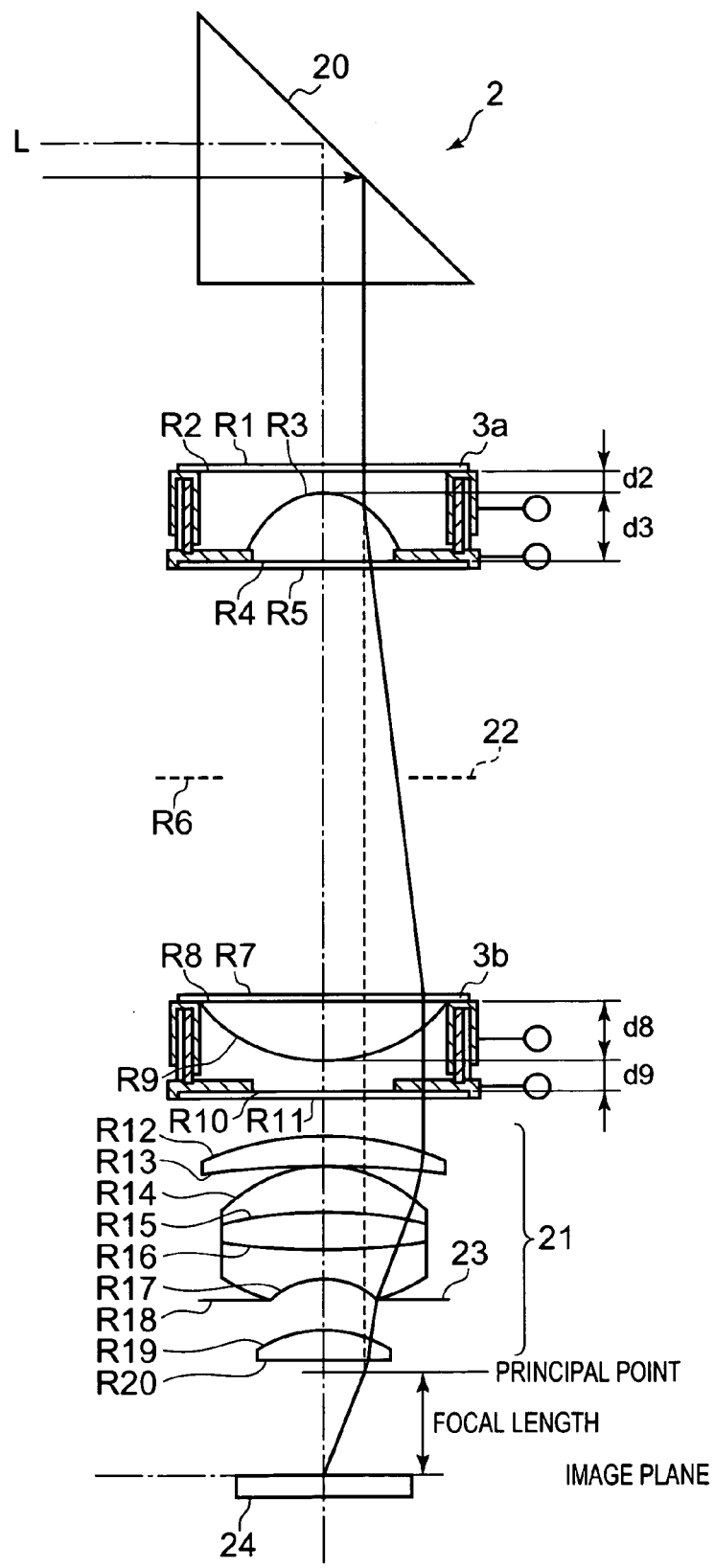
Figure 35C:
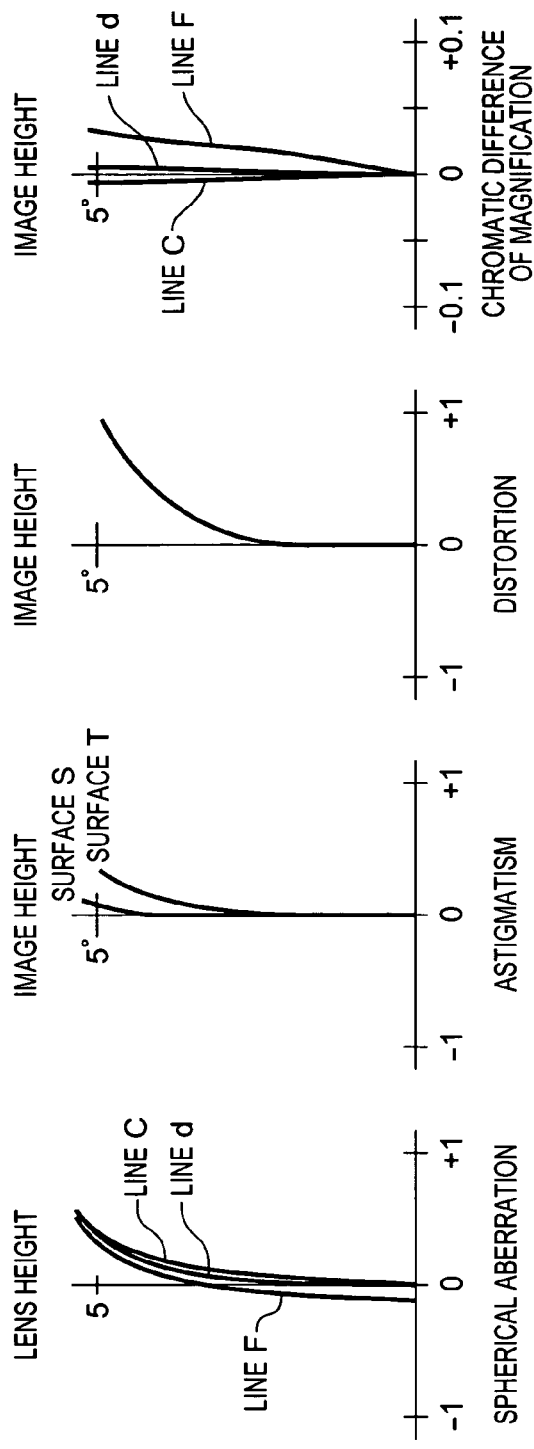
FIG. 35C shows vertical aberrations.
Figure 35D:
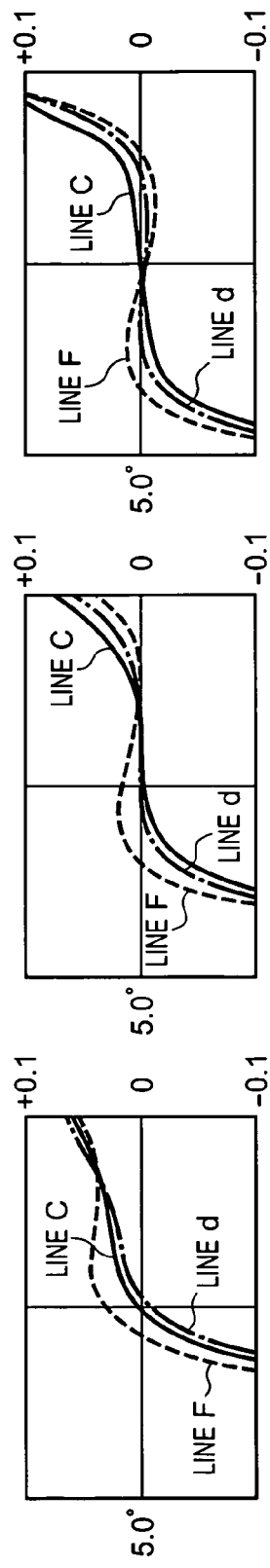
FIG. 35D shows lateral aberrations.

In addition, while the rigid lens 21 is described as being a single lens element, as shown in FIG. 34, the rigid lens 21 may be made up of a lens unit comprising a plurality of lens elements. A zoom lens unit which adopts such a construction can be formed based on such design data as shown in, for example, FIGS. 35A, 35B. Aberration curves and values of aberration coefficients and the like, which result in this case, are illustrated in FIGS. 35C, 35D and FIG. 36, respectively. Here, in FIG. 35B, the "position of a liquid surface" means a distance, as shown in FIG. 34, from the transparent plates 30a, 30b to the center of the interface. In addition, FIG. 35C shows vertical aberration diagrams when the afocal magnification m=0.6 and the focal length f=15 mm, and FIG. 35D shows lateral aberration diagrams when the afocal magnification m=0.6, the focal length f=15 mm and the angle of incidence is 5°. In addition, in FIGS. 35C, 35D, the "line C" means a light with a wavelength of 656.27 nm, the "line d" a light with a wavelength of 87.56 nm and the "line F" a light with a wavelength of 486.13 nm.

In addition, while the incident light that enters from the photographing light in take window 13 is described as being refracted by the prism 20, the incident light may be refracted by a mirror such as a Mangin mirror.

In addition, while the prism 20 of the zoom lens unit 2, the variable-focal-length lenses 3a, 3b and the rigid lens 21 are described as being arranged in the vertical direction, they may be arranged in a lateral or horizontal direction.

In addition, while the variable-focal-length lenses 3a, 3b are described as being stationary, they may be moved by a rack and a pinion which constitute a first moving device of the invention. In this case, since the optical properties of the zoom lens unit 2 can be adjusted by adjusting the positions of the variable-focal-length lenses 3a, 3b, the desired optical properties can easily be obtained. In addition, even in the event that there is a limitation on the variable areas of the optical properties of the variable-focal-length lenses 3a, 3b, the focal length and focusing position of the whole lens system can be adjusted over the wide range by deflecting the refracting force of the zoom lens unit 2 to the positive or negative side through the adjustment of the positions thereof.

In addition, while the variable-focal-length lenses 3a, 3b are described as changing the refracting force by deforming the optical surfaces S, the liquids 31a, 31b may be replaced with other liquids having different refractive indices to thereby change the refracting force.

In addition, while the processing unit 50 is described as evaluating the image forming performance of the zoom lens unit 2 by obtaining the MTF property through the simulation operation, the image forming performance may be evaluated by obtaining an OTF (Optical Transfer Function) property and a PTF (Phase Transfer Function) property, or the image forming performance may be evaluated by transforming the MTF value and the OTF value to evaluation data for plane aberration, or the image forming performance may be evaluated by the so-calllled Nitka method, Rudinger & Spiegler method, and resolving power method.

In addition, while the zoom lens unit 2 is described as being provided in the cameral 1, the zoom lens unit 2 may be provided in a telescope, a microscope and a binocular.

Modification to the Embodiment

Next, a modification to the embodiment of the invention will be described. Note that like reference numerals are imparted to like constituent elements to those described in the embodiment, and the description thereof will be omitted.

A camera 1 according to this modification includes the zoom lens unit 2 shown in FIG. 34. In addition, a program memory 66 of this camera 1 stores a customized control program memory 66e (refer to FIG. 2), and a processing unit 50 is designed to perform a customized photographing mode process based on this customized control program 66e.

Figure 37:
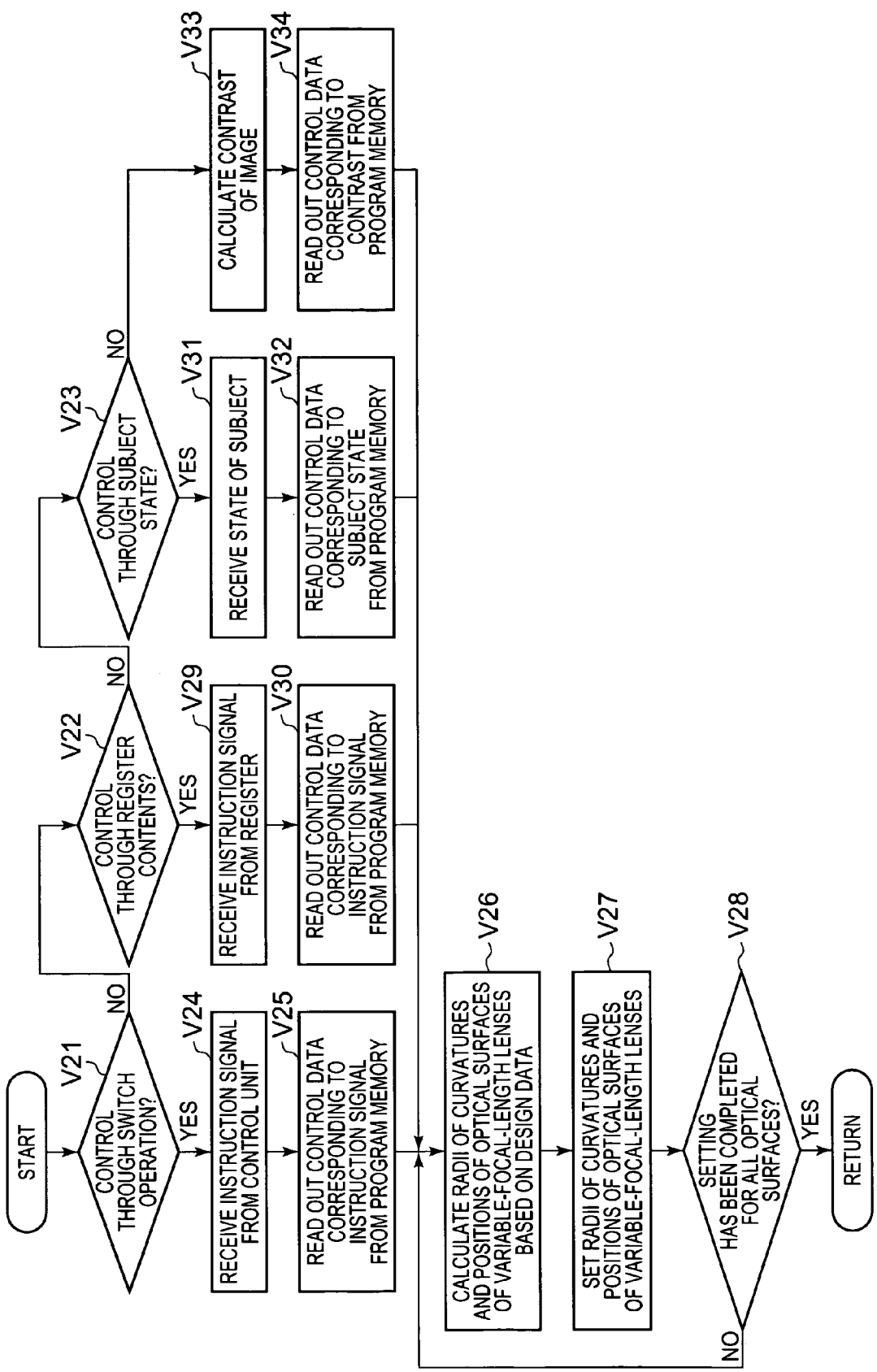
FIG. 37 is a flowchart showing a customized photographing mode process.

To be specific, firstly, the processing unit 50 performs processes similar to those in the steps V1 to V2 and thereafter determines sequentially whether or not the user has made selections with respect to a control of the zoom lens unit 2 through switch operation, a control of the zoom lens unit 2 through the contents of a register and a control of the zoom lens unit 2 through the state of a subject (steps V21 to V23), as shown in FIG. 37.

If the control through switch operation is selected in this step V21 (step V21; Yes), the processing unit 50 receives an instruction signal from a control unit 4 (step V24).

Next, the processing unit 50 reads out of the program memory 66 control data that corresponds to the instruction signal from the control unit 4 (step V25). The control data is, as shown in, for example, FIG. 38, a table in which operation details by the user are related to control details of variable-focal-length lenses 3a, 3b, and to be specific, combinations of magnifications and focal lengths of the zoom lens unit 2 are related to radii of curvatures and positions of optical surfaces S of the variable-focal-length lenses 3a, 3b.

Next, the processing unit 50 calculates radii of curvatures and positions of the optical surfaces S of the variable-focal-length lenses 3a, 3b from the magnifications and focal lengths of the zoom lens unit 2 based on the control data so read out (step V26).

Next, the processing unit 50 sets radii of curvatures and positions of the optical surfaces S of the variable-focal-length lenses 3a, 3b based on the calculated radii of curvatures and positions (step V27).

Next, the processing unit 50 determines whether or not radii of curvatures and positions of all optical surfaces S of the variable-focal-length lenses 3a, 3b have been set (step V28) and if not yet set (step V28; No), return to the process in the previous step V26.

Then, if radii of curvatures and positions have been set for all the optical surfaces S (step V28; Yes), the processes in the aforesaid steps V17 to V20 are performed and the customized photographing process is ended.

In addition, if the control through switch operation is not selected in the step V21 (step V21, No) while the control through the contents of the register is selected in step V22 (step V22; Yes), the processing unit 50 receives an instruction signal that is stored in advance in the resister (not shown) in the control unit 5 (step V29).

Next, the processing unit 50 reads out control data corresponding to the instruction signal so received from the program memory 66 in a similar manner to that used in the step V25 above (step V30).

Then, the processing unit 50 and the photographing control unit 51 perform the processes in the steps V26 to V28 and thereafter perform the processes in the steps V17 to V20, and the customized photographing mode process is ended.

In addition, if the control through the contents of the register is not selected in the step V22 (step V22; No), while the control through the state of a subject is selected in step V23 (step V23; Yes), the processing unit 50 receives the state of a subject from a light and distance metering sensor 14 and the like (step V31).

Next, the processing unit 50 reads out control data corresponding to a signal received from the program memory 66 in a similar manner as to that used in the step V25 (step V32).

Then, the processing unit 50 and the photographing control unit 51 perform the processes in the steps V26 to V28 and thereafter perform the processes in the steps V17 to V20, and the customized photographing mode process is ended.

In addition, if the control through the state of a subject is not selected in the step V23 (step V23; No), the processing unit 50 performs a control through the state of a photographing signal.

To be specific, the processing unit 50 calculates a contrast of an image based on an electric signal sent from a photographing element 24 (step V33) and reads out control data corresponding to the contrast so calculated from the program memory 66 in a similar manner as to that used in the V25 above (step V34).

Then, the processing unit 50 and the photographing control unit 51 perform the processes in the steps V26 to V28 and thereafter perform the processes in the steps V17 to V20, and the customized photographing mode process is ended.

A similar advantage to that provided by the aforesaid embodiment can also be provided by the camera 1 that is configured as has been described above.

Thus, by adopting the lens unit or the camera incorporating the lens unit which can program an optical property, comprising, a plurality of optical elements which are disposed on an optical axis of the lens unit, an electronic control unit for changing an optical property with respect to an optical path of the whole lens unit by changing the state of the plurality of optical elements within the lens unit through electronic control, an instruction unit for instructing the control of the state of the plurality of optical elements so that the optical property with respect to the optical path of the whole lens unit at the time of photographing falls within part of a whole range that can be changed by the electronic control unit, and a photographing control unit for controlling the state of the plurality of optical elements that is changed by the electronic control unit based on an instruction by the instruction unit at the time of photographing so that the optical property with respect to the optical path of the whole lens unit falls within the part of the whole range that can be changed by the electronic control unit, the optical properties of the lens unit can be adjusted over the wide range without exchanging lenses, and additionally, the desired optical properties can easily be obtained.

Here, the lens unit may adopt a form in which the lens unit is detachably attached to the camera or may be made up of a plurality of groups of lenses which are incorporated in the camera.

In addition, optical elements that make up the lens unit may be such as a lens type optical elements that transmits light in a straight line, a reflecting mirror type optical elements that reflect light or a prism type optical elements that bends light.

In addition, each optical element itself may made up of a partially formed group of a plurality of lenses (reflecting mirror, prism and the like).

In addition, the optical property with respect to the optical path of the whole lens unit means the focal length of the whole lens unit (in the event that the lens unit is made to function as a fixed-focus lens, afocal length that is fixed at the time of photographing, whereas in the event that the lens unit is made to function as a zoom lens, a range of focal length that can be adjusted by zooming operation at the time of photographing), the focal point position (focusing position) of the whole lens unit, light trace property, OTF property, image forming property and the like. These are such as to exclude optical properties such as transmittance (brightness) of the lens which is not related to the optical path of the whole lens unit.

In addition, the state of the plurality of optical elements that is changed by the electronic control unit is the state of various types of lens design parameters (variable design parameters) which include positions on the optical axis of the respective optical elements within the lens unit and the focal length of each of the respective optical elements. The positions on the optical axis of the respective optical elements in the lens unit may be such as to be designated by a relative distance between the respective optical elements, and the focal length of each of the respective optical elements may be such as to be designated by the curvature of the lens surface, the refractive index (material) of the lens, the curvature of the reflecting mirror and the like.

In addition, while the control of the state of the plurality of optical elements based on the designated contents is controlled according to the control information, this control information may be configured in such a manner as to be incorporated in the standard control program and the customized control program, or this control information may be stored as lens design data such as the standard design data and the customized design data, and the control program may control the state of the plurality of optical elements based on the lens design data. In addition, the control information may store lens design parameters in the default state, and in other states, the control information may be calculated each time based on the lens design parameters in the default state. In addition, lens parameters in a plurality of states may be stored.

The invention claimed is:

1. A camera which incorporates a lens unit which can program an optical property, comprising:
   a plurality of optical elements which are disposed on an optical axis of the lens unit;
   an electronic control unit for changing an optical property with respect to an optical path of the lens unit by changing a state of at least one of the plurality of optical elements within the lens unit through electronic control, wherein the electronic control unit changes at least one of a position of said at least one of the plurality of optical elements on the optical axis or a focal length of said at least one of the plurality of optical elements through the electronic control;

an instruction unit for controlling the state of said at least one of the plurality of optical elements so that the optical property with respect to the optical path of the lens unit at a time of photographing falls within part of a range that can be changed by the electronic control unit, wherein the instruction unit controls the state of said at least one of the plurality of optical elements such that at least a first optical property of a plurality of optical properties with respect to the optical path of the lens unit satisfies a predetermined condition, based on an instructing operation of a user; and a photographing control unit for controlling the state of said at least one of the plurality of optical elements after the electronic control unit has changed said state based on an instruction by the instruction unit at the time of photographing so that the optical property with respect to the optical path of the lens unit falls within the part of the range that can be changed by the electronic control unit, wherein the photographing control unit controls the state of said at least one of the plurality of optical elements such that at least the first optical property that is designated by the instruction unit satisfies the predetermined condition.

2. A camera as set forth in claim 1, wherein the optical property with respect to the optical path of the lens unit includes at least one of a plurality of properties from focal length, focusing position, optical path property, aberration property, spot diagram property, MTF property and OTF property of the lens unit.

3. A camera as set forth in claim 1, wherein the electronic control unit changes the state of the optical elements individually.

4. A camera as set forth in claim 1, wherein the instruction unit gives an instruction to change a first optical property of a plurality of optical properties with respect to the optical path of the lens unit according to required information that is taken successively at the time of photographing and to control the state of at least one of the plurality of optical elements such that a condition which restricts a change of a second optical property is satisfied, and wherein the photographing control unit changes, based on the instruction given by the instruction unit, the first optical property according to the required information that is taken successively at the time of photographing and controls the state of at least one of the plurality of optical elements in such a manner as to restrict the change of the second optical property.

5. A camera as set forth in claim 4, further comprising a metering unit for metering a state of a subject successively at the time of photographing, wherein the required information is information which designates an optical property that is required according to the state of the subject that is metered by the metering unit.

6. A camera as set forth in claim 4, further comprising a control unit that is operated by the user to receive successively instructions therefrom, wherein the required information is information which designates an optical property that is required according to the instruction from the user that is received by the control unit.

7. A camera as set forth in claim 1, further comprising:

an instruction unit which prompts the user to designate arbitrary design data which restrict the state of at least one of the plurality of optical elements;

a calculation unit which calculates a state of a predetermined optical property with respect to the optical path of the lens unit according to the lens design data designated by the instruction unit; and a display unit which displays the state of the predetermined optical property that is calculated by the calculation unit, wherein the instruction unit gives an instruction to control the state of at least one of the plurality of optical elements based on the lens design data designated by the instruction unit, when the state of the predetermined optical element displayed by the display unit is selected as the state of the optical property at the time of photographing.

8. A camera as set forth in claim 7, wherein the calculation unit calculates a state of a predetermined optical property with respect to the optical path of the lens unit which corresponds to the lens design data, and wherein the display unit displays results of a simulation operation by the calculation unit.

9. A camera as set forth in claim 8, wherein the calculation unit and the display unit include at least one of a plurality of displays including a display of a light trace chart resulting from a simulation operation for ray tracing, a display of an aberration diagram resulting from a simulation operation for aberration property, a display of a spot diagram drawing resulting from a simulation operation for sport diagram property, a display of an MTF diagram resulting from a simulation operation for MTF property, and a display of an OTF diagram resulting from a simulation operation for an OTF property.

10. A camera as set forth in claim 8, wherein the display unit displays a design drawing which shows a state of at least one of the plurality of optical elements which corresponds to the lens design data designated by the instruction unit and displays results of the simulation operation on the design drawing.

11. A camera as set forth in claim 1, wherein the instruction unit gives an instruction to control the state of at least one of the plurality of optical elements such that a change of a focal length which is one of the plurality of optical properties with respect to the optical path of the lens unit satisfies a predetermined condition, when the focal length is changed independently of a focusing position which is another optical property, and wherein the photographing control unit controls the state of at least one of the plurality of optical elements such that the change of the focal length satisfies the predetermined condition.

12. A camera as set forth in claim 11, wherein the instruction unit gives an instruction that the change of the focal length has a predetermined afocal magnification, when the lens unit is made to function as a zoom lens.

13. A camera as set forth in claim 4, wherein the electronic control unit is adapted to change a plurality of lens design parameters including positions on the optical axis of the respective optical elements in the lens unit and a focal length of each of the respective optical elements through electronic control, and wherein the photographing control unit fixes, at the time of photographing, the state of a first lens design parameter of the plurality of lens design parameters and changes the state of a second lens design parameter based on an instruction by the instruction unit, so that the first optical property is changed according to required information that is successively taken, while the change of the second optical property is restricted.

14. A camera as set forth in claim 13, wherein the photographing unit fixes, at the time of photographing, positions of the respective optical elements and allows only the focal length of each of the respective optical elements to be changed by the electronic control unit based on an instruction by the instruction unit.

15. A camera as set forth in claim 1, wherein the plurality of optical elements disposed on the optical axis of the lens unit include two types of optical elements comprising a variable-focal-length lens whose focal length can be changed by the electronic control unit and a fixed-focus lens whose focal length cannot be changed by the electronic control unit.

16. A camera as set forth in claim 1, wherein the optical elements that are disposed on the optical axis of the lens unit are variable-focal-length lenses which each have a liquid filled in an interior thereof and in which the focal length is changed by deforming a shape of the liquid in the interior of the optical element by the electronic control unit.

17. A camera as set forth in claim 16, wherein at least one of the optical elements in which the liquid is filled is disposed in such a manner that an optical axis thereof is oriented in a perpendicular direction and wherein an optical element is provided which bends an optical axis so as to guide a subject light which enters from a horizontal direction to the at least one optical element in which the liquid is filled.

18. A method for controlling a camera incorporating an electronic control unit for changing a state of a plurality of optical elements disposed on an optical axis of a lens unit through electronic control to thereby change an optical property with respect to an optical path of the lens unit, wherein the electronic control unit changes at least one of a position of said at least one of the plurality of optical elements on the optical axis or a focal length of said at least one of the plurality of optical elements through the electronic control, said method comprising:

setting an operation mode of the camera to a design mode;

instructing a control of the state of at least one of the plurality of optical elements when the design mode is set so that the optical property with respect to the optical path of the lens unit falls within part of a range that can be changed by the electronic control unit, wherein an instruction unit controls the state of said at least one of the plurality of optical elements such that at least a first optical property of a plurality of optical properties with respect to the optical path of the lens unit satisfies a predetermined condition, based on an instructing operation of a user;

setting the operation mode of the camera to a photographing mode; and controlling the state of at least one of the plurality of optical elements that is changed by the electronic control unit based on a detail designated during the design mode when the photographing mode is set so that the optical property with respect to the optical path of the lens unit falls within the part of the range that can be changed by the electronic control unit, wherein the state of said at least one of the plurality of optical elements is controlled such that at least the first optical property that is designated during the instructing satisfies the predetermined condition.

19. A lens unit which can program an optical property, comprising:

a detachable unit adapted to be detached from a camera;

a plurality of optical elements disposed on an optical axis of the lens unit;

an electronic control unit for changing an optical property of the lens unit by changing a state of at least one of the plurality of lens elements within the lens unit through electronic control, wherein the electronic control unit changes at least one of a position of said at least one of the plurality of optical elements on the optical axis or a focal length of said at least one of the plurality of optical elements through the electronic control;

an instruction unit for controlling the state of at least one of the plurality of optical element at a time of photographing so that an optical property designated with respect to an optical path of the lens unit falls within a designated range of a whole range that can be changed by the electronic control unit, wherein the instruction unit controls the state of at least one of the plurality of optical elements such that at least a first optical property of a plurality of optical properties with respect to the optical path of the lens unit satisfies a predetermined condition, based on an instructing operation of a user; and a photographing control unit for controlling the state of at least one of the plurality of optical elements after the state of at least one of the plurality of optical elements is changed by the electronic control unit at a time of photographing so that an optical property designated by the instruction unit falls within the range designated by the instruction means, wherein the photographing control unit controls the state of at least one of the plurality of optical elements such that at least the first optical property that is designated by the instruction unit satisfies the predetermined condition; and a transmission unit which communicates with the camera in such a state that the transmission unit is installed in the camera, wherein the instruction unit receives an instruction to control the state of said at least one of the plurality of optical elements from the camera via the transmission unit.

* * * * *